US008316237B1

(12) United States Patent
Felsher et al.

(10) Patent No.: US 8,316,237 B1
(45) Date of Patent: *Nov. 20, 2012

(54) SYSTEM AND METHOD FOR SECURE THREE-PARTY COMMUNICATIONS

(76) Inventors: David P. Felsher, Trumbull, CT (US); Robert H. Nagel, New York, NY (US); Steven M. Hoffberg, West Harrison, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/987,926

(22) Filed: Jan. 10, 2011

Related U.S. Application Data

(63) Continuation of application No. 11/676,244, filed on Feb. 16, 2007, now Pat. No. 7,869,591, which is a continuation of application No. 10/106,138, filed on Mar. 25, 2002, now Pat. No. 7,181,017.

(51) Int. Cl.
*H04L 29/06* (2006.01)
(52) U.S. Cl. .......................... 713/171; 380/282
(58) Field of Classification Search .................... 380/44, 380/277, 282; 726/2, 7
See application file for complete search history.

(56) References Cited

OTHER PUBLICATIONS

Lidong Zhou, et al, Distributed Blinding for ElGamal Re-encryption, Jan. 2, 2004.
Lea Kissner, et al, Provably Secure Substitution of Cryptographic Tools, Jan. 4, 2006, Cryptology ePrint Archive: Report 2006/004. http://eprint.iacr.org/2006/004.
Keith Xagawa, et al, Proxy Re-Encryptions Based on Learning with Errors (Extended Abstract), 2009.
Chung-Pei Hung, On the Design of Proxy Signatures, National Central University, Taiwan, Republic of China, Jun. 27, 2001, Thesis.lib. ncu.edu.tw.
Eu-Jin Goh, et al, SiRiUS: Securing Remote Untrusted Storage, Stanford University, Proc. ND55, 2003, isoc.org.
Anca Ivan, et al, Proxy Cryptography Revisited, Courant Institute of Mathematical Sciences, New York, New York, 2003, Proc Oth 10th Network & Distributed System Security Symposium (NDSS).
Steven M. Bellovin, et al, Privacy-Enhanced Searches Using Encrypted Bloom Filters, AT&T Labs Research, 2004, cryptology eprint archive, report 2004, 122. Kel. 2004.
Manoj Prabhakaran, et al, Homomorphic Encryption with CCA Security, University of Illinois, May 24, 2008, Automata, Language and Progennity, 2008 (Springer).
Jun Shao, et al, CCA-Secure PRE Scheme without Random Oracles, Pennsylvania State University, 2010.
Jun-Shao, et al, CCA-Secure Proxy Re-Encryption without Pairings, Pennsylvania State University, 2009.

(Continued)

*Primary Examiner* — Gilberto Barron, Jr.
*Assistant Examiner* — David Le
(74) *Attorney, Agent, or Firm* — Steven M. Hoffberg; Ostrolenk Faber LLP

(57) ABSTRACT

A system and method for communicating information between a first party and a second party, comprising the steps of receiving, by an intermediary, an identifier of desired information and accounting information for a transaction involving the information from the first party, transmitting an identifier of the first party to the second party, and negotiating, by the intermediary, a comprehension function for obscuring at least a portion of the information communicated between the first party and the second party. The data transmission may be made secure with respect to the intermediary by providing an asymmetric key or direct key exchange for encryption of the communication between the first and second party. The data transmission may be made secure with respect to the second party by maintaining the information in encrypted format at the second party, with the decryption key held only by the intermediary, and transmitting a secure composite of the decryption key and a new encryption key to the second party for transcoding of the data record, and providing the new decryption key to the first party, so that the information transmitted to the first party can be comprehended by it.

20 Claims, 10 Drawing Sheets

OTHER PUBLICATIONS

Sherman S.M. Chow, et al, Efficient Unidirectional Proxy Re-Encryption, New York University, New York, New York, Progress in Cryptology, African crypt 2010, Lecture Notes in Computer Science, 2010, vol. 6055/2010, 316-332.

Yi-Jun et al, Non-Transferable Proxy Re-Encryption, The University of Hong Kong, Hong Kong, 2010.

Chunbo Ma, et al, Proxy Key Re-encapsulation Mechanism for Group Communications, Guilin University of Electronic and Technology, P.R. China, 2008.

Jian Weng, et al, CCA-Secure Unidirectional Proxy Re-Encryption in the Adaptive Corruption Model without Random Oracles, Department of Computer Science and Engineering, Mar. 2010, vol. 53, No. 3, 593-606, Shanghai, China.

Chunbo Ma, et al, Group-Based Proxy Re-encryption Scheme, Xidian University, P. R. China, 2009.

Jian Weng, et al, On the Security of a Bidirectional Proxy Re-Encryption Scheme from PKC 2010, Fudan University, Shanghai, P. R. China, 2008.

Varad Kirtane, et al, RSA-TBOS Signcryption with Proxy Re-encryption, Indian Institute of Technology Madras, 2008.

Chunbo Ma, et al, Revisit of Group-based Unidirectional Proxy Re-encryption Scheme, Guilin University of Electronic and Technology, P. R. China, 2008.

Xi-Zhang, et al, Comments on Shao-Cao's Unidirectional Proxy Re-encryption Scheme from PKC 2009.

Radu Handorean et al, Secure Service Provision in Ad Hoc Networks, Washington University in St. Louis, St. Louis, Missouri, 2003.

Xu An Wang, et al, On DDos Attack Against Proxy in Re-encryption and Re-signature, Engineering College of Chinese, P. R. China, 2009.

Toshihiko Matsuo, Proxy Re-encryption Systems for Identity-based Encryption, NTT Data Corporation, 2007.

Jun Shao, et al, Proxy Re-signature Schemes without Random Oracles, Department of Computer Science and Engineering, Shanghai Jiao Tong University, 2007.

Giuseppe Ateniese, et al, Proxy Re-signatures: New Definitions, Algorithms, and Applications, Nov. 28, 2005, The John Hopkins University, Baltimore, Maryland.

Song Luo, et al, New Construction of Identity-Based Proxy Re-encryption, Peking University, 2010.

Xiaohui Liang, et al, Short Group Signature without Random Oracles, LNCS, vol. 4861, 2007, pp. 69-82, Sringer-Verlag.

Guiseppe Ateniese, et al, Key-Private Proxy Re-encryption, John Hopkins University, Jan. 22, 2009, Baltimore, Maryland.

Matthew Green, et al, Identity-Based Proxy Re-encryption, John Hopkins University, Baltimore, Maryland, 2007.

Jian Weng, et al, Chosen-Ciphertext Secure Proxy Re-encryption without Pairings, Department of Computer Science, LNCS, vol. 5339, 2008, Springer-Verlag.

Benoit Libert, et al, Multi-Use Unidirectional Proxy Re-signatures, Universite Catholique de Louvain, 3-1348, Louvain-la-Neuve, Belgium, 2008.

Hu Xiong, et al, Efficient Privacy-Preserving Authentication Protocol for Vehicular Communications with Trustworthy, School of Electronics Engineering and Computer Science, Peking University, P. R. China, 2010.

Jun-Zuo Lai, et al, New Construction for Identity-Based Unidirectional Proxy Re-encryption, Department of Computer Science and Engineering, Shanghai Jiao Tong University, Mar. 13, 2010, Shanghai, China.

Madhi Khalesi et al, Towards a Trust-Based Model for Administration of Mailing Lists, Department of Computer Engineering, Iran University of Science and Technology, Tehran, Iran, 2008.

Hirokazu Ougi, ID-base Proxy Cryptography Proxy Cryptographic Scheme in IBE with Applications to Data Storage, The Institute of Electronics, Information and Communication Engineers, Jan. 23-26, 2007, Sasebo, Japan.

Hongbing Wang, et al, A Fully Secure Unidirectional and Multi-use Proxy Re-encryption Scheme, Department of Computer Science and Engineering, Shanghai Jiao Tong University, P. R. China, 2010.

Giuseppe Ateniese, et al, Improved Proxy Re-encryption Schemes with Applications to Secure Distributed Storage, The John Hopkins University, ACM Transactions on Information and System Security, vol. 9, No. 1, Feb. 2006, pp. 1-30, Baltimore, Maryland.

Eric Anderson, et al, Cooperative Policy Control for Peer-to-Peer Data Distribution, University of Oregon Technical Report, Mar. 2010, Oregon.

Sthaphon Uraisin, et al, A Model of a Secure Intelligent Trade Agent, Faculty of Science and Technology, Assumption University of Thailand, 2001, ijcim.th.org.

Himanshu Khurana, et al, Certified Mailing Lists, University of Illinois, Urbana-Champaign, Illinois, 2006, ACM Asia CCS '06.

Steven M. Bellovin, Cryptography and the Internet, AT&T Labs-Research, Aug. 1998, Florham Park, New Jersey.

Lidong Zhou, et al, Distributed Blinding for Distributed ElGamal Re-encryption, Microsoft Research Silicon Valley, Mountain View, California, 2005.

David W. O'Callaghan, et al, Bridging Secure WebCom and European DataGrid Security for Multiple VOs over Multiple Grids, Department of Computer Science, Trinity College, Dublin, Ireland, 2004.

Victoria Ungureanu, A Regulated Approach to Certificate Management, Rutgers University, Newark, New Jersey, 2001.

Debra L. Cook, et al, Conversion and Proxy Functions for Symmetric Key Ciphers, Department of Computer Science, Columbia University, 2005.

Claudia Diaz, et al, Accountable Anonymous Communication, Leuven-Heverlee, Belgium, 2007.

Gelareh Tab An, et al, Towards a Secure and Interoperable DRM Architect, DRM, Oct. 30, 2006, Alexandria, Virginia.

Ravi Chandra Jammalamadaka, et al, iDataGuard: Middleware Providing a Secure Network Drive Interface to Untrusted Internet Data Storage, EDBT, Mar. 25-30, 2008, Nantes, France.

Edna Milgo, A Secure Unidirectional Proxy Re-encryption Using Identity and Secret Key Exchange, ACMSE, Mar. 19-21, 2009, Clemson, SC.

Jian Weng, et al, Efficient Conditional Proxy Re-encryption with Chosen-Ciphertext Security, ISC 2009, LNCS 5735, pp. 151-166, 2009, Springer-Verlag Berlin Heidelberg.

Matthew Burnside, et al, F3ildCrypt: End-to-End Protection of Sensitive Information in Web Services, Department of Computer Science, Columbia University, New York, New York, 2009.

Wakaha Ogata, et al, Fault Tolerant Anonymous Channel, Himeji Institute of Technology.

Pierre Girard, Secure Personalization Using Proxy Cryptography, Smart Card Research and Applications, vol. 1820, vol. 1820, Computer Science, pp. 340-349, Springer-Verlag.

Guo Shanqing, et al, Attribute-Based Re-Encryption Scheme in the Standard Model, Wuhan University, Journal of Natural Sciences, 2008, vol. 13, No. 5, 001-005.

Chun-Ying Huang, et al, A Distributed Key Assignment Protocol for Secure Multicast Based on Proxy Cryptography, Department of Electrical Engineering, National Taiwan University, Taipei, Taiwan.

Himanshu Khurana, et al, From Proxy Encryption Primitives to a Deployable Secure-Mailing-List Solution, National Center for Supercomputing Applications (NCSA), University of Illinois, Urbana-Champaign, Illinois.

Peter Fairbrother, An Improved Construction for Universal Re-encryption, Trowbridge, UK.

Kitae Kim, et al, Remark on Shao et al's bidirectional Proxy Re-signature Scheme in Indocrypt '07, Department of Mathematics, Inha University, 402-751, Republic of Korea.

Chunbo Ma, et al, Group-based Proxy Re-encryption Scheme Secure Against Chosen Ciphertext Attack, Guilin University of Electronic Technology, Jan. 21, 2008, P. R. China.

Matt Blaze, et al, Anonymity in Wireless Broadcast Networks, Computer Science Department, John Hopkins University, Aug. 20, 2007.

Qiang Tang, et al, Inter-domain Identity-based Proxy Re-encryption, Aug. 19, 2008, University of Twente, The Netherlands.

Markus Jakobsson, On Quorum Controlled Asymmetric Proxy Re-encryption, Information Sciences Research Center, Bell Laboratories, Murray Hill, New Jersey.

Debra L. Cook, et al, Conversion Functions for Symmetric Key Ciphers, Department of Computer Science, Columbia University, Dec. 5, 2005, New York, New York.

Himanshu Khurana, et al, SELS: A Secure E-mail List Service, SAC, Mar. 13-17, 2005, Santa Fe, New Mexico.
Himanshu Khurana, et al, Scalable Group Key Management with Partially Trusted Controllers, NCSA, University of Illinois.
Jun Liu, et al, Privacy-Preserving Quick Authentication in Fast Roaming Networks, Department of Computer Science, University of Alabama.
Sameer Ajmani, et al, ConChord: Cooperative SDSI Certificate Storage and Name Resolution, MIT Laboratory for Computer Science, Cambridge, MA.
Xinwen Zhang, et al, Towards Digital Rights Protection in BitTorrent-Like P2P Systems, Computer Science Lab, San Jose, CA.
Changyu Dong, et al, No Shared Keys: Multi-user Searchable Data Encryption, Department of Computing Imperial College London, London, UK.
Yuan Zhou, et al, How to Construct Secure Proxy Cryptosystem, Computer Science, 2005, pp. 150-161, Springer-Verlag.
Benoit Libert, et al, Tracing Malicious Proxies in Proxy Re-Encryption, Computer Science, 2008, pp. 332-353, Springer.
Xuhua Ding, et al, A Secure Authorization Signature System, Department of Computer Science and Engineering, Shanghai Jiao Tong University, Shanghai, PRC.
Benoit Libert, et al, Unidirectional Chosen-Ciphertext Secure Proxy Re-Encryption, Universite Catholique de Louvain, Paris, France.
Matt Blaze, et al, Atomic Proxy Cryptography, AT&T Labs—Research, Nov. 2, 1997, Florham Park, NJ.
Surabhi Mahajan, et al, Security and Privacy in Vanet to Reduce Authentication Overhead for Rapid Roaming Networks, International Journal of Computer Applications, 2010, vol. 1, No. 20.
Luan Ibraimi, An Encryption Scheme for a Secure Policy Updating, Faculty of Electrical Engineering, Mathematics and Computer Science, University of Twente, The Netherlands.
Woo Kwon Koo, et al, Security Vulnerability in a Non-Interactive ID-based Proxy Re-Encryption Scheme, Graduate School of Information Management and Security, Korea University, Seoul, Republic of Korea.
Tie-Yan Li, Time Constraint Delegation for P2P Data Decryption, Infocomm Security Department, Institute for Infocomm Research, Singapore.
Lidong Zhou, et al, Distributed Blinding for ElGamal Re-encryption, Microsoft Research, Jan. 2, 2004, Mountain View, CA.
Michael A. Marsh, et al, Codex: A Robust and Secure Secret Distribution System, Institute for Advanced Computer Studies, University of Maryland.
Raph Levien, et al, Transparent Internet E-mail Security, AT&T Laboratories, Aug. 9, 1996, Murray Hill, NJ.
Ari Juels, et al, A Two-Server, Sealed-bid Auction Protocol, RSA Laboratories, Bedford, MA.
Qiang Tang, Type-based Proxy Re-Encryption and its Construction, Faculty of EWI, University of Twente, The Netherlands.
Qiang Tang, On Using Encryption Techniques to Enhance Sticky Policies Enforcement, DIES, Faculty of EEMCS, University of Twente, The Netherlands.
Florian Kerschbaum, et al, RFID-Based Supply Chain Partner Authentication and Key Agreement, WiSec, Mar. 16-18, 2009, Zurich, Switzerland.
Donald Beaver, Network Security and Storage Security: Symmetries and Symmetry-Breaking, Pittsburgh, PA.
Bin-Tsan Hsieh, et al, Provably Secure Proxy Signature Schemes for Compound Circumstances, National Cheung Kung University, Dec. 2004, Taiwan, Republic of China.
Bing-Chang Chen, Proxy Signature Schemes Based on Factoring and Weil Pairing Under Diverse Circumstances, National Cheung Kung University, Jun. 2004, Taiwan, Republic of China.
Nathan Todd McCrady, The Super Star Cluster Population of the M82 Nuclear Starburst, University of California, Fall 2005, Berkeley, California.
Ritesh Mukherjee, Secure Group Communication, Concordia University, Sep. 2005, Montreal, Quebec, Canada.
Anne V.D.M. Kayem, et al, A Framework for Self-Protectign Cryptographic Key Management, School of Computing, Queen's University, Kingston, Ontario, Canada.
Yang Xiao, Security in Distributed Grid, Mobile, and Pervasive Computing, Taylor & Francis Group, LLC, 2007, Boca Raton, Florida.
Joao Nunes Souza, et al, A Multi-user Key and Data Exchange Protocol to Manage a Secure Database, Faculdade de Computacao, Brazil.
Chun-Ying Huang, et al, Secure Multicast in Dynamic Environments, ScienceDirect, Computer Networks 51 (2007) pp. 2805-2817.
Chunbo Ma, et al, Group-Based Unidirectional Proxy Re-Encryption Scheme, Information Technology Journal 8(1): 83-88, 2009.
Alexandra Boldyreva, et al, Secure Proxy Signature Schemes for Delegation of Signing Rights, College of Computing, Georgia Institute of Technology.
Xu An Wang, et al, On the Role of PKG for Proxy Re-encryption in Identity Based Setting, Key Laboratory of Information and Network Security, Engineering College of Chinese Armed Police Force, PR China.
Giovanni Russello, et al, Providing Data Confidentiality Against Malicious Hosts in Shared Data Spaces, Science of Computer Programming 75 (2010) 426-439.
Chung-Pei Hung, On the Design of Proxy Signatures, National Central University, Taiwan, Republic of China.
Shucheng Yu, et al, Attribute Based Data Sharing with Attribute Revocation, ASIACCS '10 Apr. 13-16, 2010, Beijing, China.
Giovanni Russello, et al, Encrypted Shared Data Spaces, LNCS 5052, pp. 264-279, 2008, Springer-Verlag Berlin.
Changyu Dong, et al, Shared and Searchable Encrypted Data for Untrusted Servers, Department of Computing, Imperial College, Dec. 9, 2009, London, UK.
Matt Blaze, et al, Divertible Protocols and Atomic Proxy Cryptography, AT&T Labs—Research, Florham Park, NJ.
Luan Ibraimi, et al, Exploring Type-and-Identity-Based Proxy Re-encryption Scheme to Securely Manage Personal Health Records, University of Twente, The Netherlands.
Matthew M. Lucas, et al, flyByNight: Mitigating the Privacy Risks of Social Networking, WPES '08, Oct. 27, 2008, Alexandria, Virginia.
Susan Hohenberger, et al, Securely Obfuscating Re-encryption, TCC 2007, LNCS 4392, pp. 233-252.
Rakesh Bobba, et al, Usable Secure Mailing Lists with Untrusted Servers, IDtrust '09, Gaithersburg, MD.
Pedro Souto, Secure Online Data Preservation and Sharing on Untrusted Servers, Jul. 2008, Universidade do Porto, Portugal.
Craig Gentry, Fully Homomorphic Encryption Using Ideal Lattices, STOC '09, May 31-Jun. 2, 2009, Bethesda, Maryland.
Apu Kapadia, et al, Attribute-Based Publishing with Hidden Credentials and Hidden Policies, Dartmouth College, Hanover, NH.
Mariana Raykova, et al, Secure Anonymous Database Search, CCSW '09, Nov. 13, 2009, Chicago, Illinois.
Lidong Zhou, et al, Distributed Blinding for ElGamal Re-encryption, Microsoft Research Silicon Valley, Jan. 2, 2004, Mountain View, CA.
Zhao Yu Chi, et al, The Design and Implementation of a Scalable Secure Multicast System, Concordia University, Aug. 2006, Montreal, Quebec, Canada.

US 8,316,237 B1

SYSTEM AND METHOD FOR SECURE THREE-PARTY COMMUNICATIONS

RELATED APPLICATIONS

The present application is a continuation of U.S. patent application Ser. No. 10/106,138, filed Mar. 25, 2002, now U.S. Pat. No. 7,181,017, which is a continuation of U.S. patent application Ser. No. 11/676,244, filed Feb. 16, 2007, now U.S. Pat. No. 7,869,591, the entirety of each of which is expressly incorporated herein by reference.

FIELD OF THE INVENTION

The present invention relates to the field of secure communications, and more particularly to multiparty communications supporting transactional accounting.

BACKGROUND OF THE INVENTION

Computerized records and database are employed in many industries. Often, the information is made available subject to usage rights limitations. For example, copyright information is generally controlled by the copyright owner, such that copying is controlled or prohibited after publication. In a digital environment, each transmission of the content results in a form of copying, such that a copyright owner cannot impose a strict prohibition on all forms of copying while promoting digital use of the content. Thus, the publisher or content owner seeks to apply rules that provide appropriate compensation. In other instances, the issue is not content, but rather security and privacy. In these cases, the rules limit access based on an authorization, which may be express or implied.

Conceptually, implementation of an economic permission and security permission based access control systems are similar. In fact, security based access control systems often include logs and audit trails, which are similar to the accounting databases associated with economic permission systems. Thus, many issues raised by these systems are similar.

Computer and information system security is currently an important issue. With the proliferation of computers and computer networks into all aspects of business and daily life—entertainment, financial, medical, education, government, and communications—the concern over secure file access and communications privacy is growing.

Publicly accessible secure database systems pose significant security problems. Attempts to achieve high levels of technical invulnerability may lead to practical problems, system weaknesses and security holes. Passwords may be written near access terminals. Security tokens can be stolen or misplaced. Users may share supposedly secret information. Administration capability bypasses normal security protocols. Secure systems may be built on insecure platforms. Therefore, it is desirable to maintain private information in secure format, without relying on trust of any party who does not require access to the private information, up to a point where it is used by the intended recipient of the information.

The liability or risks involved in holding or communicating private information can well exceed the value of the storage or communications services. Therefore, even in the case of a trusted party, indemnification or insurance may be inefficient or insufficient means for addressing these risks or liabilities. Rather, where considerable risk or liability arises from unauthorized disclosure of the information, the storage or communication of the information must involve an efficient scheme that will minimize the risk of disclosure. Therefore, an intermediary in a transaction preferably handles only encrypted data, and need not be trusted to maintain the privacy of the underlying message. While two-party encryption is well known, schemes are not well developed for providing third party involvement, wherein the third party plays a requisite role in the transaction but which need not be trusted with access to the information or the cryptographic key.

A number of communications systems and methods are known for dealing with three-party communications, for example, where a third party provides ancillary services to support the communications, such as authentication, accounting, and key recovery. Often, the nature of these communications protocols places the third party (or group of third parties) in a position of trust, meaning that the third party or parties, without access to additional information, can gain access to private communications or otherwise undermine transactional security or privacy.

Transactions for which third party support may be appropriate include distribution of private medical records, communication of digital content, and anonymous proxy services.

Another aspect of three party communications is that it becomes possible to two (or more) parties to hold portions of a secret or a key to obtain the secret, without any one party alone being able to access the secret. For example, Silvio Micali has developed a mature Fair Encryption scheme in which a number of trustees collaborate to hold portions of a key used to secure privacy of a communication between two principals, but who must act together to gain access to the secret. In Micali's Fair Encryption scheme, however, cooperation of neither of the principal parties to the communication is required in order to access the secret. The third party trustees, as a group, are trusted with a secret. The basis for this trust is an issue of factual investigation. The Micali Fair Encryption scheme does, however, provide a basis for the generation and use of composite asymmetric encryption keys. See, Eyal Kushilevitz, Silvio Micali & Rafael Ostrovsky, "Reducibility and Completeness in Multi-Party Private Computations", Proc. of 35th FOCS, pp. 478-489, 1994, expressly incorporated herein by reference.

The Micali Fair Encryption scheme does not, however, allow communication of a secret in which only one party gains access to the content, and in which the third party or parties and one principal operate only on encrypted or secret information. These system is discussed in further detail below.

See: S. Micali. Fair Public-Key Cryptosystems. Advances in Cryptology—Proceedings of CRYPTO'92 (E. F. Brickell, ed.) Lecture Notes in Computer Science 740, SpringerVerlag (1993) pages 113-138; S Micali, Fair cryptosystems, MIT Technical Report, MIT/LCS/TR-579, November 1993, MIT Laboratory for Computer Science, November 1993.

Encryption Technologies

Encryption technologies, particularly public key encryption systems, seek to minimize some of these weaknesses by reducing the need to share secrets amongst participants to a secure or private communication. Typical public key encryption technologies, however, presume that a pair of communications partners seek to communicate directly between each other, without the optional or mandatory participation of a third party, and, in fact, are designed specifically to exclude third party monitoring. Third parties, however, may offer valuable services to the participants in a communication, but existing protocols for involvement of more than two parties are either inefficient or insecure.

Traditional encryption algorithm schemes rely on use of one or more finite keys which are provided to an algorithm which generates a data string which is apparently random, called pseudorandom, but which can be predicted based on a knowledge of both the algorithm and the key(s), allowing extraction of a superimposed data message. Optimality of an algorithm for a given set of circumstances is based on a number of factors, and therefore many different cryptographic schemes coexist. Essentially, the key should be sufficiently long and stochastic that an extraordinarily long period of time would be necessary to attempt a brute force attack on the algorithm, while only a reasonable amount of time is required to generate keys, encrypt and decrypt messages. In addition, the key should be sufficiently long that observation of pseudorandom (encrypted) datastreams does not permit one to determine the key to the algorithm.

Public Key Encryption is a concept wherein two keys are provided. The keys form a pair, such that a message encrypted with one key of the pair may be decrypted only by the corresponding key, but knowledge of the public key does not impart effective knowledge of the private key. Typically, one of the keys is made public, while the other remains secret, allowing use for both secure communications and authentication. Communications may include use of multiple key pairs, to provide bilateral security. The public key pair may be self-generated, and therefore a user need not transmit the private key. It must, however, be stored.

The basis for Diffie Hellman and RSA-type public key encryption methods is the large disparity in computational complexity between decrypting the public key created cipher text with the public key encryption private key, which is very rapid and simple to do, and working through the possibilities without the key, which takes a very long time through all known means. The systems are theoretically secure because the combination of the public key and the source information generate this theoretically long time to factor the possibilities without requiring the public key encryption private key to be known by the sender.

Modern public-key data encryption was originally suggested by Diffie and Hellman, "New Directions In Cryptography," I.E.E.E. Transactions on Information Theory (November 1976) (the disclosure of which is hereby incorporated by reference), and was further developed by Ronald L. Rivest, Adi Shamir, and Leonard M. Adleman: "A Method for Obtaining Digital Signatures and Public-Key Cryptosystems," Communications of the ACM 21, 2 (February 1978), 120-126 (the disclosure of which is hereby incorporated by reference). See also, U.S. Pat. No. 4,351,982, expressly incorporated herein by reference.

The basic reason for public-key encryption system is to ensure both the security of the information transferred along a data line, and to guarantee the identity of the transmitter and to ensure the inability of a receiver to "forge" a transmission as being one from a subscriber on the data line. Both of these desired results can be accomplished with public-key data encryption without the need to maintain a list of secret keys specific to each subscriber on the data line, and without requiring the periodic physical delivery or the secure electronic transmission of secret keys to the various subscribers on the data line.

According to the Diffie Hellman scheme, two hosts can create and share a secret key without ever communicating the key. Each host receives the "Diffie-Hellman parameters". A prime number, 'p' (larger than 2) and "base", 'g', an integer that is smaller than 'p'. The hosts each secretly generate their own private number, called 'x', which is less than "p−1". The hosts next generate a respective public key, 'y'. They are created with the function: $y=g^x$ Mod p. The two hosts now exchange their respective public keys ('y') and the exchanged numbers are converted into a secret key, 'z' by the following function: $z=y^x$ Mod p. 'z' can now be used as an encryption key in a symmetric encryption scheme. Mathematically, the two hosts should have generated the same value for 'z', since according to mathematical identity theory, $$z=(g^x \bmod p)^{x'} \bmod p=(g^{x'} (\bmod p)^x \bmod p.$$

A method of public-key encryption developed by Rivest, Shamir & Adelman, and now generally referred to as RSA, is based upon the use of two extremely large prime numbers which fulfill the criteria for the "trap-door, one-way permutation." Such a permutation function enables the sender to encrypt the message using a non-secret encryption key, but does not permit an eavesdropper to decrypt the message by crypto-analytic techniques within an acceptably long period of time. This is due to the fact that for a composite number composed of the product of two very large prime numbers, the computational time necessary to factor this composite number is unacceptably long. A brute force attack requires a sequence of putative keys to be tested to determine which, if any, is appropriate. Therefore a brute force attack requires a very large number of iterations. The number of iterations increases geometrically with the key bit size, while the normal decryption generally suffers only an arithmetic-type increase in computational complexity.

In the RSA encryption algorithm, the message (represented by a number M) is multiplied by itself (e) times (called "raising (M) to the power (e)"), and the product is then divided by a modulus (n), leaving the remainder as a ciphertext (C): $C=M^e$ mod n. In the decryption operation, a different exponent, (d) is used to convert the ciphertext back into the plain text: $M=C^d$ mod n. The modulus (n) is a composite number, constructed by multiplying two prime numbers, (p) and (q), together: n=p*q. The encryption and decryption exponents, (d) and (e), are related to each other and the modulus (n) in the following way: $d=e^{-1} \bmod((p-1)(q-1))$. The RSA ciphertext is thus represented by the expression $C=M^e$ mod n. The associated decryption function is $M=C^d$ mod n. Therefore, $M=C^d$ mod n=$(M^e \bmod n)^d$ mod n, indicating that the original message, encrypted with one key, is retrieved as plain text using the other key. To calculate the decryption key, one must know the numbers (p) and (q) (called the factors) used to calculate the modulus (n).

The RSA Algorithm may be divided, then, into three steps: (1) key generation: in which the factors of the modulus (n) (the prime numbers (p) and (q)) are chosen and multiplied together to form (n), an encryption exponent (e) is chosen, and the decryption exponent (d) is calculated using (e), (p), and (q).

(2) encryption: in which the message (M) is raised to the power (e), and then reduced modulo (n).

(3) decryption: in which the ciphertext (C) is raised to the power (d), and then reduced modulo (n). Micali, U.S. Pat. Nos. 6,026,163 and 5,315,658, expressly incorporated herein by reference, teach a number of split key or so-called fair cryptosystems designed to allow a secret key to be distributed to a plurality of trusted entities, such that the encrypted message is protected unless the key portions are divulged by all of the trusted entities. Thus, a secret key may be recovered, through cooperation of a plurality of parties. These methods were applied in three particular fields; law enforcement, business auctions, and financial transactions.

Essentially, the Micali systems provide that the decryption key is split between a number (n) of trusted entities, meeting the following functional criteria: (1) The private key can be reconstructed given knowledge of all n of the pieces held by the plurality of trusted entities; (2) The private key cannot be guessed at all if one only knows less than all (<n−1) of the special pieces; and (3) For i–1, . . . n, the i$^{th}$ special piece can be individually verified to be correct. The special pieces are defined by a simple public algorithm which itself exploits the difficulty in factoring large numbers as a basis for asymmetric security.

Electronic Medical Records

In the field of medical care, accuracy of collected data is of significant importance. Erroneous data, whether collected manually or automatically, presents the possibility of an erroneous diagnosis or treatment. Prior accumulated data about the patient may be relevant to future diagnosis and treatment. Therefore, preservation and availability of accurate medical records remains an important part of the modern health care system.

The art of medical record keeping has developed over centuries of medical practice to provide an accurate account of a patient's medical history. Record keeping in medical practice was developed to help physicians, and other healthcare providers, track and link individual "occurrences" between a patient and a healthcare provider. Each physician/patient encounter may result in a record including notes on the purpose of the visit, the results of physician's examination of the patient, and a record of any drugs prescribed by the physician. If, for example, the patient were referred to another clinic for additional testing, such as a blood analysis, this would form a separate medical encounter, which would also generate information for the medical record.

Over the years, paper medical records have evolved from individual practitioners' informal journals to the current multi-author, medical/legal documents. These paper records serve as the information system on which modern medical practice is based. While the paper-based medical record system has functioned well over many decades of use, it has several shortcomings. First, while a paper-based record system can adequately support individual patient-physician encounters, it is cumbersome to use as a source of pooled data for large-scale analysis. While the medical data in the paper-based records is substantial, the ability to adequately index, store and retrieve information from the paper-based mechanisms prevents efficient analysis of the data. Thus, paper medical records could be a rich source of information for generating new knowledge about patient care, if the data could be accessed on a large scale. Second, each portion of the paper-based record is generated and kept at the site of the medical service. Hence, the total record is fragmented among many sites. Consequently, access by off-site physicians is less than optimal. The inability to access a complete medical record in a short period of time presents problems both for individual care and group care of patients. Thus, electronic medical records (EMRs) have been developed to facilitate storage, retrieval, communication and use of the valuable patient medical history information, both for the particular patient and for studies of patient populations.

While there have been attempts to develop computer database architectures capable of storing and retrieving medical record information which reconcile physicians' desires for maintaining a format of unstructured medical information with database requirements for highly structured data storage, these systems provide an inadequate infrastructure for the efficient transmission, use and security protection of the data.

Medical information poses significant challenges to knowledge management systems. Medical information presently includes file types including various media types, including numeric data, text, scanned text images, scanned graphic images, sound (e.g., phonocardiography and dictation), high resolution images (radiology) and video (ultrasonic imaging and fluoroscopy). The medical records for an individual may, over time, grow to multiple megabytes or even gigabytes of data, and advanced medical techniques promise to increase the volume of available data. These records come from a number of different medical service providers, and may be stored in geographically disparate locations. Often, a new medical service provider will seek to review all appropriate previous medical records for a patient. Further, in third party reimbursement situations, the third party indemnitor will seek to review records in connection with billed services. These various data types and associated information storage systems are not standardized, impeding efficiency of sharing and communicating the data.

Medical records often include data that is intensely personal, including personal data such as sexual habits, drug abuse, psychological disorders, family histories, genetics, terminal diseases, injuries, and the like. This personal information is revealed to, or generated by, treating medical professionals on a presumption of absolute privilege held by the patient. The adoption of electronic medical record systems should not impair this presumption. Thus, while there are legitimate reasons for transmitting medical information files, such transmission must be secure, limited to appropriate circumstances and to authorized recipients.

Indeed, while the private medical information technically cannot be disclosed without the consent of the patient, since at least the time of Hippocrates, the medical institutions that hold this information guard it jealously. Thus, privacy considerations may make it difficult to obtain collaboration between medical institutions in the ongoing treatment of a patient. While there are important legitimate uses for medical data, there is also a substantial possibility for abuse of the data and the associated trust relationship between patient and medical care provider represented therein. Presently, laws and regulations have been promulgated (but not yet effective) regulating electronic medical records.

Typically, in a hospital medical information system, information relating to patients in a database is generated and used by users having a variety of roles, including doctors and medical professionals of various specialties, nurses, therapists of various types, paraprofessionals, social workers, clinical laboratories, and bedside devices (which may automatically generate or receive patient information). In addition, medical information is used, but typically not generated by, pharmacies, administrators, lawyers, insurers or payors, and other parties. Because of the many types of caregivers and other data users, the idea of role-based access is appropriate; basically, medical professionals of different types will require access to various subsets of the medical record. For example, typically the primary care physician and certain consults will require full access.

One scheme for increasing the portability of medical records is to provide personal data storage devices, for example in credit card format optical storage medium. These devices, however, present a security risk, since it cannot be presumed that the patient will be able to provide consent to the use of the information when required; thus, access controls must necessarily be compromised. Further, the information carrier can be lost, unavailable or stolen.

SUMMARY OF THE INVENTION

The present invention provides a system, method and business model for conducting transactions involving private information wherein an intermediary performs a requisite function with respect to the transaction without requiring the intermediary to be trusted with respect to the private information or cryptographic keys for communicated information. This system and method employ secure cryptographic schemes, which reduce the risks and liability for unauthorized disclosure of private information, while maintaining efficient and robust transactions.

The system and method according to the present invention provide a basis for a set of business models, in which the third party accounts for secure data transactions, by maintaining a critical logical function in data communication. Thus, during each such transaction, the intermediary may force or require a financial accounting for the transaction. Further, by exerting this control over the critical function outside the direct communication channel, the intermediary maintains a low communication bandwidth requirement and poses little risk of intrusion on the privacy of the secure communication. Further, the intermediary never possesses sufficient information to unilaterally intercept and decrypt the communication.

The present invention also provides a system and method for providing ancillary services with respect to communicating information. These ancillary services encompass, for example, applying a set of rules governing an information communication transaction. For example, the rules limit access based on recipient authentication, define a financial accounting, role or class of an intended recipient, or establish other limits. These services may also include logging communications or assist in defining communications counterparties. The access control is implemented by an intermediary to the underlying transaction, which facilitates the transaction by removing the necessity for a direct and contemporaneous communication with the equitable holder of a pertinent right for each transaction. The intermediary maintains a set of right-associated rules, over which it may hold legal title. The intermediary serves as a trustee, applying the rules on behalf of the equitable owner of the right. In order to enforce rights-based restrictions, the trustee may hold, associated with the rights information, a key, for example an encryption key, necessary for access or use of the information. This arrangement is termed herein a Virtual Trust, and the intermediary is therefore a termed Virtual Trustee.

According to the present invention, the Virtual Trustee is trusted to implement the rules, but not necessarily trusted with access to, or direct and sole access control over the information. According to a preferred embodiment, the Virtual Trustee, acting alone, cannot access or eavesdrop on the private information or a communication stream including the information. Further, in accordance with the Micali split key escrow scheme, the Virtual Trustee may be implemented as a set of entities, each holding a portion of a required key.

The present invention also provides enhancements to traditional secure communications by providing involvement of a third party, or intermediary, who need not, and preferably does not, have access to the communicated information, while providing transaction-support services between the two parties involved in the communication. According to a further embodiment of the invention, only one party to the communication is privy to the secured information; the host for transmission of the information does not, as a part of the transaction, access the information itself.

Thus, the system according to the present invention provides a conduit for the authorized transmission of records, such as medical records, while maintaining the security of the records against unauthorized access. A preferred communications network is the Internet, a global interconnected set of public access networks, employing standardized protocols. Thus, the records may be transmitted virtually anywhere on earth using a single infrastructure. Alternately, private networks or virtual private networks may be employed. In fact, as the system according to the present invention gains ubiquity, a private network model would be preferred, in order to increase security and allow the system to be tuned to the types of data and quality of service demands made by users.

An embodiment of the present invention involves the implementation and use of a Virtual Trust, wherein an owner of rights in information entrusts the application of a set of rules and/or limitations, to a Virtual Trustee. The Virtual Trustee implements these rules and/or limitations, unless countermanded. One of the rules and/or limitations may be to seek input from the rights owner, if available.

According to one embodiment of the invention, a user provides to the intermediary necessary transactional information relating to private information, in a manner that discloses little or no private information to the intermediary. In like manner, private information may be supplied to a user after the user has supplied necessary transactional information to the intermediary, without in the process disclosing the private information to the intermediary. These techniques may be extended to allow personally identifying information to be removed from a communication by substitution with a non-personally identifying code, supplied by the intermediary. Again, this anonymous process may take place without providing the intermediary with the private information.

In some embodiments, the two principals to the communication remain anonymous with respect to each other, while in other instances, they are known to each other. In the former case, a proxy is provided to avoid divulging the address (e.g., logical or physical address) of the recipient, and, depending on communication protocol, the identity of the sender. The communication channel may remain secure between the two principals, although the proxy becomes trusted with respect to identities of the principals.

The intermediary may, as a matter of course, in the course of its duties, implement a set of rules on behalf of a rights-holder for the information, and indeed communications structures and protocols may be established to force a critical portion of each subject communication to pass through the intermediary.

Different rules may be applied, for example, based on the nature of the information, the role of the recipient, context of the information request, and preferences of a rights-holder of the information.

One embodiment of the present invention encompasses monetary transactions involving the information usage and/or communication. According to one embodiment, digital signatures may be employed in monetary transactions that, after authentication, become anonymous. Thus, according to the present invention, a personally identifying digital signature may be substituted by the intermediary with an anonymous transaction or session identifier. In this case, while the transaction becomes anonymous, it is not necessary for the intermediary to be a direct party to the underlying exchange of value, and thus the intermediary does not necessarily become privy to the exchange details.

In a medical embodiment, for example, a patient may, within the scope of available resources, define rules and procedures for access to his or her own medical records. Thus, the rules defined by a patient or record owner may differ from those imposed by the repository medical institution. A default set of rules may be provided which restricts access to medical professionals who can demonstrate authorization, with disclosure of particular transactional records limited according to the requestor's role or other set of rules. As trustee or agent for the patient, the intermediary may also implement more or less restrictive rules as defined by the patient, and release records accordingly. The intermediary may also implement a set of rules defined by the respective custodian medical institution in connection with its own internal processing or communications.

Presently, medical records typically include information that is integral with a physical embodiment. For example radiological records are integrated into the film. The original medical record, embodied in its physical manifestation, is "owned" by the originating institution or provider, subject to access control and copying requests by the patient. See, DeWitt et al, "Patient Information and Confidentiality", Treatise on Health Care Law, 16.01[3] (Kaufman et al., Eds., 1998). However, as electronic medical records gain prominence, and the physical manifestation of the medical records is transformed into information stored in a computer storage device, the medical record may ultimately be considered property of the patient, subject to retention of a non-distributable (or otherwise subject to limited rights) copy by the originating institution or provider. The present invention therefore provides a system through which a patient may exert various incidents of ownership over the electronic medical record, including access control, copying, retention, and accounting therefore. According to the present invention, this control may be exercised by entrusting the encryption key(s) for the electronic medical record with an intermediary, who acts under the direction and authority of the patient. According to the present invention, the security and privacy scheme of the present invention may be employed to convey content to users while ensuring compensation for rights-holders in the content.

According to the present invention, an architecture is provided which allows accounting and implementation of various rules and limits on communications between two parties. Further, an intermediary becomes a necessary part of the negotiation for communication, and thus has opportunity to apply the rules and limits.

Traditionally, medical records maintenance and upkeep have imposed a significant cost and burden. While enterprises have evolved for outsourcing of certain functions, these enterprises have not particularly represented the interests of the patient, and rather serve as agents for the medical record custodian.

According to one embodiment of the present invention, each use of a record may trigger an accounting/audit event, thus allowing finely granular transactional records, that may reduce the risks of security and privacy breach in connection with record transmission. Importantly, the present invention allows usage based financial accounting for the information, imposing a financial burden according to a value and/or consumption of system resources. For example, the cost to a user could be a flat fee, depend on a number of factors, be automatically calculated, or relate to volume of usage.

In establishing a secure communications session between the user and the intermediary, it may be useful in some circumstances to employ a challenge-response authentication scheme, for example by passing messages back and forth between the user and the intermediary, the user and the data repository, or the data repository and the intermediary.

According to the present invention, the user's "role" may be checked for consistency with a set of role-based usage rules. The reported role may be accepted, or verified with resort to an authentication database. Based on the role of the user and the identification of the content, the authority of the user to receive records may be determined.

In one embodiment, a user is required to identify the specific records sought, and therefore the authorization matrix representing correspondence of record content and user role may be associated with each record, and verified by the data repository as a part of a local authentication process prior to transmitting any portion of a record. Thus, the matrix may represent a metadata format describing the content of the record and the level or type of authority of the User to access that record. This metadata may, of course, itself be privileged information.

In the event that the distribution of metadata or its application at a site is impermissible, a separate metadata processing facility may be provided. This facility may process the metadata in an anonymous index format, thus reducing or eliminating the risks or a privacy or security breach. The user authority matrix may be protected using the composite session key format according to the present invention, and therefore made secure even from the intermediary, which, in this case, may communicate the authority matrix and transactional request details to the metadata processing facility using a composite of a User session key and a Metadata session key. The results of the authorization may be transmitted directly from the metadata processing facility directly to the data repository, in the form of a prefiltered specific record request. The Intermediary may account for the transaction either on a request-made basis, or communicate accounting information with the data repository, for example to properly exchange required keys and complete the transaction.

The record indices may thus be maintained by entities privy to the private information, with results returned to the user, without requiring any disclosure to the intermediary, or by entities insulated from an association between a complete identification of the metadata and the content thereof. Preferably, the index entry for a record includes an identification of the location of the content record and a set of access rules, which are, for example, role based. Alternately, the intermediary may maintain the index locally and apply the respective rules.

The role-based access rules are generally defined automatically based on contextual and circumstantial data. Manual rules and edits may also be supported. Typically, a hierarchy is defined of data sensitivity, with the most sensitive data provided with the highest level of restrictions. Typically, primary care providers have the highest level of access, while paraprofessionals and other support personnel have data on a context-dependent requirements basis only. Further, non-professionals may be provided with data on a need-to-know basis only.

Other medical personnel have access to the record based on context and role. For example, a respiratory therapist might require access to pulmonary and central vascular history records, as well as to abstracts of acute medical information, current pharmaceutical information, scheduling (e.g., for inpatient care), and specific notes directed to the therapist, individually or as a part of a treatment group.

Thus, a past history of depression (resolved) in a patient admitted for a kidney stone would likely be communicated only to the primary care physician and psychiatric treating professional, if any. Possibly, this data would be communicated to a pain management professional, if the past history of depression had a pharmacological or drug abuse component. A surgical consultant, however, may be provided with the entire record. This data may also be deemed contextually irrelevant to the acute treatment.

For example, a treating physician, an oncologist, may seek, on behalf of a lung cancer patient, all radiologic studies of the chest over the past three months, as well as non-radiologic hospitalization records over the past three years and summary notes of other medical or surgical consultations or treatments over three years. The request, as well as a role-based identification of the oncologist, are relayed to the Intermediary, which may process this data internally, or relay it to a separate entity for processing. In the latter case, the information may be completely blinded, according to the present invention, from the Intermediary. Initially, the instructions of the patient are recalled from a database, to indicate any specific or general restrictions placed on the release of data. An exemplary role-based access authentication would determine that a primary treating oncologist is indeed authorized to receive radiological (chest) and recent hospitalization records. Further, the indices for the medical summary notes could be screened for pertinence criteria. Thus, information relating to a drug abuse rehabilitation center visit might be restricted upon request of the patient to mental health professionals. In this case, such private information could be screened from the oncologist, likely with some indication of the restriction, allowing the oncologist to subsequently request authorization from the patient. If, on the other hand, the requesting professional was a nurse, the indication of restricted information might not appear, since this indication itself might be deemed a disclosure and the apparent need is lower.

In order to provide further security for the records and the use of the system, various techniques are available. For example, dummy content records may be added to the database and index therefore. Any access of these records is presumably based on an attempt for unauthorized access. Thus, the existence of these records, with access tracking, allows detection of some unauthorized uses of the system. Another method of securing the system is the use of steganographic techniques, for example embedding watermarks in audio and images, pseudorandom dot patterns in scanned page images, random insertion of spaces between words, formatting information, or the like, in text records. Therefore, records obtained through the system may be identified by their characteristic markings. In fact, every authorized record may be subjected to a different set of markings, allowing a record to be tracked from original authorized access to ultimate disposition. An explicit bar code, watermark or other type of code may also be provided on the document for this purpose. It is noted that such markings cannot be implemented at the point of transmission on encrypted data, and thus this type of security requires access to the raw content. However, this may be implemented at the point of decryption, which may be in a sufficiently secure environment. For example, a secure applet may be provided, employing a securely delivered session key, which processes records to test for existing watermarks and to add or substitute a new watermark. Thus, the present invention provides a system for the decryption and watermarking of data, in a content (or content type)-specific manner. An online handshaking event may occur on decryption, to provide confirmation of the process, and indeed may also authenticate the user of the system during decryption.

According to the present invention, asymmetric key encryption may be employed to provide the establishment of secure communications channels involving an intermediary, without making the intermediary privy to the decryption key or the message. Thus, by transmitting only relatively unprivileged information, such as respective public keys, the information and integrity of the system remains fairly secure.

In order to provide a three party transaction in which the intermediary is a necessary party, the information sought to be transmitted is subjected to a secret incomprehension function (e.g., a cryptographic or steganographic function) with the key known only to the intermediary.

In establishing the communication channel, the information is transcoded between a first comprehension function and a second comprehension function without ever being publicly available.

Modulo arithmetic is both additive and multiplicative, thus, using the same modulo n:

$$(A^x \bmod n \cdot A^y \bmod n) \bmod n = A^{x+y} \bmod n;$$

$$((A) \bmod n + (B) \bmod n) + \bmod n = (A+B) \bmod n.$$

$$((A) \bmod n \cdot (B) \bmod n) \bmod n = (A \cdot B) \bmod n.$$

$$(A^x \bmod n)^y \bmod n = (A^y \bmod n)^x \bmod n = A^{xy} \bmod n$$

A preferred algorithm according to the present invention relies on the multiplicative property of modulo arithmetic; in other words, A mod B*C mod B=(A*C)mod B. However, this property is not "reversible", in that knowledge of (A*C)mod B and either A or C does not yield the other, unless the product A*C is less than B, since the modulo function always limits the operand to be less than the modulus value.

Thus, it is seen that in an RSA scheme, $M=C^d \bmod n=(M^e \bmod n)^d \bmod n$. Therefore, in order to communicate the intermediary private information to the intended recipient, the recipient public key 'e1' and intermediary private key 'd2' are defined using the same modulus n, multiplied, and provided to the sender. At the sender, the ciphertext $C2=M^{e2}$ Mod n, previously encrypted with the intermediary's public key e2, is subjected to the function: $C1=C2^{d2 e1} \bmod n = M^{e1} \bmod n$. The recipient may then apply its private key d1 do decrypt the message: $M=C1^{d1} \bmod n$.

It should be understood that the algorithm described herein represents merely a portion of an RSA-type public key infrastructure, and that generally all known techniques for preparing the message, maintaining a public key directory, and the like, may be employed in conjunction therewith, to the extent not inconsistent. Thus, the transcoding algorithm should be considered as a generally interchangeable part of the entire cryptographic system, which may be substituted in various known techniques, to achieve the advantages recited herein. In general, only small changes will be necessary to the systems, for example, accommodating the larger composite key length. It is also particularly noted that there are a number of known barriers to exploits that are advantageously employed to improve and maintain the security of the present system and method.

See, David Chaum, "Blind Signatures for Untraceable Payments", Proceedings of Crypto 82, August 1982, p. 199-203. According to the Chaum scheme, a server assists a user in decrypting a message without releasing its secret key or gaining access to the encrypted message. The user communicates a symmetric function of the ciphertext to the server, which is then processed with the secret key, and the resulting modified ciphertext returned to the user for application of an inverse to the symmetric function. See, U.S. Pat. No. 6,192,472, expressly incorporated herein by reference. This technique, however, requires a communication of the complete message in various encrypted forms to and from the server, a potentially burdensome and inefficient task, and is not adapted to communicate a secret file from a first party to a second party.

Various processors, and associated memory and network interface systems, are well known and available for use in conjunction with embodiments herein. For example, Garay, et al, U.S. Pat. No. 6,192,472, incorporated by reference supra, provides:

We model the communication among the servers by a completely connected graph of authenticated links. For the purpose of this description, we also assume a point-to-point communication link between each of the users and every server. The servers V are connected in a network, which may be an intranet (e.g., LAN, WAN, etc.) or the Internet. In its preferred form, it is contemplated that the invention will be implemented on the World Wide Web (WWW). In such an environment, authenticated communication can be realized through, for example, SSL. Similarly, point-to-point communication can be realized in various ways, and not necessarily through a direct connection.

In a specific implementation of the invention, the servers may be IBM RS/6000 servers running the AIX operating system (IBM's version of the UNIX operating system), but these servers may also be mini-computers, such as IBM's AS/4000 computers, or mainframe computers, such as IBM's ES/9000 enterprise series computers. Other comparable computers of various other manufactures may be used as well. Secure point-to-point connections between servers may be provided by the Internet secure protocol IPSec.

* * *

Specific Implementation

The storage system is composed by five servers, which we denote as $V_1 \ldots V_5$. These are high-end RS/6000 computer systems running the AIX operating system. These computer systems have large storage capabilities and high-performance features. We assume that at most two of these servers can be corrupted (i.e., malfunctioning in any way) at any time.

The servers are connected by a secure point-to-point network; that is, messages exchanged by two servers cannot be read or modified by anybody. Such secure channels can be implemented either physically or via cryptographic techniques.

The storage system (which we denote in its entirety with V) is accessible to the users. A user U runs some software on a low-end machine (like a personal computer (PC)) using a World Wide Web (WWW) interface. Communication between U and V is via the Internet. We require such communication also to be secure. This can be achieved via protocols for secure transmission of information over the Internet, such as SSL.

Arnold, U.S. Pat. No. 5,956,408, incorporated by reference infra, states:

Many computer products and peripherals now have their own intelligence, separate from the computer itself, in the form of integrated microprocessors. These microprocessors use stored programs to provide some part of the device's function. For example, the IBM 4755 Cryptographic Adapter is a device which includes a microprocessor, memory, and programming logic mounted on a printed circuit board. Functions are housed within a tamper-resistant module, or secured area, for protection, such as that discussed more fully in U.S. Pat. No. 5,027,397, which is specifically incorporated herein by reference. The IBM 4755 is a component of the IBM Transaction Security System, discussed in the IBM publication entitled "Transaction Security System: General Information Manual and Planning Guide" (GA34-2137-0), U.S. Pat. No. 5,048,085, and U.S. Pat. No. 5,148,481, which are specifically incorporated herein by reference.

Typically, two kinds of memory are associated with these microprocessors: permanent (unalterable or nonvolatile) memory for the program; and volatile memory for data used by the program. Permanent memory is typically Read Only Memory (ROM), Programmable Read Only Memory (PROM), or Erasable Programmable Read Only Memory (EPROM). Volatile memory is typically a static or dynamic Random Access Memory (RAM), which loses all stored data when power is removed.

Newer technologies allow the designer to use memory which is nonvolatile, but reprogrammable. That is, memory in which the data can be changed, but the contents are retained when the power is off. Several technologies can be used to obtain these characteristics. Flash EPROM (FEPROM) permits areas of memory to be erased electronically and then reprogrammed. Electrically Erasable PROM (EEPROM) permits individual bytes or bits to be rewritten much like RAM memory. Complementary Metal-Oxide Semiconductor (CMOS) RAM with battery back-up uses little power and retains RAM contents when system power is off.

Ginter et al., U.S. Pat. No. 5,982,891 discloses:

Secure Processing Unit (SPU)

The "VDE participants" may each have an "electronic appliance." The appliance may be or contain a computer. The appliances may communicate over the electronic highway 108. FIG. 6 shows a secure processing unit ("SPU") 500 portion of the "electronic appliance" used in this example by each VDE participant. SPU 500 processes information in a secure processing environment 503, and stores important information securely. SPU 500 may be emulated by software operating in a host electronic appliance.

SPU 500 is enclosed within and protected by a "tamper resistant security barrier" 502. Security barrier 502 separates the secure environment 503 from the rest of the world. It prevents information and processes within the secure environment 503 from being observed, interfered with and leaving except under appropriate secure conditions. Barrier 502 also controls external access to secure resources, processes and information within SPU 500. In one example, tamper resistant security barrier 502 is formed by security features such as "encryption," and hardware that detects tampering and/or destroys sensitive information within secure environment 503 when tampering is detected.

SPU 500 in this example is an integrated circuit ("IC") "chip" 504 including "hardware" 506 and "firmware" 508. SPU 500 connects to the rest of the electronic appliance through an "appliance link" 510. SPU "firmware" 508 in this example is "software" such as a "computer program(s)" "embedded" within chip 504. Firmware 508 makes the hardware 506 work. Hardware 506 preferably contains a processor to perform instructions specified by firmware 508. "Hardware" 506 also contains long-term and short-term memories to store information securely so it can't be tampered with. SPU 500 may also have a protected clock/calendar used for timing events. The SPU hardware 506 in this example may include special purpose electronic circuits that are specially designed to perform certain processes (such as "encryption" and "decryption") rapidly and efficiently.

The particular context in which SPU 500 is being used will determine how much processing capabilities SPU 500 should have. SPU hardware 506, in this example, provides at least enough processing capabilities to support the secure parts of processes shown in FIG. 3. In some contexts, the functions of SPU 500 may be increased so the SPU can perform all the electronic appliance processing, and can be incorporated into a general purpose processor. In other contexts, SPU 500 may work along-side a general purpose processor, and therefore only needs to have enough processing capabilities to handle secure processes.

VDE Electronic Appliance and "Rights Operating System"

FIG. 7 shows an example of an electronic appliance 600 including SPU 500. Electronic appliance 600 may be practically any kind of electrical or electronic device, such as: a computer; a T.V. "set top" control box; a pager; a telephone; a sound system; a video reproduction system; a video game player; a "smart" credit card;

Electronic appliance 600 in this example may include a keyboard or keypad 612, a voice recognizer 613, and a display 614. A human user can input commands through keyboard 612 and/or voice recognizer 613, and may view information on display 614. Appliance 600 may communicate with the outside world through any of the connections/devices normally used within an electronic appliance. The connections/devices shown along the bottom of the drawing are examples: a "modem" 618 or other telecommunications link; a CD ROM disk 620 or other storage medium or device; a printer 622; broadcast reception 624; a document scanner 626; and a "cable" 628 connecting the appliance with a "network."

* * *

Electronic Appliance 600

An electronic appliance 600 provided by the preferred embodiment may, for example, be any electronic apparatus that contains one or more microprocessors and/or microcontrollers and/or other devices which perform logical and/or mathematical calculations. This may include computers; computer terminals; device controllers for use with computers; peripheral devices for use with computers; digital display devices; televisions; video and audio/video projection systems; channel selectors and/or decoders for use with broadcast and/or cable transmissions; remote control devices; video and/or audio recorders; media players including compact disc players, videodisc players and tape players; audio and/or video amplifiers; virtual reality machines; electronic game players; multimedia players; radios; telephones; videophones; facsimile machines; robots; numerically controlled machines including machine tools and the like; and other devices containing one or more microcomputers and/or microcontrollers and/or other CPUs, including those not yet in existence.

FIG. 8 shows an example of an electronic appliance 600. This example of electronic appliance 600 includes a system bus 653. In this example, one or more conventional general purpose central processing units ("CPUs") 654 are connected to bus 653. Bus 653 connects CPU(s) 654 to RAM 656, ROM 658, and I/O controller 660. One or more SPUs 500 may also be connected to system bus 653. System bus 653 may permit SPU(s) 500 to communicate with CPU(s) 654, and also may allow both the CPU(s) and the SPU(s) to communicate (e.g., over shared address and data lines) with RAM 656, ROM 658 and I/O controller 660. A power supply 659 may provide power to SPU 500, CPU 654 and the other system components shown.

In the example shown, I/O controller 660 is connected to secondary storage device 652, a keyboard/display 612, 614, a communications controller 666, and a backup storage device 668. Backup storage device 668 may, for example, store information on mass media such as a tape 670, a floppy disk, a removable memory card, etc. Communications controller 666 may allow electronic appliance 600 to communicate with other electronic appliances via network 672 or other telecommunications links. Different electronic appliances 600 may interoperate even if they use different CPUs and different instances of ROS 602, so long as they typically use compatible communication protocols and/or security methods. In this example, I/O controller 660 permits CPU 654 and SPU 500 to read from and write to secondary storage 662, keyboard/display 612, 614, communications controller 666, and backup storage device 668.

Secondary storage 662 may comprise the same one or more non-secure secondary storage devices (such as a magnetic disk and a CD-ROM drive as one example) that electronic appliance 600 uses for general secondary storage functions. In some implementations, part or all of secondary storage 652 may comprise a secondary storage device(s) that is physically enclosed within a secure enclosure. However, since it may not be practical or cost-effective to physically secure secondary storage 652 in many implementations, secondary storage 652 may be used to store information in a secure manner by encrypting information before storing it in secondary storage 652. If information is encrypted before it is stored, physical access to secondary storage 652 or its contents does not readily reveal or compromise the information.

Secondary storage 652 in this example stores code and data used by CPU 654 and/or SPU 500 to control the overall operation of electronic appliance 600. For example, FIG. 8 shows that "Rights Operating System" ("ROS") 602 (including a portion 604 of ROS that provides VDE functions and a portion 606 that provides other OS functions) shown in FIG. 7 may be stored on secondary storage 652. Secondary storage 652 may also store one or more VDE objects 300. FIG. 8 also shows that the secure files 610 shown in FIG. 7 may be stored on secondary storage 652 in the form of a "secure database" or management file system 610. This secure database 610 may store and organize information used by ROS 602 to perform VDE functions 604. Thus, the code that is executed to perform VDE and other OS functions 604, 606, and secure files 610 (as well as VDE objects 300) associated with those functions may be stored in secondary storage 652. Secondary storage 652 may also store "other information" 673 such as, for example, information used by other operating system functions 606 for task management, non-VDE files, etc. Portions of the elements indicated in secondary storage 652 may also be stored in ROM 658, so long as those elements do not require changes (except when ROM 658 is replaced). Portions of ROS 602 in particular may desirably be included in ROM 658 (e.g., "bootstrap" routines, POST routines, etc. for use in establishing an operating environment for electronic appliance 600 when power is applied).

FIG. 8 shows that secondary storage 652 may also be used to store code ("application programs") providing user application(s) 608 shown in FIG. 7. FIG. 8 shows that there may be two general types of application programs 608: "VDE aware" applications 608a, and Non-VDE aware applications 608b. VDE aware applications 608a may have been at least in part designed specifically with VDE 100 in mind to access and take detailed advantage of VDE functions 604. Because of the "transparency" features of ROS 602, non-VDE aware applications 608b (e.g., applications not specifically designed for VDE 100) can also access and take advantage of VDE functions 604.

According to an embodiment of the present invention, a source privy to the communication employs a public key encryption paradigm to require that for comprehension of an encrypted message, at least two keys are required, with all of the predefined keys being required to decrypt the message, and with no apparent relation between the keys, making prediction of one key part difficult or impossible based on the corresponding other key part(s) and the ciphertext message. Thus, at least three parties must cooperate to transmit a message, the sender, the recipient, and a third party holding a necessary key part. This results in an ability to audit and log communications without giving access to confidential information to the auditor. This also facilitates economic transactions, since the communication of the missing key information provides an opportunity for a mandatory third party accounting.

According to the present invention, the holders of key parts are not equal parties to the transaction. Rather, one party acts as the intended recipient, who must "procure" the remaining private key parts in order to use the information. This procedure allows the entity that transmits the information to be assured that the transmission will be secure, even with respect to a trusted third party, while ensuring that the intended recipient must cooperate with the intended third party. For example, the third party receives a fee or other value for this interaction, and is able to log the identity of the intended recipient and time of the transaction. In many instances, for example access to medical information, this allows a third party to authenticate information requests, apply access rules, and log transactions, on behalf of patients or medical institutions, without itself handling the sensitive information. The health care institution, on the other hand, can achieve compliance with regulations protecting the privacy of medical records while providing portability thereof, without increasing its staff or breaching security protocols. Patients, meanwhile, employ a third party for authenticating requests for medical information, logging access, and implementing various rules and limitations.

Using this scheme, the original ciphertext encryption key and recipient private key need never be disclosed, and thus may each be retained for use over an extended period. The session encryption key, however, will vary with each message.

It is noted that, since the intermediary holds the decryption key for the record, it may, in exceptional circumstances and in cooperation with the repository, decrypt the plaintext message. Therefore, it is seen that, even if a user fails to meet all access rules (one of which may be, for example, the express consent of the patient), the desired information is not lost, locked or completely unavailable. Rather, the trustee may be given the discretion to release the records or to request release of the records during an emergency.

The present system thus may be used in a number of areas. For example, it may be used to transmit confidential medical records through a public network. The (not yet effective) regulations issued pursuant to the Health Insurance Portability and Accountability Act (HIPAA) require that patient medical information be securely transmitted, that access be logged, and that the identity of the recipient be authenticated. However, while secure transmission is relatively easy to perform using modern computing architectures, the logging and authentication require a substantial infrastructure and overhead to maintain. Many institutions would be quite burdened by supporting such potentially labor intensive and infrastructure intensive obligations. Therefore, the present system allows secure access to an institutional database, with the logging and authentication potentially outsourced, to an intermediary. The outside organization, in this case, implements the required security protocols to assure patient data confidentiality both inside and outside the medical institution. The data repository for the medical information may encompass only encrypted information, and therefore implementing an appropriate communications firewall for controlling public access of the database is facilitated.

A trusted entity may provide for controlling external access to an institutional database; however, this trusted entity may also control internal access and logging in like manner. In like manner, the trusted entity may also perform inter-institutional functions, for example where portions of a patient medical record are housed in various institutions. According to the present invention, the degree of trust required of an intermediary may be less than that required of either a key escrow agent or a repository with complete access to the private information. While the intermediary entity may have access to certain tertiary medical record information, such as the existence of records and identity of those accessing the records, the primary records may remain secret, even with respect to this intermediary entity. The intermediary system may incorporate a directory of patient records, assisting an authorized user in obtaining various records.

It is noted that, while medical records are retained by a custodial institution, the corresponding patient retains important rights therein. Thus, the present system may be expanded to provide the patient with a key portion, which is also required for access to the records. In this case, since the patient's consent will not always be available in a timely manner when the record is needed, a key escrow or key recovery scheme may be implemented for this key portion. This may be implemented in known manner, but preferably it is maintained by the trusted entity, since this will make any such recovery transaction more efficient.

In order to increase portability, physical records, especially archives, may be stored physically or logically outside the source institution. Thus, limitations of access and bandwidth imposed by a public network gateway for an institution do not impede information transfer. Authorizations, as distinct from the information sought to be communicated, are verified on-line, and may involve access to the source institution, but typically command substantially lower bandwidth requirements.

Current medical records are subject to at least two important controls exerted by the patient: The patient can restrict access to the record, and the patient may demand access and a copy of the record. These two rights, together very much define a type of property interest. Since the trusted entity acts as a gatekeeper to the records, it may also act as an agent or trustee for the patient, exercising access rules and the like, by way of the required keys. Thus, it may be considered that the key(s) and possibly other data held by the trusted entity is in trust for the patient. The intermediary may adopt a business model either directed to serving the needs of the medical institution(s), the patients, or both.

The trust model for the access privileges allows the trustee leeway under existing legal principles to act on behalf of the beneficiary (in accordance with the authority granted at the time the trust was created or in effect at the time of the access request), who in the case of medical records is the patient. Further, it provides a framework in which courts may provide guidance and/or mandate to the trustee. Thus, in contrast to a typical contractual relationship, the trustee of the access rights to the medical records stands in a different position than a mere party to a contract.

In alliance with this trust model, the intermediary is in a unique position to act as a health care proxy and an executor of a living will for patients. In this model, the patient provides a living will or other instructions to the intermediary. When the patient is unavailable and a decision must be made, the intermediary can search its database for a most current instruction or rule authorized by the patient, and provide an authenticated communication to the health care provider communicating the patient's wishes. For this service, the intermediary may charge a fee, for example a yearly maintenance fee, a per transaction fee, and/or statutory or court-awarded fees.

A potentially significant use of existing medical records is in conjunction with a data mining system. This is because it is generally considered quite expensive to capture medical records, remove patient-specific identification, and place the resulting anonymous records in a database. On the other hand, as the use of electronic medical records and intelligent means for extracting anonymous data from medical records grows, this data will become more accessible. The present system provides an infrastructure for amassing, maintaining and exploiting the value of this data. Thus, by filtering data, obtaining filtered data, or hosting an index to anonymous data, the present intermediary provides a resource to facilitate use of medical data. For example, third party payors may seek to determine the standard of care or best practices for a given patient, in the context of authorization of payment for a procedure. Likewise, a health care professional may seek to determine a patient prognosis. By providing an accessible system that links data for a specific patient, with anonymous data for a plurality of patients with potentially similar medical issues, significant efficiencies may result. Such a system including anonymous data could be established separately from the private medical record database system. The intermediary system according to the present invention may provide authentication and accounting system for the use of such anonymous data, as well.

The intermediary may be compensated by the user, which must negotiate to obtain the required key(s), or otherwise gain access to intermediary internal databases, by the medical institution, which outsources the burdens of administering access to its medical records, by the patient or by a third party payor, who ultimately benefits from the use of the records, or a combination or subcombination thereof. The data repository may also compensate the intermediary for the access services.

Another application for the intermediary system for distributing the encryption key lies in the entertainment industry. In particular, many forms of entertainment, including music, videos, and the like, involve massive data files, ranging from 500 kB to multiple gigabytes of data. One solution proposed for the delivery of such data streams is called a peer-to-peer architecture, wherein the hosting of information is distributed over the population of users of the information. Thus, any user seeking information can communicate with another user (or a set of users) seeking to transfer the information. Since the Internet provides a highly redundant and distributed communications network, the capacity of the network is large and the incremental cost of adding a new work to the distributed database is low.

However, typically, the owners of entertainment works seek to maintain control over use of the works and seek to receive compensation for their transfer and/or use. Therefore, the present system allows the work to be locked or encrypted, wherein the owner of the work or its agent serves as a third party to the communication, and provides the recipient with a dedicated decryption key for use of the work upon accounting therefore. Thus, the recipient is not dependent on a single connection to a host server to obtain the work, and the owner of the work need not invest in maintaining massive file server. This reduces the transaction and infrastructure costs to the owner, which are generally a high percentage of the overall costs in the delivery of electronic media programs. The system may also provide compensation to the host (repository) for allowing use of its resources.

The system operates as follows. Each user is provided with a customized application that manages local files. Each local file is registered with an external server. A user seeking to obtain a copy of a file queries the external server to find appropriate copies residing on the network. Either automatically or manually, the requesting user initiates a transfer of the file through a communications link from another "peer" user. This communication is encrypted, so that no eavesdropper can misappropriate the file, and the intended recipient accounts for its receipt. The decryption key is defined such that a portion is dependent on the identity of the recipient, and a portion provided by or on behalf of the owner of the content. This latter key portion is typically provided only after an accounting, such as a payment for the use of the file. The host for the file encrypts the file using a public key or set of public keys for the recipient and owner. These keys, of course, may be the respective trustee keys defined by Micali, or according to another appropriate encryption scheme. The host for the content may be compensated for use of its system, thus encouraging use within the rules of the system, rather than circumventing the system.

According to one embodiment, in order to prevent users from circumventing the system, the user's public key, and/or the owner's key, may also be embedded as part of a watermark or embedded signal that must match a user's access system. When the embedded data matches, the system operates normally. In the case of a mismatch, it will not operate. The application software at the host converts the embedded signal between that user's and the new user's. In order to prevent circumvention, each user system may periodically report to the intermediary its own "serial number" and possibly the file usage. A user credit card or other financial guaranty may also be obtained to automatically compensate for any usage.

The present invention allows for the distribution of data from a repository, which does not require the repository to be trusted with the data. Thus, encrypted data may be transmitted, replicated, and cached to the benefit of an owner of rights in the data, since the data is not usable without an encryption key. Such data may be, for example, consumer media or multimedia works, which advantageously are subject to caching by edge servers for efficient utilization. According to the present invention, and in contrast with prior methods, in order for a data record to be used, a separate accounting and authentication transaction is required, and the data record transmitted to the user is presented in a format that requires a custom-generated cryptographic key. Thus, the data remains secure during archival storage and transmission. In order to limit the ability of an authorized recipient from retransmitting the record data, the data may be "fingerprinted" or watermarked to the user or its computing hardware based on the transcription operation at the data repository (or remote key handler, if present). This fingerprinting allows either tracking of unauthorized transmission, or preventing the use of the record data on different systems or by different users.

As used herein, the phrase "comprehension functions" encompasses both cryptography and steganography. Thus, secret information is required in each case in order to comprehend certain information. In the former case, the information is scrambled, and must be decrypted, while in the later case, it is hidden, and must be located. It is, of course, possible to combine the techniques and employ hidden and scrambled messages. it is also noted that, in some instances, it is not necessary to apply a comprehension function to all of a the information in a message. For example, in the case of medical data, it is often the maintenance of security of personally identifying aspects that is sought. Therefore, often only the personally identifying information needs to be selectively obscured. Likewise, in the case of entertainment media, it is possible to selectively degrade the information by selecting only a portion of the media information to selectively obscure, which makes the resulting information significantly less valuable. By selectively applying such a comprehension function only to a portion of the information, substantial computational resources may be conserved or spared.

According to another embodiment of the invention, the transcription scheme according to the present invention may be employed to securely communicate cryptographic codes between parties to a communication, for example a symmetric encryption key. For example, the Advanced Encryption Standard (AES) employs the Rijndael algorithm, which may provide high efficiency encryption and decryption. Thus, the asymmetric key encryption may be directed principally toward key exchange.

According to another embodiment of the invention, an encrypted message (ciphertext) is "transcoded" from a first encryption type to a second encryption type, without ever passing through a state where it exists as a plaintext message. Thus, for example, an intermediary to the transaction who negotiates the transaction, need not be privileged to the information transferred during the transaction. In the case of medical records, therefore, this means that the intermediary need not be "trusted" with respect to this information.

A preferred embodiment of the invention provides composite key asymmetric cryptographic algorithms to, among other advantages, avoid revealing a plaintext message during intermediate processing. However, it is also possible to employ symmetric key cryptography, especially since the remote key handler is a privileged environment, and may be provided with sufficient security to abate the risk of message disclosure. Further, in some embodiments, the system risks attendant in releasing both the permanent encryption key along with the ciphertext are insubstantial, and therefore a transcoding or transcription process is not required. These various embodiments are encompassed by the present invention.

As an example of the algorithm according to the present invention, p=61 and q=53, n=pq=3233.

$(e*d) = 1 \mod((p-1)(q-1))$ choosing e1=23 results in d1=407;
choosing e2=101, d2=1421.

Selecting an arbitrary message text 1111, the function $C=M^{e1 \cdot d2}$ mod n results in the equation:

$C(1111)^{23*1421} \mod(3233) = 2758 \mod(3233).$

To invert this encryption with ciphertext 2758, $M=C^{e2 \cdot d1}$ mod n, resulting in the equation:

$M = (2758)^{101*407} \mod(3233) = 1111.$

Thus, it is seen that the algorithm according to the present invention is operative to encrypt and decrypt the message, with a composite key that is relatively large, and thus difficult to determine the respective factors.

DETAILED DESCRIPTION OF THE PREFERRED EMBODIMENTS

Figure 1:
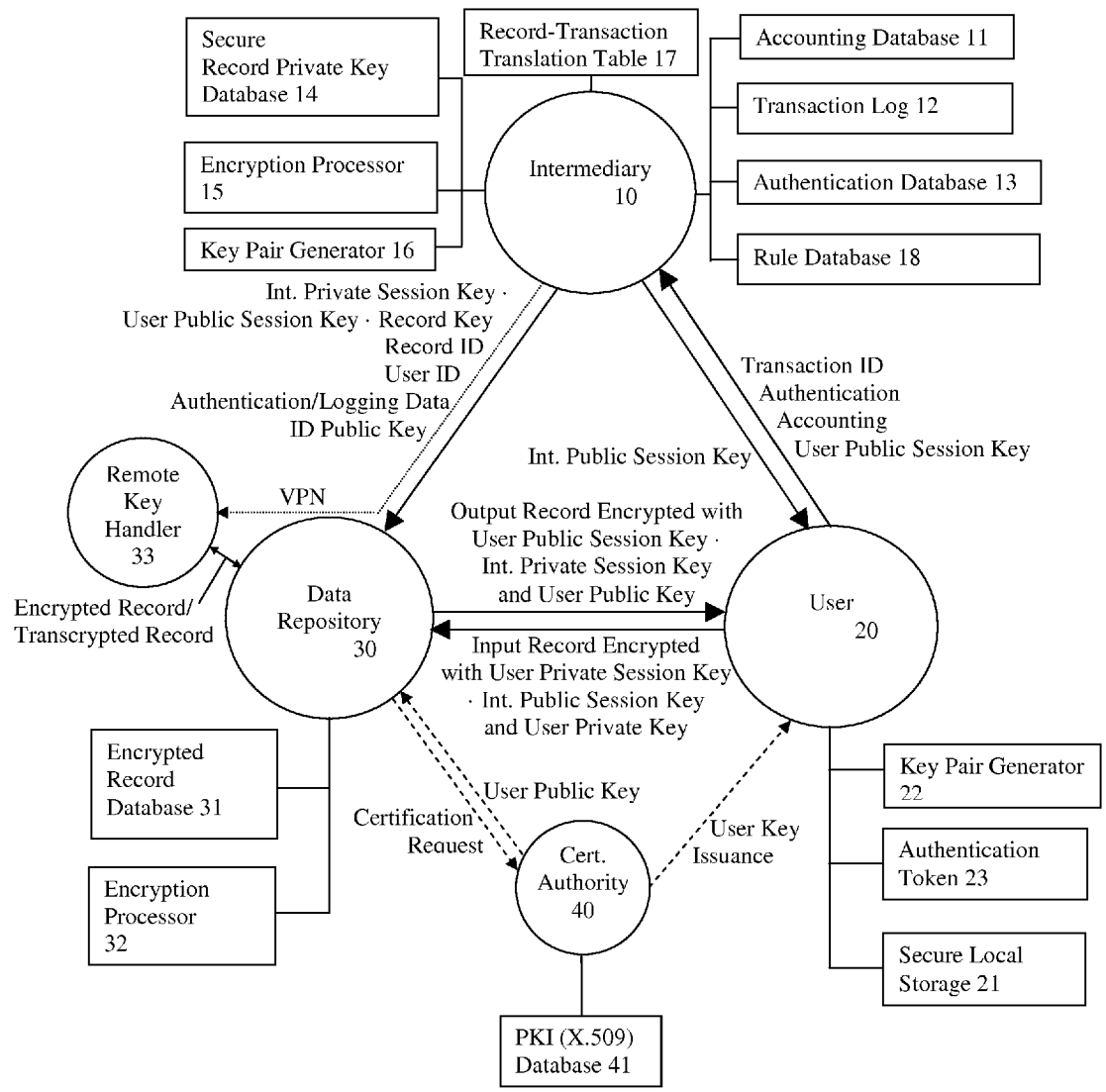
FIG. 1 shows a block diagram of a first embodiment of the communications system according to the present invention.

The present invention provides a transaction scheme involving at least three parties for communication of a message, in which all parties are required, yet only one party, the intended recipient or User, is trusted with the message.

The following identities characterize the known RSA algorithm: $C=M^d$ mod n and $M=C^e$ mod n. For the complete transformation, the relationship is as follows: $M=C^e$ mod $n=(M^d)^e$ mod n. According to the present invention, it is desired to transform ciphertext 1 (C1) into ciphertext 2 (C2), in a secure manner without ever revealing the plaintext message during the process. In order to achieve this transformation from C1 to C2, the two-step process is concatenated. Thus, the decryption according to a first decryption key $M=C1^{e1}$ mod n and the reencryption according to a second decryption key $C2=M^{d2}$ mod n are combined into a single operation, $C1^{e1 \cdot d2}$ mod $n=M^{d2}$ mod n=C2. So long as the factors of e1·d2 remain secret, it is infeasible to factor thus number, and thus this transformation inherits the advantages of the RSA encryption scheme. Thus, the plaintext message remains secure through this transformation. In fact, because the transformation is integral, relatively low security is required for the starting and transformed ciphertext, and the crypto-processor itself.

This process also lends itself to three (or more) party transactions, wherein each party is a required participant (maintains secret information necessary for the communication) but only an intended recipient (User) has access to the plaintext message.

Accordingly, if a transaction intermediary supplies a transcoding or transcription key to the message Repository, having two secret components (so that the composite key may not be factored), an existing ciphertext may be transformed into a new ciphertext. While the components of the composite transcode key are secret, due to the nature of public key systems, these are insufficient for the intermediary to gain access to the message. The two secret components include a key specific for the User, and a key specific for the existing encryption of the message ciphertext. The resulting transformed ciphertext is therefore a public key encrypted message for the User, which can only be decrypted with the User's private key. In order to maintain the security of the original message against subsequent uses, it is preferred that the User public key-private key pair be a session key, that is, accounted for and used only for the single transmission and subsequently discarded. The "public" portion of the session key pair is transmitted by the recipient to the intermediary, which is held in secrecy and multiplied by the private key for the existing ciphertext message. In this way, the intermediary has no knowledge of the "private" session key, and cannot itself intercept the communication.

Thus, the data repository handles only encrypted messages according to the present scheme. The decryption key for these messages is held secretly by the intermediary only, and neither released nor transmitted in a form subject to decomposition.

The intermediary, while holding a sufficient decryption key, has no access to the Repository ciphertext message, which is separately maintained by the Repository.

The User receives a ciphertext message, which is decrypted with a secret key. Typically, the Repository will further encrypt the transmission to the User with a permanent-type public key for that User, which will be obtained from or verified by a separate certification authority. Thus, even if the intermediary were to employ a dummy key, the resulting transmission from the Repository would still be secure with respect to the intermediary.

In operation, the User generates on a session basis, a key pair, and provides one portion to the intermediary, the other is maintained in secrecy for the duration of the transaction. The intermediary receives the session key and multiplies it with the secret decryption key for the message held by the Data Repository. Both the session key and the decryption key individually are held in secrecy by the Intermediary. The Data Repository further receives from the Intermediary an identification of the User, which is used to query a certification authority for an appropriate public key. The Data Repository "transcripts" the encrypted message with a composite key (resulting from the multiplicative combination of the Record Public/Private Key, the User Public Session Key and the Intermediary Private Session Key) as well as the User (persistent) Public Key to yield a new encrypted message, which is transmitted to the User. The User then applies the retained portion of the session key, as well as a persistent private key, resulting in the original plaintext message. Likewise, the composite encryption key used by the Data Repository results from the combination of the secret encryption key, Intermediary Private Session Key, and User Public Session Key.

When data is added to the Encrypted Record Database 31, it may be advantageous to provide the User 20 with a confirmation comprising a hash function performed on the received data, either in its Composite Session Key format (allowing immediate verification by the User 20) or in its Record Key format (allowing persistent verification of the transaction), or both. Further, it may also be advantageous for the Intermediary to receive or act as conduit for these verification communications, allowing an accounting to take place on such confirmation.

When data is communicated from the Encrypted Record Database 31 to a User 20, it may likewise be advantageous to provide the Data Repository 30 with a confirmation comprising a hash function performed on data received by the User 20. This confirmation may advantageously be communicated through the Intermediary, allowing an accounting to take place on such confirmation.

EXAMPLE 1

The transactional details are now described with respect to FIG. 1. While there are three particular parties to the process, the User 20, the Data Repository 30, and the Intermediary 10, a fourth party, a Certification Authority 40 is also generally involved. It is also noted that, while the process shown in FIG. 1 generally provides a communication flow of information from the Data Repository 30 to the User 20, this communication stream may also be reversed, allowing the User 20 to upload information to the Encrypted Database 31 of the Data Repository 30, using a set of User 20 and Intermediary 10 Session Keys and the User 20 Private Key. At the Remote Key Handler 33, the encrypted message is transcripted with the Record Public Key, securely supplied by the Intermediary 10 through a virtual private network-type arrangement through the Data Repository 30.

The User 20 initiates the transaction by contacting the Intermediary 10, which typically maintains an Accounting Database 11, a transaction log 12, an Authentication Database 13, and a Secure Private Key Database 14. The accounting function is typically a financial transaction, wherein the User 20 pays for the information requested. Other forms of accounting are also possible, and indeed, the User 20 may be paid for its review of the information. Particulars of each transaction are typically recorded in the Transaction Log 12, which may be used for auditing, reconciliation, verification, trend analysis, or other purposes. This log potentially allows subsequent aspects of a transaction to be anonymous, with the identifier of the User 20 stripped, while verification of authenticity may continue to be assured through use of an authentication token 23.

The Authentication Database 13 may, for example, provide a means for definitively identifying the User 20, and/or, in the case of a medical record, the identity of the patient who consults the User 20, who is, for example, a health care professional. This identification may be based on a Public Key Infrastructure, biometric identifiers, passwords and/or personal identification numbers (PIN), or other known means. The Intermediary 10 may therefore provide a persistent association of the User 20 and/or a patient in its records, which facilitates accounting, application of rules, recalling of data from a database, etc.

Advantageously, a medical patient may employ a public key to identify him or herself. This public key is then received by the User 20 as partial evidence of authority and association with the patient. Such keys may expire periodically, preventing persisting use of outdated keys. The Intermediary 10 may then partially authenticate the User 20, by analysis of the patient public key-signed transmission from the User 20 with respect to a patient private key retained by the Intermediary 10. In some implementations of the invention, a patient-specific key pair may be used generally as a Record Encryption Key (e.g., the Record Public Key) for records belonging to that patient in the Encrypted Record Database 31. Generally, this key pair is not identical to the patient key pair used for digital signatures by that patient. It is noted that the Record Public and Private Keys stored in the Secure Record Key Database 14 may, but need not be individually generated for each record added to the Encrypted Record Database 31, and in fact may advantageously be aggregated and a single set of Record Keys used for a single patient or a group of records relating to the same patient, such as a single hospital admission.

The User 20 typically authenticates itself with the Intermediary 10, although in certain instances anonymous or semi-anonymous transactions may be supported. Thus, the Intermediary 10 may serve as a form of proxy to blind transactions while providing security. In the case of medical records, for example, a complete authentication of the User 20 is performed, using any of a variety of means. For example, biometric methods, images, personal identification numbers (PIN) and passwords, alone or in combination with security tokens, such as the SecureID® card token, may be employed. The particular level of authentication and the means employed are not a critical aspect of the invention, and therefore the most appropriate means may be selected. Indeed, the Intermediary 10 may support a plurality of authentication schemes, while it may deliver to the Data Repository 30 merely an indication of a successful authentication process.

The Intermediary 10 may impose a set of access rules, stored in the Rule Database 18. These rules, for example, define which Users 20 may access which types of Records.

The Intermediary 10 does not normally hold encrypted information records for two reasons. First, this defeats the three-party security scheme and might compromise the security of the records themselves, and second, this often means replicating and transporting potentially large databases. Rather, the Intermediary 10 provides transactional support for the Data Repository 30, performing a number of tasks that are potentially burdensome. For example, in some instances, the User 20 will require exception processing. For example, in the case of a physician, normally a patient will specifically authorize transmission of a medical record, and therefore highly automated processing may be employed. In emergency situations, however, direct confirmation of physician or patient authorization may not be possible. In this case, often a manual authentication process will ensue. Likewise, in some cases, a User 20 will fail a biometric test or otherwise not have a required piece of information or security token 23. Likewise, some Users 20 will be automated devices, which may employ special automated authentication protocols. A means is therefore provided for graceful recovery from these situations through exception processing, which may include manual intervention. Thus, this transactional burden may be shifted from the Data Repository 30 to the Intermediary 10.

During an emergency request for authorization, for example where a physician is properly authenticated as the User 20, but the associated patient is unavailable for authentication or authentication is otherwise not possible, the system provides an emergency override mode of operation. In the case of record inputs to the system, the proffered record is assigned a default set of access privileges, and flagged as being an emergency (unauthenticated) record. Later, this record can be fully authenticated, and a specific set of access privileges assigned, when the patient is available, and the emergency flag removed.

When information is requested from the system in the absence of a complete patient authentication, the role of the physician is analyzed for consistency with the nature of the request. A restrictive set of access privileges may be applied, limiting access to only those records originally determined or coded to be "critical", which indeed may have both temporal and contextual sensitivity. Further, the nature of the emergency is analyzed, in addition to the role of the requestor, to further restrict the information available. A personal communication may be initiated to allow a discretionary decision to be made. The accounted transaction fee may take into consideration the costs of authentication and verification; risks borne by the Intermediary or others; and the emergent nature of the requests. Thus, one embodiment of the present invention provides an insurance or indemnity accounting fee for consummating an information transaction.

The Intermediary 10 receives from the User 20 four (or more) pieces of information. As discussed above, the accounting and authentication information are provided. In addition, an identifier of the information sought (or to be transmitted) is also communicated. This is represented in FIG. 1 as the Transaction ID, and typically includes particulars of the record, e.g., patient identification in a medical record system, etc. The Intermediary 10 translates a portion of the Transaction ID into a Record ID, using a Record-Transaction Translation Table 17. The Transaction ID may also include other particulars of the transaction. Finally, the User 20 maintains a public key encryption Key Pair Generator 22.

This Key Pair Generator 22 generates a Session Key pair, of which one component is maintained by the User 20 in secrecy, and the other component is transmitted. The User 20 also maintains a Secure Local Storage 21 system, for example for receipt of the private information and to store decryption information, such as the private portion of the key generated by the Key Pair Generator 22.

In a medical environment, the Intermediary 10, as part of the authentication, verifies that the User 20 has an appropriate set of rights to receive the requested information, in a role-based authentication scheme. It is also possible for this "role" information to be passed to and processed by the Data Repository 30, since an access privilege database may not be maintained by the Intermediary 10, and itself might include sensitive information.

The Intermediary 10, after authenticating the User 20, and accounting and logging the transaction, processes the User 20 Public Session Key by internally multiplying this with an Intermediary Private Session Key, generated by the Key Pair Generator 16 and a Record Private Key maintained in a Secure Private Key Database 14. The resulting value is then transmitted, along with the record identification, User identification, and appropriate authentication and transactional logging data, to the Data Repository 30.

In some instances, the User 20 authentication may include an associated identifier, for example a Patient-specific Public Key (ID Public Key) in a medical record system, which allows an additional or substitute layer of security. In addition, a patient could himself act as a User 20, seeking access to his own medical records.

In one scenario, the Data Repository 30 receives the information from the Intermediary 10, and recalls the identified record from an Encrypted Database 31. The database record remains encrypted with a Record Public Key (e3), originally generated by the Key Pair Generator 16. The Record Public (e3) and Private Keys (d3), in this case, is stored in the Secure Record Key Database 14. An Encryption Processor 15 may be provided to carry the cryptographic processing burden of the Intermediary 10, for example implementing a secure socket layer (SSL) protocol. The encrypted database record from the Encrypted Record Database 31, is presented to the Remote Key Handler 33, a privileged processing environment having both high security and substantial cryptographic processing capacity. The Remote Key Handler 33 implements the algorithm:

$$C1 = C2^{d1 \cdot e2 \cdot d3} \mod n,$$

wherein d2·e1·f1 is:
User Public Session Key (e2)* Intermediary Private Session Key (d1)* Record Private Key (d3), C2 is the ciphertext message stored in the Encrypted Record Database 31, encrypted with the Record Public Key (e3), and C1 is the ciphertext message in a transcripted format for transmission to the User 20. This processing is performed in the Remote Key Handler 33, based on information from the Intermediary 10 transmitted through a communications channel. This communications channel is preferably secure, such as a virtual private network. The Remote Key Handler 33 is preferably physically proximate or part of the Data Repository 30.

The Data Repository 30 also receives a message intended for it from the Intermediary 10, and may log the transaction using the supplied information. The Data Repository 30 further employs the User Identification to query a Certification Authority 40, maintaining a Public Key Database 41, in order to retrieve a persistent User Public Key. This User Public Key is then further employed by the Encryption Processor 32 to encrypt the Record for communication to the User 20.

In another scenario, the User 20 transmits a Data Record to the Data Repository 30. In this case, the Data Record is encrypted with the User 20 Private Session Key, the Intermediary 10 Public Session Key (received from the Intermediary during a handshaking communications), as well as the User 20 Private Key corresponding to the certificate stored by the Certification Authority 40 in the public key database 41. The Data Repository 30 then receives the communication, first decrypts it with the User Public Key received from the Certification Authority 40 from the Public Key Database 41 in the Encryption Processor 32, and then passes it to the Remote Key Handler 33, with a securely received User Public Session Key . Intermediary Private Session Key . Record Public Key product received from the Intermediary 10, to produce a transcripted Data Record, encrypted with the Record Public Key, which in this case is generated by the Intermediary 10 in the Key Pair Generator 16. This Record (encrypted with the Record Public Key) is then passed to the Data Repository 30 and stored in the Encrypted Database 31.

It is noted that in anonymous communications, a proxy may be employed to blind the address of the User 20 from the Data Repository 30. In this case, a modified scheme is employed which may not use a Certification Authority 40, although the Intermediary 10 may provide anonymous certificate services.

It is also noted that each communication channel may itself be secure, for example using 128 bit secure socket layer (SSL) communications or other secure communications technologies. In particular, it is important that only the Intermediary 10 be in possession of the transcription key (e.g., composite key) and the session key (e.g., Intermediary Private Session Key), since this will allow recovery of the private encryption key.

As noted above, the release of private keys may be limited by having both the Intermediary 10 and User 20 to each generate a session key pair. In this case, the Intermediary 10 transmits the public portion of its session key pair to the User 20, which is then employed to decrypt the message from the Data Repository 30. The key provided by the Intermediary 10 to the Remote Key Handler 33, in this case, is the product:

Record Private Key . User Public Session Key . Intermediary Private Session Key. The resulting transcripted record from the Data Repository 30 is encrypted with the product of the two session keys. Because the transmitted key is a triple composite, the Record Private Key is protected against factorization. The User 20 then uses the User Private Session Key and Intermediary Public Session Key in order to decrypt the Data Record.

In the case of a Data Record transmission from the User 20 to Data Repository 30, the User 20 transmits a record encrypted with the product User Private Session Key . Intermediary Public Session Key Intermediary 10 transmits to the Remote Key Handler 33, the product:

Public Record Key . User Public Session Key . Intermediary Private Session Key which is used to transcript the encrypted Data Record with the Public Record Key.

In like manner, the Data Repository 30 may also generate a session key pair, used to sign and authenticate transmissions.

It is therefore seen that, by advantageously using the property of multiplicative identity of modulo arithmetic and the difficulty in factoring large semi-prime numbers, useful additions to the RSA encryption scheme are obtained. These additions allow secure third party involvement in communications, and the substitution of encryption keys without directly passing through a plaintext state.

EXAMPLE 2

Figure 2:
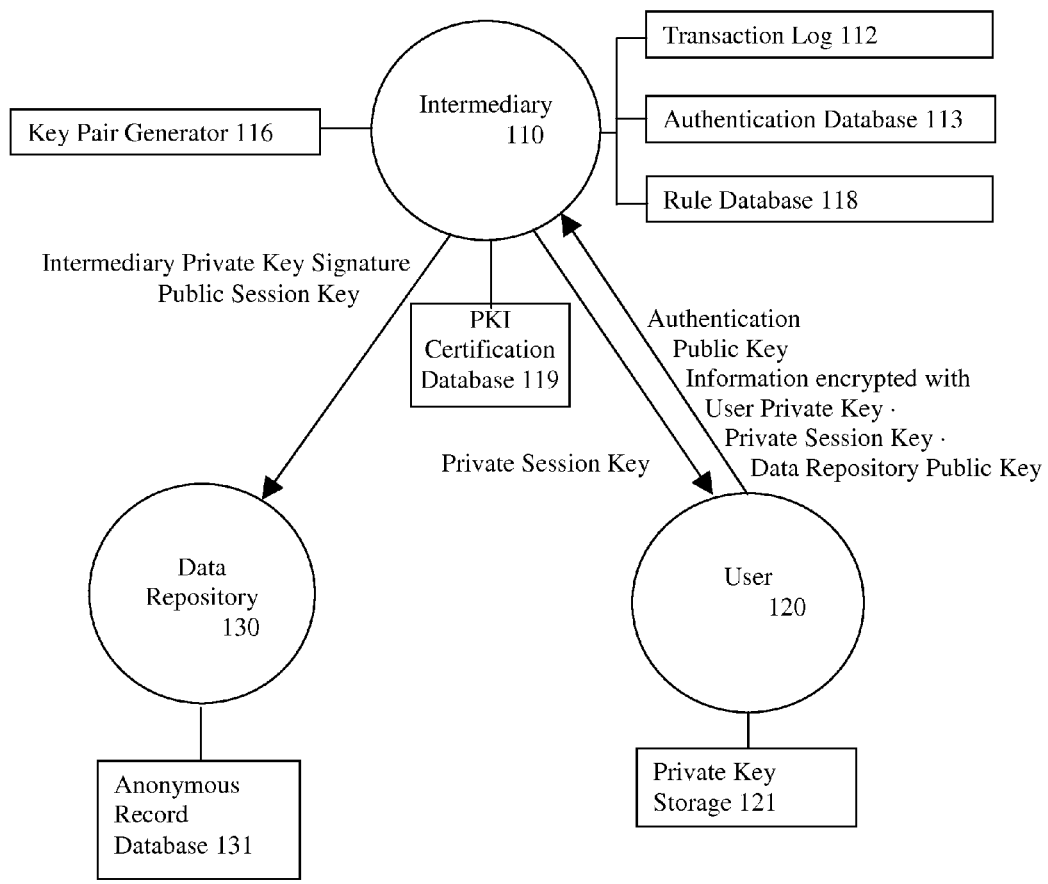
FIG. 2 shows a block diagram of a second embodiment of the communications system according to the present invention.

The transactional details of a second embodiment of the invention are now described with respect to FIG. 2. FIG. 2 is similar to FIG. 1, with a number of simplifications, and notably, an absence of a direct communications path between the User 120 and the Data Repository 130. This allows an anonymous communication through the Intermediary 110 as a proxy.

As shown in FIG. 2, the User 120 transmits a datastream to the Intermediary 110, which includes authentication information, the User's public key, and a message encrypted with:

User Private Key·Private Session Key·Data Repository Public Key

The Intermediary 110 resorts to its Authentication Database 113, PKI Certification Database 119 and Rule Database 118 to verify the authority and access privileges of the User 120. The transactional details are stored in the Transaction Log 112. During the initial communication between the User 120 and Intermediary 110, the Intermediary 110 generates a Public and Private Session Key pair in the Key Pair Generator 116, and transmits one portion to the User 120.

The Intermediary 110 then transcripts the message transmitted by the User 120 by performing an RSA type decryption operation on the message using the User 120 Public Key, effectively removing personally identifying information from the message while assuring the authenticity and authority of the User 120. The anonymous message is then transmitted to the Data Repository 130, which may then decrypt the message using the other portion of the Session Key (provided by the Intermediary 110) and its own Private Key.

EXAMPLE 3

Figure 3:
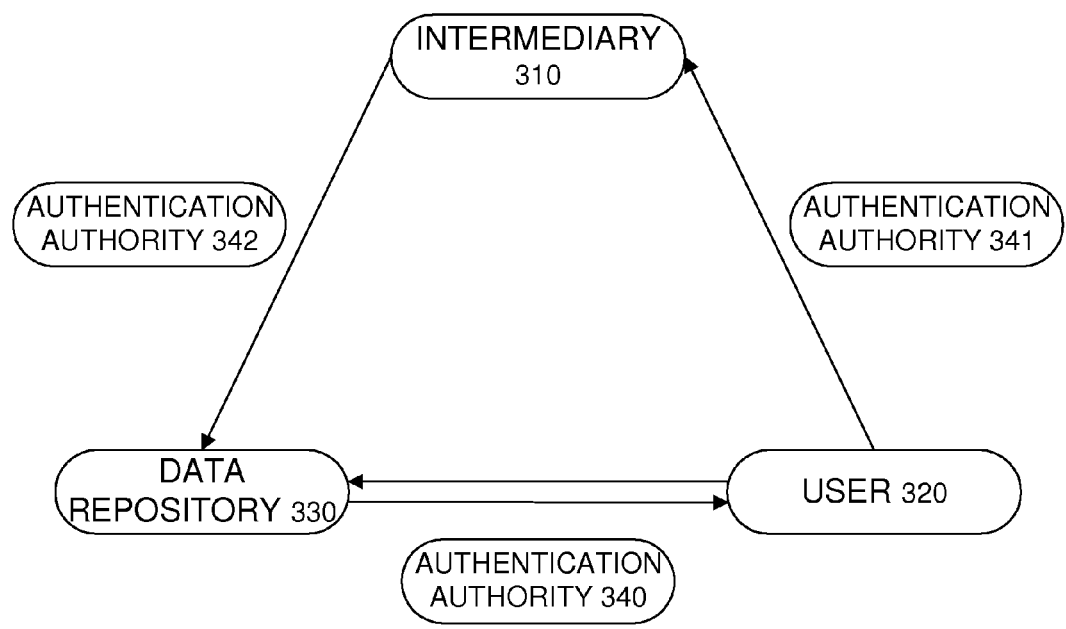
FIG. 3 shows an idealized representation of a three party communication transaction according to the present invention.

FIG. 3 shows a simplified generic schematic arrangement for a three-party transaction. In FIG. 3, three parties are involved in communication of a message. Separate authentication authorities, may serve as traditional certification authorities in a public key infrastructure, or may provide greater or lesser services to respective parties, or may be integrated within one or more of the three integral parties. FIG. 3 shows that the User 320 communicates message set-up information with the Intermediary 310, in a communication in which the authenticity of the parties may be verified by Authentication Authority 341. The Intermediary 310 correspondingly communicates message set-up information to Data Repository 330, in a communication in which the authenticity of the parties may be verified by Authentication Authority 342. Finally, the Data Repository 330 and User 320 conduct an encrypted communication in either direction based on the set-up information, in a communication in which the authenticity of the parties may be verified by Authentication Authority 340. If the Data Repository 330 initiates the communication, the flow paths are reversed. The Intermediary 310 is not a party to the communication proper, and has insufficient information to eavesdrop on the encrypted communication. In a generic case, a mere Diffie-Hellman type key exchange between the User 320 and Data Repository 330 would be sufficient; however, according to an aspect of the present invention, the Data Repository 330 and Intermediary 310 operate under mutual distrust to prevent release of a secret, which can only be transmitted for decryption to the User 320. The Intermediary 310 holds the decryption key for the secret, while the Data Repository 330 holds the encrypted information. The communication set-up information therefore provides a scheme in which the Intermediary 310 passes a composite transcription key to the Data Repository 330, which includes as masked components the decryption key for the encrypted message, as well as a new session encryption key, for which the User 320 holds the corresponding session decryption key. Thus, neither the Intermediary 310 nor the Data Repository 330 ever possesses sufficient information to obtain message in decrypted form.

The Authentication Authorities 340, 341, 342 provide means for independent assurance that each party to the communication is the intended party, thus limiting the ability of any one party from undermining the security of the scheme. On the other hand, the ability of two parties to act together and in cooperation to obtain the secret message serves as a feature to allow recovery of the secret message in case of emergency.

EXAMPLE 4

Figure 4A:
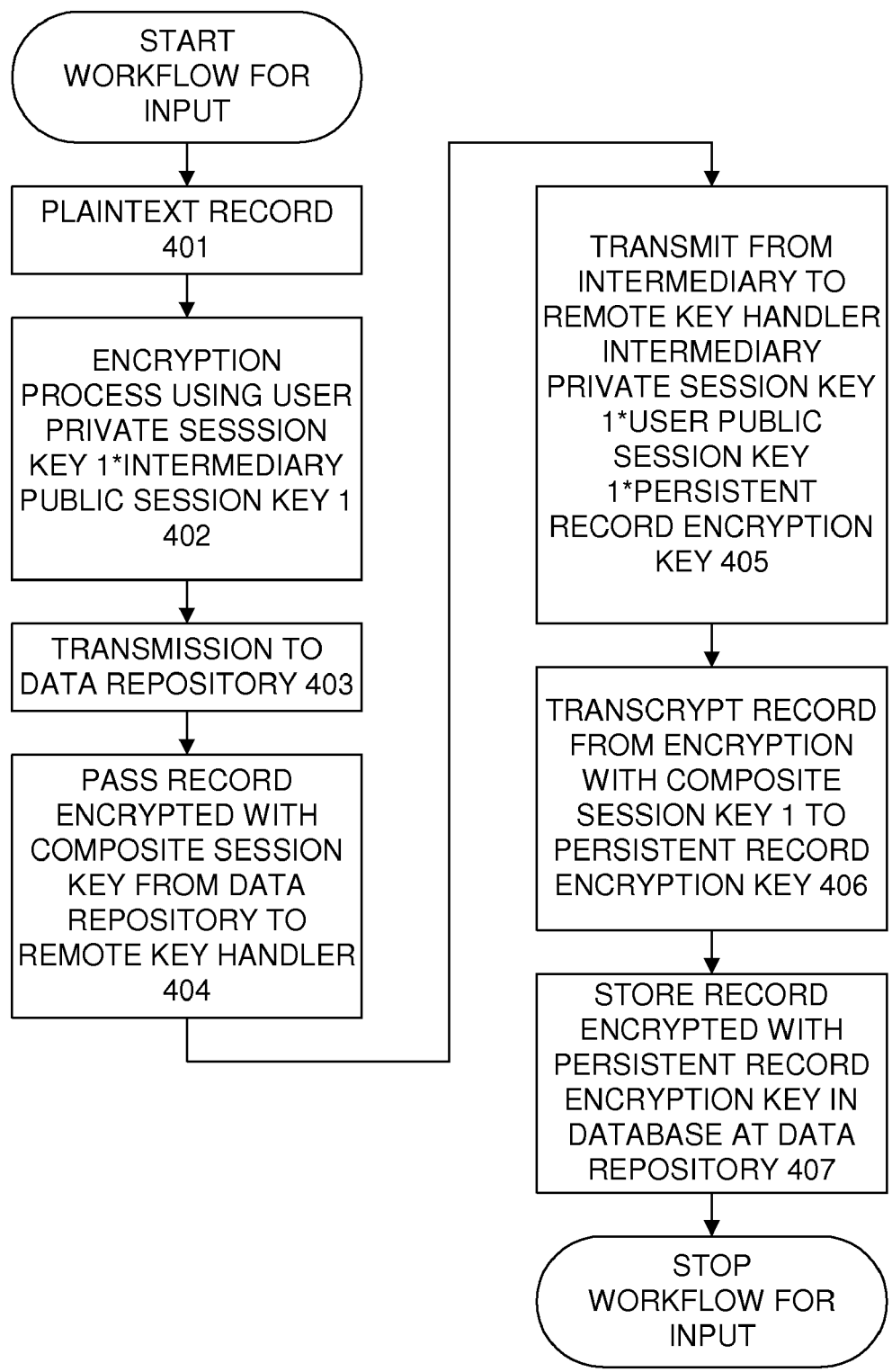
FIGS. 4A and 4B show workflow diagrams for the input and output of encrypted records according to the present invention.

FIG. 4A shows a workflow diagram for the input of encrypted records by the User 20 with respect to the system of the Data Repository 30. Initially, a Plaintext Record 401 is encrypted by the User 20 in a process 402 using the User private session key 1*Intermediary Public Session Key 1. The User 20 generates the User Private Session Key pair and receives the public portion of the Intermediary 10 Session Key communicated in the set-up communication. A message is then sent 403 from the User 20 to the Data Repository 30, including the record encrypted with the composite (product of two or more PKI keys having the same modulus) session key 1 (User Private Session Key 1* Intermediary Public Session Key 1). The Data Repository 30 passes 404 the encrypted record to the Remote Key Handler 40. The Intermediary 10 then communicates 405 the Intermediary Private Session Key 1* User Public Session Key 1* Persistent Record Encryption Key, which is processed 406 in a transcription process to yield a record encrypted with only the Persistent Record Encryption Key, the other key components having been eliminated. The record encrypted with the record persistent encryption key is then stored 407 in the Record Database 31 at the Data Repository 30.

Figure 4B:
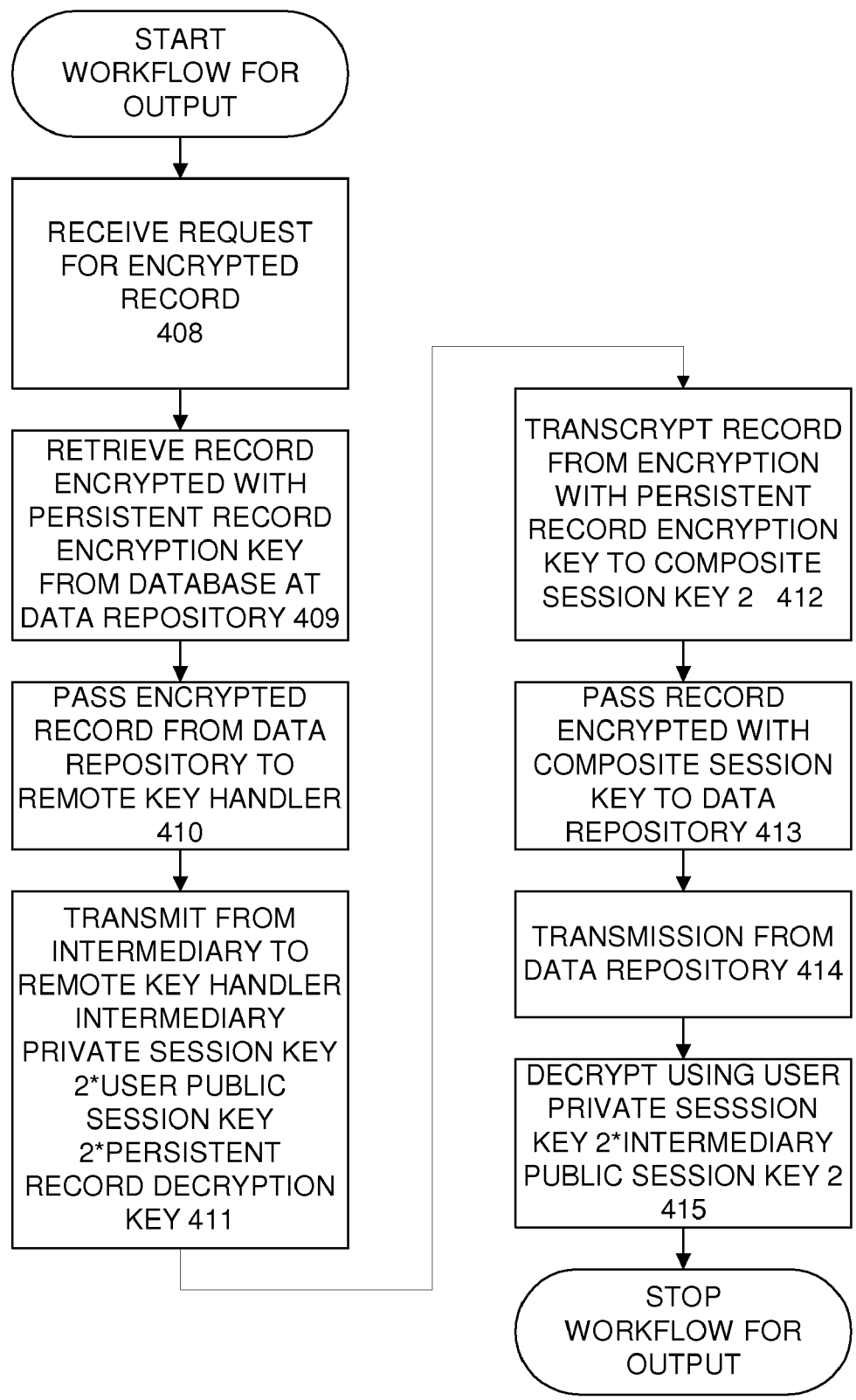

To output the record, as shown in FIG. 4B, an inverse process is followed. A request is received 408 for the encrypted record. The record encrypted with the Persistent Record Encryption Key is retrieved 409 from the Record Database 31 at the Data Repository 30, and passed 410 to the Remote Key Handler 40. The Intermediary 10 then transmits 411 to the Remote Key Handler 33 the Intermediary Private Session Key 2* User Public Session Key 2* Persistent Record Decryption Key. The Remote Key Handler 40 then processes 412 the record encrypted with the Persistent Record Encryption Key with the received key to yield a Data Record encrypted with the Composite Session Key 2 (Intermediary Private Session Key 2* User Public Session Key 2), the Record Encryption Key having been eliminated in the transcription process, which is then passed 413 to the Data Repository 30. The Data Repository 30 transmits 414 the encrypted Data Record to the User 20, which is then decrypted 415 with the Intermediary Public Session Key 2* User Private Session Key 2, the former having been received from the Intermediary 10 and the later being generated by the User 20 at the beginning of the transaction set-up. The User 20 thus obtains the plaintext record.

Figure 5:
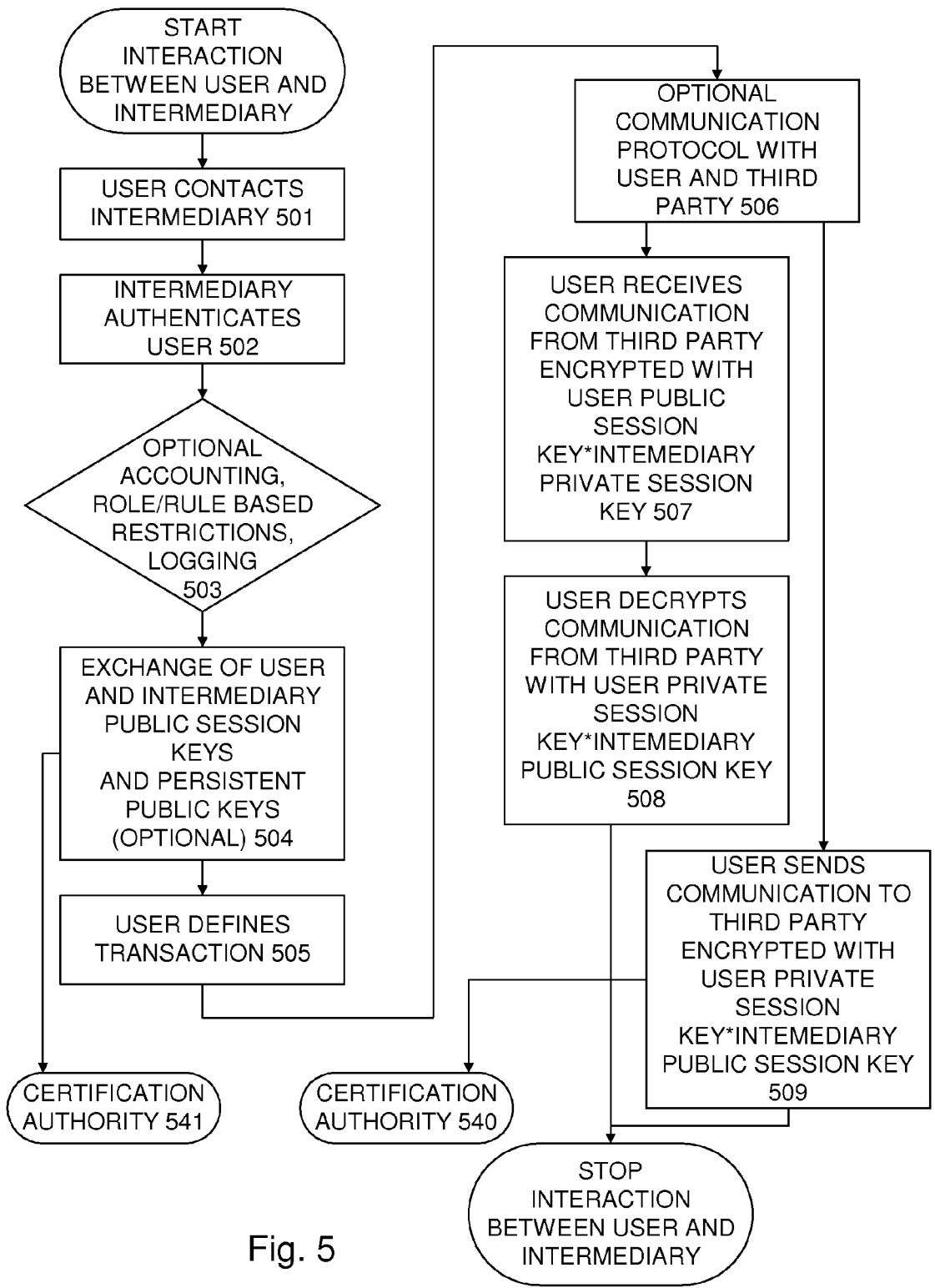
FIG. 5 shows a flowchart of the actions of the user during typical transactions according to the present invention.

FIG. 5 provides a flowchart of the actions of the User 20 during typical transactions. The User 20 contacts 501 the Intermediary 10, and during the ensuing communication the Intermediary 10 authenticates 502 the User 20. After authentication 502, the Intermediary 10 conducts 503 an optional accounting, implements rule and/or role based restrictions, and logs the transaction. The User 20 and Intermediary 10 then exchange 504 public session keys, retaining their respective private session keys. A certification or Authentication Authority 541 may also provide further assurance of the identity of the various parties. The User 20 also defines 505 the nature of the desired transaction, for example uploading or downloading a Data Record. The Intermediary 10 then communicates with a third party, e.g., the Data Repository 30, in steps shown elsewhere.

An optional communication protocol is conducted 506 between the User 20 and a third party, e.g., the Data Repository 30, to establish communication parameters and the like. In the case of a Data Record download, the User 20 receives 507 information from the third party encrypted with the User Public Session Key * Intermediary Private Session Key, and then decrypts 508 the information with the User Private Session Key * Intermediary Public Session Key. In the case of an upload of data, the User 20 sends 509 information to the third party encrypted with the User Private Session Key * Intermediary Public Session Key. The Certification Authority 540 may provide authentication services for communication between the User 20 and the third party.

Figure 6:
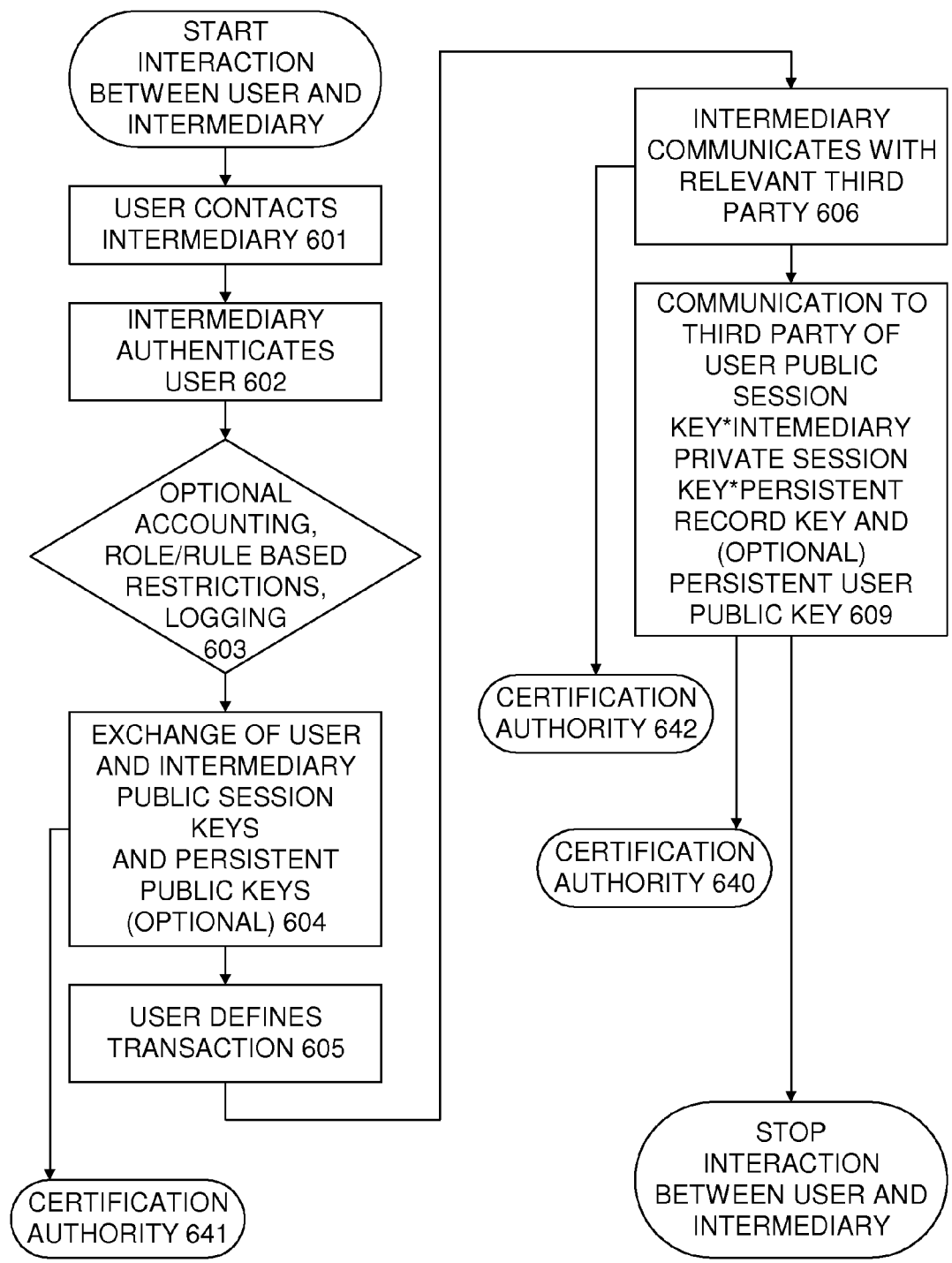
FIG. 6 shows a flowchart of the actions of the intermediary during typical transactions according to the present invention.

FIG. 6 provides a flowchart of the actions of the Intermediary 10 during typical transactions. The User 20 contacts 601 the Intermediary 10, and during the ensuing communication the Intermediary 10 authenticates 602 the User 20. After authentication 602, the Intermediary 10 conducts 603 an optional accounting, implements rule and/or role based restrictions, and logs the transaction. The User 20 and Intermediary 10 then exchange 604 public session keys, retaining their respective private session keys. A certification authority or Authentication Authority 641 may also provide further assurance of the identity of the various parties. The User 20 also defines 605 the nature of the desired transaction, for example uploading or downloading a Data Record. The Intermediary 10 then communicates 606 with a third party, e.g., the Data Repository 30. This communication may be authenticated with certification authority or Authentication Authority 642.

The Intermediary 10 then communicates 609 the User Public Session Key * Intermediary Private Session Key * Persistent Record (encryption or decryption) Key to the third party, e.g., Data Repository 30. The impending communication between third party and User 20 may be authenticated through the certification authority or Authentication Authority 640.

Figure 7:
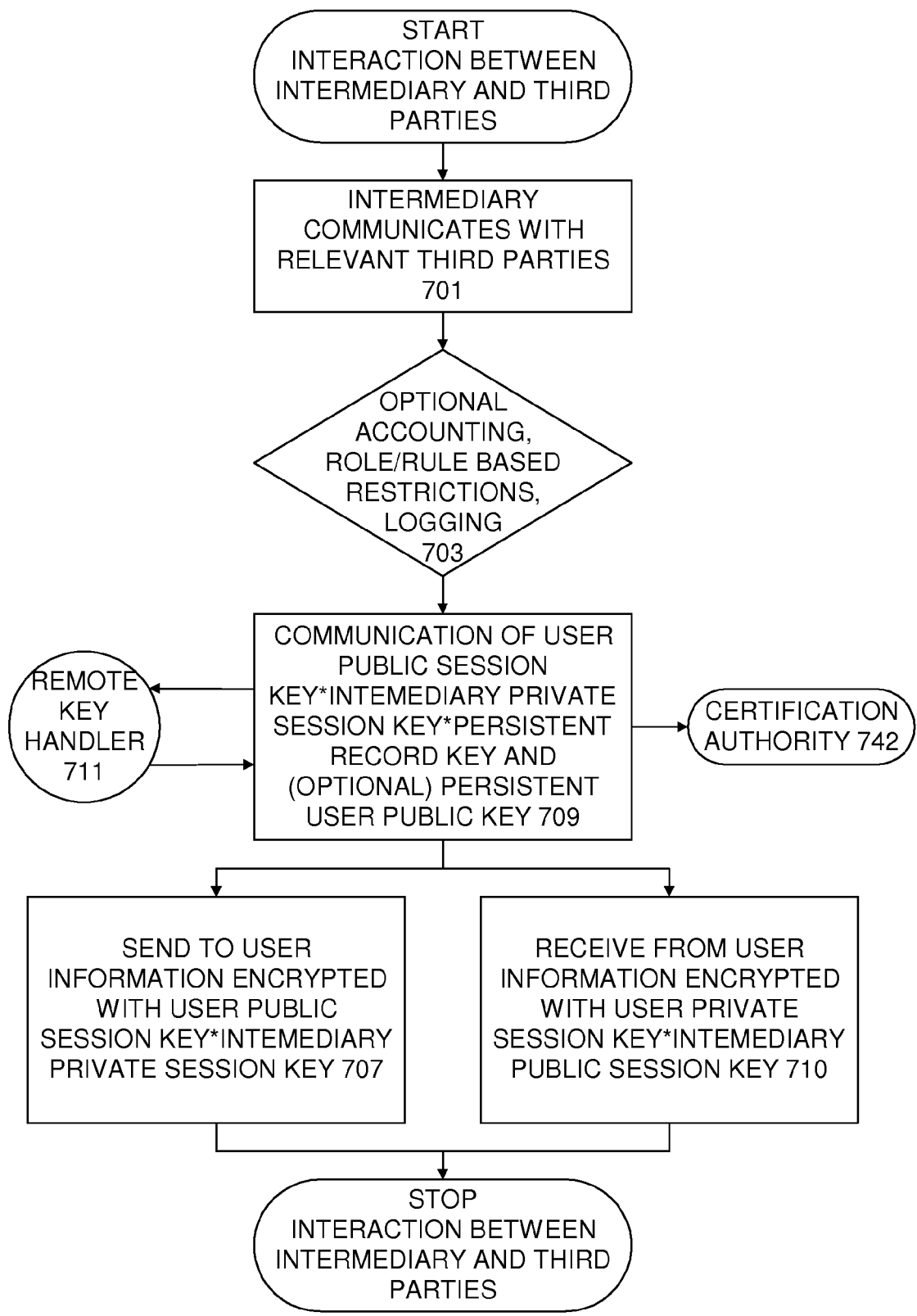
FIG. 7 shows a flowchart of the actions of a third party to the transaction according to the present invention.

FIG. 7 provides a flowchart of the actions of the third party, e.g., Data Repository 30 during typical transactions. The Intermediary 10 communicates 701 with the relevant third party or parties. The Intermediary 10 conducts 703 an optional accounting, implements rule and/or role based restrictions, and logs the transaction. The Intermediary 10 communicates 709 the Intermediary Private Session Key 1* User Public Session Key 1* Persistent Record Encryption Key and optionally, the Persistent User Public Key, through the third party, to the Remote Key Handler 711, where the Record Key is eliminated. A Certification Authority 742 may provide authentication services. The third party then sends 707 information to the User 20 encrypted with the User Public Session Key * Intermediary Private Session Key, or receives 710 from the User information encrypted with the User Private Session Key * Intermediary Public Session Key.

Figure 8:
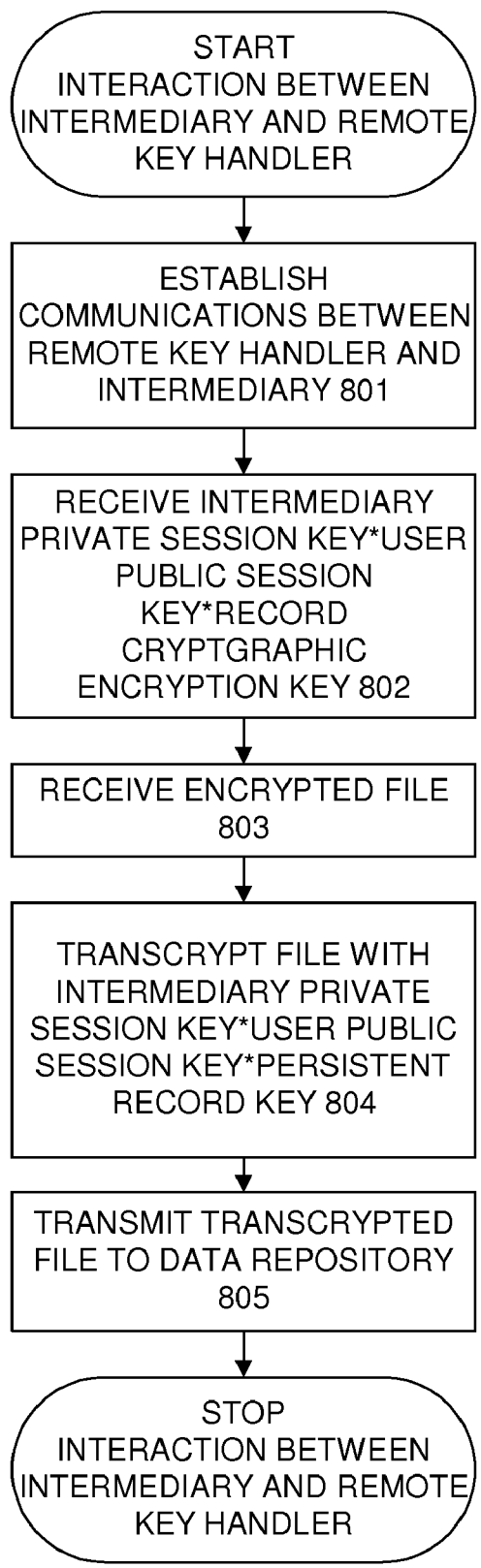
FIG. 8 shows a flowchart of the actions of the remote key handler according to the present invention.

FIG. 8 provides a flowchart of the actions of the Remote Key Handler 40 during typical transactions. Communications are established 801 between the Remote Key Handler 40 and the Intermediary 10. The Remote Key Handler 40 then receives 802 the Intermediary Private Session Key * User Public Session Key * Persistent Record (encryption or decryption) Key. An encrypted file is received 803 through a Data Repository 30, which is then transcripted 804 with the received the Intermediary Private Session Key * User Public Session Key * Record Cryptographic (encryption or decryption) Key. The transcripted file is then transmitted 805 to the Data Repository 30.

Figure 9:
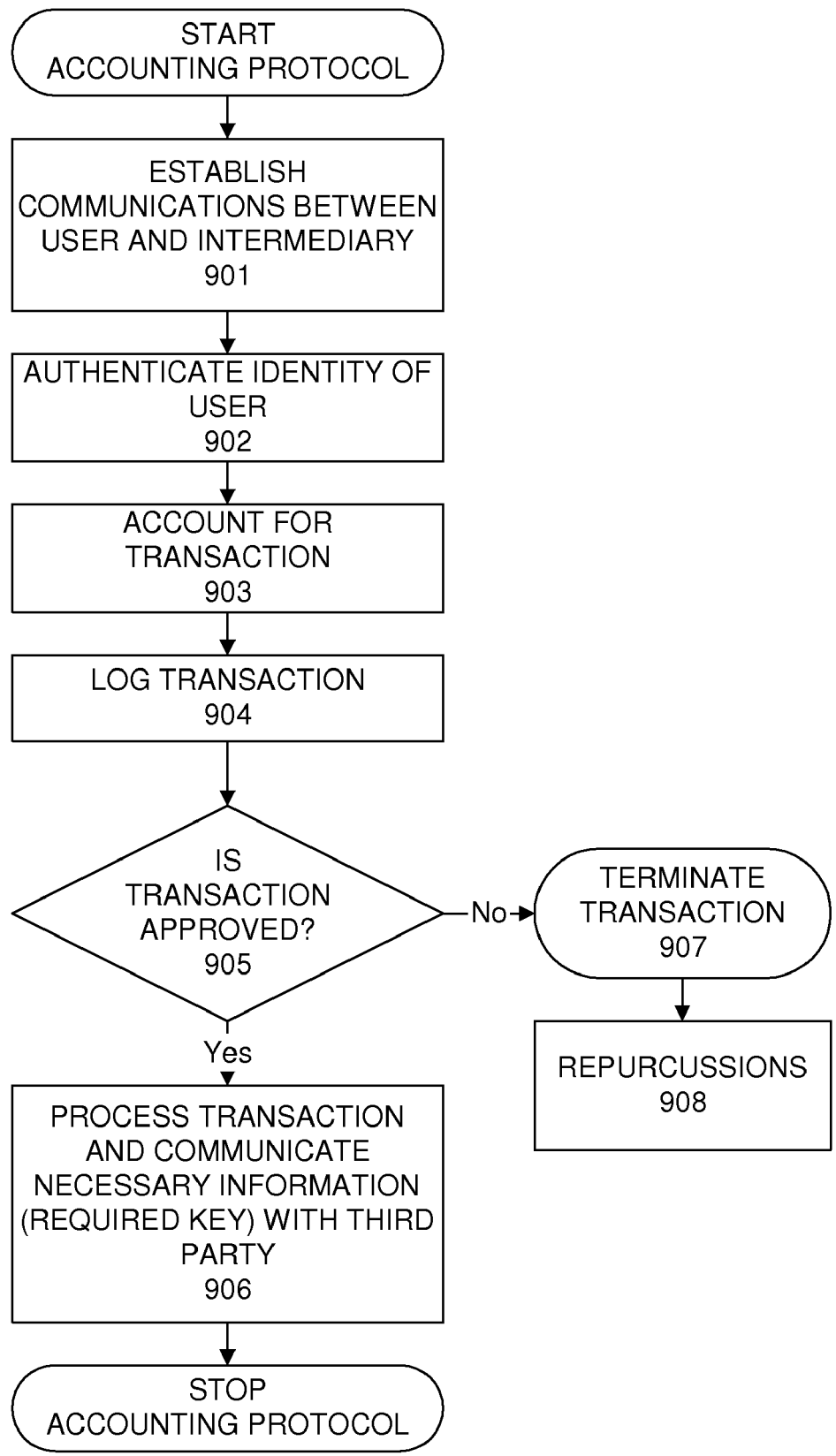
FIG. 9 provides a flowchart of an accounting protocol according to the present invention.

FIG. 9 provides a flowchart of an accounting protocol. Communications are established 901 between the User 20 and the Intermediary 10. The User 20 is authenticated 902. The transaction or proposed transaction is then accounted 903 for, for example by performing a financial charge against an account. The transaction and/or proposed transaction are then logged 904. The transaction parameters are then tested for approval 905, and if not approved, the transaction terminated 907 and various repercussions 908 implemented, for example, to ensure system security. If the transaction is approved, it is processed 906 and necessary key information communicated to facilitate the ultimate transaction between the User 20 and the third party, e.g., Data Repository 30.

EXAMPLE 5

The algorithm according to the present invention may also be used in other circumstances where it is desired that a third party control decryption of a message without having access to the message itself. For example, a current trend is to secure electronic mail communications by providing a third party encryption, wherein the recipient must request a decryption key from a third party in order to reveal the message. This is advantageous, for example, where the availability of the decryption key is time limited, thus allowing the electronic communication to expire. See, www.disappearing.com. However, according to this known system, a symmetric cipher, i.e., the so-called Blowfish cipher, is employed. Therefore, if the encrypted message is made available to the server which hosts the encryption key, the privacy of the message is potentially impaired.

According to the present invention, see FIG. 3, the Intermediary never has access to sufficient information to decrypt any publicly transmitted information. Presuming that the Data Repository (receiver of the information) and the User, or sender of the information, choose to maintain the secrecy of the message, the interception of the message by the Intermediary does not impair the security of the system. Likewise, because security of the system does not require the Intermediary to be shielded from the ciphertext message, the Intermediary can, in fact, serve as a proxy or host for the communications, see FIG. 2.

Thus, in implementation, a secure three party communication system is provided as follows. The User 320 creates a message for the Data Repository 330. The Data Repository 330 publishes a public key, which is available to the User 320. The Intermediary 310 receives a message from the User 320, initiating a transaction. The User 320 receives a private session key from the Intermediary 310 as well as a unique identifier for the message. The User 320 then computes the composite encryption key from Data Repository Public Key * Intermediary Private Session Key, and encrypts the message using this composite key, and sends it to the Data Repository 330.

In order to decrypt the message, the Data Repository 330 communicates with the Intermediary 310, provides the unique identifier of the message, and receives the Intermediary Private Session Key. The Data Repository 330 then computes the composite decryption key from Data Repository Private Key * Intermediary Public Session Key, and decrypts the message using this composite key.

The session key pair generated by the Intermediary 310 is used once, and may be expired or controlled based on a set of rules. Thus, the Intermediary 310 may have a policy of destroying keys after a set time period or upon existence of a condition. Since the security of the encryption is analogous to RSA—type encryption, it can be made relatively secure. Since the Intermediary 310 has no access to the Data Repository Private Key, the message cannot be decrypted based on information available to it. In addition, higher order composite keys may be implemented, for example composites formed of three or more RSA-type keys, some of which may be enduring keys (for example to provide digital signature capability) and other session keys.

It is noted that various features of the known Dissapearing Inc. (San Francisco, Calif.) system, expressly incorporated herein by reference, may be employed in conjunction with the present invention. Thus, for example, special application software may be provided for restricting use by the recipient, thus preventing circumvention of the key restrictions.

EXAMPLE 6

Another example according to the present invention provides a system for communicating a private message between two parties, wherein a third party controls access by the recipient to the message. Thus, an encrypted communication is sent by arbitrary means to a recipient, and a third party key management agent must communicate decryption information to the recipient in order to comprehend the message.

According to the present invention, in order for the recipient to obtain the necessary decryption information, accounting, authentication, and logging are implemented. According a to a preferred embodiment, the decryption is preferably implemented by controlled application software, which prevents export of the message, such as by printing, disk storage, or the like. Therefore, within a reasonable extent, the message is isolated within the controlled application. The right of the user to access a comprehensible version of the message may be temporally limited, for example with an expiration date. These rights may also be limited based on a specified condition. Further use would require either a new transmission of the message, or a further accounting and logging of activity. Further, this allows control over the message on a per use basis, potentially requiring each user of the controlled application to authenticate himself or herself, and provide accounting information. Each use and/or user may then be logged.

It is also possible to permit anonymity of one party, for example a sender of a message, by employing anonymous cryptographic protocols, such as a employed in micropayment technology. Thus, a sender of a message may provide a anonymous accounting by employing an anonymous micropayment to account for the message transmission with the Intermediary.

This technique therefore provides client-side security for messages, including medical records. By employing a third party for key management, burden on the sender is reduced.

Other embodiments will be apparent to those skilled in the art from consideration of the specification and practice of the invention disclosed herein. It is intended that the specification and examples be considered as exemplary only, with a true scope of the invention being indicated by the following claims.

PRIOR ART REFERENCES

A number of fields of endeavor are relevant to the present invention, and exemplary prior art, incorporated herein by reference, are disclosed below. The references disclosed provide a skilled artisan with embodiments of elements of the present invention, and the teachings therein may be combined and subcombined in various manners in accordance with the present teachings. The topical headings are advisory only, and are not intended to limit the applicability of any reference.

Cryptographic Technology

U.S. Pat. No. 5,956,408 (Arnold, Sep. 21, 1999), expressly incorporated herein by reference, relates to an apparatus and method for secure distribution of data. Data, including program and software updates, is encrypted by a public key encryption system using the private key of the data sender. The sender also digitally signs the data. The receiver decrypts the encrypted data, using the public key of the sender, and verifies the digital signature on the transmitted data. The program interacts with basic information stored within the confines of the receiver. As result of the interaction, the software updates are installed within the confines of the user, and the basic information stored within the confines of the user is changed.

U.S. Pat. Nos. 5,982,891 (Ginter, et al., Nov. 9, 1999); 5,949,876 (Ginter, et al., Sep. 7, 1999); and 5,892,900 (Ginter, et al., Apr. 6, 1999), expressly incorporated herein by reference, relate to systems and methods for secure transaction management and electronic rights protection. Electronic appliances, such as computers, help to ensure that information is accessed and used only in authorized ways, and maintain the integrity, availability, and/or confidentiality of the information. Such electronic appliances provide a distributed virtual distribution environment (VDE) that may enforce a secure chain of handling and control, for example, to control and/or meter or otherwise monitor use of electronically stored or disseminated information. Such a virtual distribution environment may be used to protect rights of various participants in electronic commerce and other electronic or electronic-facilitated transactions. Distributed and other operating systems, environments and architectures, such as, for example, those using tamper-resistant hardware-based processors, may establish security at each node. These techniques may be used to support an all-electronic information distribution, for example, utilizing the "electronic highway."

U.S. Pat. No. 6,009,177 (Sudia, Dec. 28, 1999), expressly incorporated herein by reference, relates to a cryptographic system and method with a key escrow feature that uses a method for verifiably splitting users' private encryption keys into components and for sending those components to trusted agents chosen by the particular users, and provides a system that uses modern public key certificate management, enforced by a chip device that also self-certifies. The methods for key escrow and receiving an escrow certificate are also applied herein to a more generalized case of registering a trusted device with a trusted third party and receiving authorization from that party enabling the device to communicate with other trusted devices. Further preferred embodiments provide for rekeying and upgrading of device firmware using a certificate system, and encryption of stream-oriented data.

U.S. Pat. No. 6,052,467 (Brands, Apr. 18, 2000), expressly incorporated herein by reference, relates to a system for ensuring that the blinding of secret-key certificates is restricted, even if the issuing protocol is performed in parallel mode. A cryptographic method is disclosed that enables the issuer in a secret-key certificate issuing protocol to issue triples consisting of a secret key, a corresponding public key, and a secret-key certificate of the issuer on the public key, in such a way that receiving parties can blind the public key and the certificate, but cannot blind a predetermined non-trivial predicate of the secret key even when executions of the issuing protocol are performed in parallel. See, Stefan Brands, Secret Key Certificates, Restrictive Blinding of Secret Key Certificates, Untraceable Off-line Cash in Wallets with Ovservers, and Electronic Cash on the Internet.

U.S. Pat. No. 6,052,780 (Glover, Apr. 18, 2000), expressly incorporated herein by reference, relates to a computer system and process for accessing an encrypted and self-decrypting digital information product while restricting access to decrypted digital information. Some of these problems with digital information protection systems may be overcome by providing a mechanism that allows a content provider to encrypt digital information without requiring either a hardware or platform manufacturer or a content consumer to provide support for the specific form of corresponding decryption. This mechanism can be provided in a manner that allows the digital information to be copied easily for back-up purposes and to be transferred easily for distribution, but which should not permit copying of the digital information in decrypted form. In particular, the encrypted digital information is stored as an executable computer program that includes a decryption program that decrypts the encrypted information to provide the desired digital information, upon successful completion of an authorization procedure by the user. In combination with other mechanisms that track distribution, enforce royalty payments and control access to decryption keys, an improved method is provided for identifying and detecting sources of unauthorized copies. Suitable authorization procedures also enable the digital information to be distributed for a limited number of uses and/or users, thus enabling per-use fees to be charged for the digital information.

See also, U.S. Pat. Nos. 4,200,770 (Cryptographic apparatus and method); 4,218,582 (Public key cryptographic apparatus and method); 4,264,782 (Method and apparatus for transaction and identity verification); 4,306,111 (Simple and effective public-key cryptosystem); 4,309,569 (Method of providing digital signatures); 4,326,098 (High security system for electronic signature verification); 4,351,982 (RSA Public-key data encryption system having large random prime number generating microprocessor or the like); 4,365,110 (Multiple-destinational cryptosystem for broadcast networks); 4,386,233 (Crytographic key notarization methods and apparatus); 4,393,269 (Method and apparatus incorporating a one-way sequence for transaction and identity verification); 4,399,323 (Fast real-time public key cryptography); 4,405,829 (Cryptographic communications system and method); 4,438,824 (Apparatus and method for cryptographic identity verification); 4,453,074 (Protection system for intelligent cards); 4,458,109 (Method and apparatus providing registered mail features in an electronic communication system); 4,471,164 (Stream cipher operation using public key cryptosystem); 4,514,592 (Cryptosystem); 4,528,588 (Method and apparatus for marking the information content of an information carrying signal); 4,529,870 (Cryptographic identification, financial transaction, and credential device); 4,558,176 (Computer systems to inhibit unauthorized copying, unauthorized usage, and automated cracking of protected software); 4,567,600 (Method and apparatus for maintaining the privacy of digital messages conveyed by public transmission); 4,575,621 (Portable electronic transaction device and system therefor); 4,578,531 (Encryption system key distribution method and apparatus); 4,590,470 (User authentication system employing encryption functions); 4,595,950 (Method and apparatus for marking the information content of an information carrying signal); 4,625,076 (Signed document transmission system); 4,633,036 (Method and apparatus for use in public-key data encryption system); 5,991,406 (System and method for data recovery); 6,026,379 (System, method and article of manufacture for managing transactions in a high availability system); 6,026,490 (Configurable cryptographic processing engine and method); 6,028,932 (Copy prevention method and apparatus for digital video system); 6,028,933 (Encrypting method and apparatus enabling multiple access for multiple services and multiple transmission modes over a broadband communication network); 6,028,936 (Method and apparatus for authenticating recorded media); 6,028,937 (Communication device which performs two-way encryption authentication in challenge response format); 6,028,939 Data security system and method); 6,029,150 (Payment and transactions in electronic commerce system); 6,029,195 (System for customized electronic identification of desirable objects); 6,029,247 (Method and apparatus for transmitting secured data); 6,031,913 (Apparatus and method for secure communication based on channel characteristics); 6,031,914 (Method and apparatus for embedding data, including watermarks, in human perceptible images); 6,034,618 (Device authentication system which allows the authentication function to be changed); 6,035,041 (Optimal-resilience, proactive, public-key cryptographic system and method); 6,035,398 (Cryptographic key generation using biometric data); 6,035,402 (Virtual certificate authority); 6,038,315 (Method and system for normalizing biometric variations to authenticate users from a public database and that ensures individual biometric data privacy); 6,038,316 (Method and system for protection of digital information); 6,038,322 (Group key distribution); 6,038,581 (Scheme for arithmetic operations in finite field and group operations over elliptic curves realizing improved computational speed); 6,038,665 (System and method for backing up computer files over a wide area computer network); 6,038,666 (Remote identity verification technique using a personal identification device); 6,041,122 (Method and apparatus for hiding cryptographic keys utilizing autocorrelation timing encoding and computation); 6,041,123 (Centralized secure communications system); 6,041,357 (Common session token system and protocol); 6,041,408 (Key distribution method and system in secure broadcast communication); 6,041,410 (Personal identification fob); 6,044,131 (Secure digital x-ray image authentication method); 6,044,155 (Method and system for securely archiving core data secrets); 6,044,157 (Microprocessor suitable for reproducing AV data while protecting the AV data from illegal copy and image information processing system using the microprocessor); 6,044,205 (Communications system for transferring information between memories according to processes transferred with the information); 6,044,349 (Secure and convenient information storage and retrieval method and apparatus); 6,044,350 (Certificate meter with selectable indemnification provisions); 6,044,388 (Pseudorandom number generator); 6,044,462 (Method and apparatus for managing key revocation); 6,044,463 (Method and system for message delivery utilizing zero knowledge interactive proof protocol); 6,044,464 (Method of protecting broadcast data by fingerprinting a common decryption function); 6,044,466 (Flexible and dynamic derivation of permissions); 6,044,468 (Secure transmission using an ordinarily insecure network communication protocol such as SNMP); 6,047,051 (Implementation of charging in a telecommunications system); 6,047,066 (Communication method and device); 6,047,067 (Electronic-monetary system); 6,047,072 (Method for secure key distribution over a nonsecure communications network); 6,047,242 (Computer system for protecting software and a method for protecting software); 6,047,268 (Method and apparatus for billing for transactions conducted over the internet); 6,047,269 (Self-contained payment system with circulating digital vouchers); 6,047,374 (Method and apparatus for embedding authentication information within digital data); 6,047,887 (System and method for connecting money modules); 6,049,610 (Method and apparatus for digital signature authentication); 6,049,612 (File encryption method and system); 6,049,613 (Method and apparatus for encrypting, decrypting, and providing privacy for data values); 6,049,671 (Method for identifying and obtaining computer software from a network computer); 6,049,785 (Open network payment system for providing for authentication of payment orders based on a confirmation electronic mail message); 6,049,786 (Electronic bill presentment and payment system which deters cheating by employing hashes and digital signatures); 6,049,787 (Electronic business transaction system with notarization database and means for conducting a notarization procedure); 6,049,838 (Persistent distributed capabilities); 6,049,872 (Method for authenticating a channel in large-scale distributed systems); 6,049,874 (System and method for backing up computer files over a wide area computer network); 6,052,466 (Encryption of data packets using a sequence of private keys generated from a public key exchange); 6,052,467 (System for ensuring that the blinding of secret-key certificates is restricted, even if the issuing protocol is performed in parallel mode); 6,052,469 (Interoperable cryptographic key recovery system with verification by comparison); 6,055,314 (System and method for secure purchase and delivery of video content programs); 6,055,321 (System and method for hiding and extracting message data in multimedia data); 6,055,508 (Method for secure accounting and auditing on a communications network); 6,055,512 (Networked personal customized information and facility services); 6,055,636 (Method and apparatus for centralizing processing of key and certificate life cycle management); 6,055,639 (Synchronous message control system in a Kerberos domain); 6,056,199 (Method and apparatus for storing and reading data); 6,057,872 (Digital coupons for pay televisions); 6,058,187 (Secure telecommunications data transmission); 6,058,188 (Method and apparatus for interoperable validation of key recovery information in a cryptographic system); 6,058,189 (Method and system for performing secure electronic monetary transactions); 6,058,193 (System and method of verifying cryptographic postage evidencing using a fixed key set); 6,058,381 (Many-to-many payments system for network content materials); 6,058,383 (Computationally efficient method for trusted and dynamic digital objects dissemination); 6,061,448 (Method and system for dynamic server document encryption); 6,061,454 (System, method, and computer program for communicating a key recovery block to enable third party monitoring without modification to the intended receiver); 6,061,692 (System and method for administering a meta database as an integral component of an information server); 6,061,789 (Secure anonymous information exchange in a network); 6,061,790 (Network computer system with remote user data encipher methodology); 6,061,791 (Initial secret key establishment including facilities for verification of identity); 6,061,792 (System and method for fair exchange of time-independent information goods over a network); 6,061,794 (System and method for performing secure device communications in a peer-to-peer bus architecture); 6,061,796 (Multi-access virtual private network); 6,061,799 (Removable media for password based authentication in a distributed system); 6,064,723 (Network-based multimedia communications and directory system and method of operation); 6,064,738 (Method for encrypting and decrypting data using chaotic maps); 6,064,740 (Method and apparatus for masking modulo exponentiation calculations in an integrated circuit); 6,064,741 (Method for the computer-aided exchange of cryptographic keys between a user computer unit U and a network computer unit N); 6,064,764 (Fragile watermarks for detecting tampering in images); 6,064,878 (Method for separately permissioned communication); 6,065,008 (System and method for secure font subset distribution); 6,067,620 (Stand alone security device for computer networks); 6,069,647 (Conditional access and content security method); 6,069,952 Data copyright management system); 6,069,954 (Cryptographic data integrity with serial bit processing and pseudo-random generators); 6,069,955 (System for protection of goods against counterfeiting); 6,069,969 (Apparatus and method for electronically acquiring fingerprint images); 6,069,970 (Fingerprint sensor and token reader and associated methods); 6,070,239 (System and method for executing verifiable programs with facility for using non-verifiable programs from trusted sources); 6,072,870 (System, method and article of manufacture for a gateway payment architecture utilizing a multichannel, extensible, flexible architecture); 6,072,874 (Signing method and apparatus using the same); 6,072,876 (Method and system for depositing private key used in RSA cryptosystem); 6,073,125 (Token key distribution system controlled acceptance mail payment and evidencing system); 6,073,160 (Document communications controller); 6,073,172 (Initializing and reconfiguring a secure network interface); 6,073,234 (Device for authenticating user's access rights to resources and method); 6,073,236 (Authentication method, communication method, and information processing apparatus); 6,073,237 (Tamper resistant method and apparatus); 6,073,238 (Method of securely loading commands in a smart card); 6,073,242 (Electronic authority server); 6,075,864 (Method of establishing secure, digitally signed communications using an encryption key based on a blocking set cryptosystem); 6,075,865 (Cryptographic communication process and apparatus); 6,076,078 (Anonymous certified delivery); 6,076,162 (Certification of cryptographic keys for chipcards); 6,076,163 (Secure user identification based on constrained polynomials); 6,076,164 (Authentication method and system using IC card); 6,076,167 (Method and system for improving security in network applications); 6,078,663 (Communication apparatus and a communication system); 6,078,665 (Electronic encryption device and method); 6,078,667 (Generating unique and unpredictable values); 6,078,909 (Method and apparatus for licensing computer programs using a DSA signature); 6,079,018 (System and method for generating unique secure values for digitally signing documents); 6,079,047 (Unwrapping system and method for multiple files of a container); 6,081,597 (Public key cryptosystem method and apparatus); 6,081,598 (Cryptographic system and method with fast decryption); 6,081,610 (System and method for verifying signatures on documents); 6,081,790 (System and method for secure presentment and payment over open networks); 6,081,893 (System for supporting secured log-in of multiple users into a plurality of computers using combined presentation of memorized password and transportable passport record), 6,192,473 (System and method for mutual authentication and secure communications between a postage security device and a meter server), 6,141,750 (Micali); 6,137,884 (Micali); 6,134,326 (Micali); 6,026,163 (Micali); 5,182,670 (Micali); 5,790,665 (Micali); 5,666,420 (Micali); 5,666,414 (Micali); 5,629,982 (Micali); 5,604,804 (Micali); 5,553,145 (Micali); 5,315,658 (Micali); 5,276,737 (Micali); 5,519,778 (Leighton et al., (Method for Enabling Users of a Cryptosystem to Generate and use a Private Pair Key for Enciphering Communications Between the Users); 6,073,242 (Hardy, Electronic Authority Server); 4,405,829 (Rivest, Cryptographic Communications System and Method); 4,218,582; 6,108,644 (Goldschlag, System and Method for Electronic Transactions); 6,108,787 (Anderson, Method and means for interconnecting different security levels); 6,151,395 (Harkins, System and method for regenerating secret keys in Diffie-Hellman communication sessions); 5,945,877 (Traw, Content protection for transmission systems); 6,072,876 (Obata, Method for Depositing Key in RSA Cryptosystem); 5,768,388 (Goldwasser, Time Delayed Key Escrow); 6,158,010 (Moriconi, System and method for maintaining security in a distributed computer network); 6,148,342 (Ho, Secure Database Management System for Confidential Records Using Separately Encrypted Identifier and Access Request); 5,920,630 (Wertheimer, Method of public key cryptography that includes key escrow); 6,119,229 (Martinez, Virtual property system); 5,745,573 (Lipner, System and Method for Controlling Access to a User Secret); 5,631,961 (Mills, Device for and Method of Cryptography that Allows Third Party Access); 6,044,350 (Weiant, Certificate Meter with Selectable Indemnification Provisions); 5,933,498 (Schneck, System for Controlling Access and Distribution of Digital Property); 5,737,419 (Ganesan, Computer system for securing communications using split private key asymmetric cryptography); 6,175,626 (Aucsmith, Digital certificates containing multimedia data extensions); 6,112,181 (Shear, Systems and methods for matching, selecting, narrowcasting, and/or classifying based on rights management and/or other information); 6,157,721 (Shear, Systems and methods using cryptography to protect secure computing environments); 5,592,549 (Nagel, Method and apparatus for retrieving selected information from a secure information source); 6,161,181 (Haynes, Secure Electronic Transactions Using a Trusted Intermediary); 6,145,079 (Misty, Secure Electronic Transactions Using a Trusted Intermediary to Perform Electronic Services); 6,118,874 (Okamoto, Encrypted data recovery method using split storage key and system thereof), each of which is expressly incorporated herein by reference.

See, also, U.S. Pat. Nos. 6,028,937 (Tatebayashi et al.), 6,026,167 (Aziz), 6,009,171 (Ciacelli et al.) (Content Scrambling System, or "CSS"), 5,991,399 (Graunke et al.), 5,948,136 (Smyers) (IEEE 1394-1995), and 5,915,018 (Aucsmith), expressly incorporated herein by reference, and Jim Wright and Jeff Robillard (Philsar Semiconductor), "Adding Security to Portable Designs", Portable Design, March 2000, pp. 16-20.

See also, Stefik, U.S. Pat. Nos. 5,715,403 (System for controlling the distribution and use of digital works having attached usage rights where the usage rights are defined by a usage rights grammar); 5,638,443 (System for controlling the distribution and use of composite digital works); 5,634,012 (System for controlling the distribution and use of digital works having a fee reporting mechanism); and 5,629,980 (System for controlling the distribution and use of digital works), expressly incorporated herein by reference.

See:

Elaine Barker, NIST Cryptographic Toolkit, National Information Security Conference (Oct. 16, 2000); Department of Defense, Trusted Computer System Evaluation Criteria.

Whitfield Diffie and Martin Hellman, Privacy and Authentication: An Introduction to Cryptography at http://www.cs.berkeley.edu/~gribble/osprelims/summaries/priv_auth.html.

Vannevar Bush: As We May Think, Atlantic Monthly, Vol. 176, No. 1, 1945, pp. 101-108, reprinted at http://www.press.umich.edu/jep.

Mihir Bellaire and Shaft Goldwasser, Verifiable Partial Key Escrow appearing in Proceedings of the Fourth Annual Conference on Computer and Communications Security, ACM, 1997.

Dorothy Denning, Descriptions of Key Escrow Systems (Version of Feb. 26, 1997) Communications of the ACM (orig. pub. March 1996), reprinted at http://www.cs.georgetown.edu/~denning/crypto/Appendix.html.

Dorothy Denning and Dennis K. Branstad, A Taxonomy for Key Escrow Encryption Systems, Communications of the ACM, vol. 39, No. 3, March 1996 reprinted at http://www.cs.georgetown.edu/~denning/crypto/Taxonomy.html.

A. Michael Froomkin, The Metaphor is the Key: Cryptography, the Clipper Chip, and the Constitution, 143 University of Pennsylvania Law Review 709-887 (1995).

A. Michael Froomkin, It Came From Planet Clipper: The Battle Over Cryptographic Key "Escrow", 1996 University of Chicago Legal Forum 15-75 (1996).

Lance J. Hoffman, Balanced Key Escrow (Aug. 4, 1995) (GWU-ICTSP-04) printed at ftp://coast.cs.purdue.edu/pub/doc/cryptography/hoffman_balanced_escrow.html.

Wenbo Mao, Verifiable Partial Key Escrow of Integer Factors (Nov. 16, 2000).

Microsoft Corporation, Encryption and Decryption (Sep. 10, 1996) at http://msdn.microsoft.com/workshop/security/capi/PKCB/crypt4.asp reprinted on 2-10-01.

National Computer Security Center, A Guide to Understanding Discretionary Access Control in Trusted Systems (Sep. 30, 1987) NCSC-TG-003 printed at http://www.certec.or.kr/paper/authent/discretionary_access_control.txt.

James Nechvatal, Elaine Barker, Lawrence Bassham, William Burr, Morris Dworkin, James Foti, and Edward Roback, Computer Security Division, NIST, Report on the Development of the Advanced Encryption Standard (Oct. 2, 2000).

Ravi Sandhu, Separation of Duties In Computerized Information Systems (1991), Proceedings of the IFIP WG 11.3 Workshop on Database Security, Halifax, U.K.

Mark Stefik, Trusted Systems, Scientific American, March 1997, pp. 78-81.

Stephen T. Walker, Steven B. Lipner, Carl M. Ellison, Dennis K. Branstad, David M. Balenson, Commercial Key Escrow at http://www.epic.org./crypto/key_escrow/TIS_cke.html Zero Knowledge Systems, Private Credentials (November 2000).

Watermarking

U.S. Pat. No. 5,699,427 (Chow, et al., Dec. 16, 1997), expressly incorporated herein by reference, relates to a method to deter document and intellectual property piracy through individualization, and a system for identifying the authorized receiver of any particular copy of a document. More specifically, each particular copy of a document is fingerprinted by applying a set of variations to a document, where each variation is a change in data contents, but does not change the meaning or perusal experience of the document. A database associating a set of variants to a receiver is maintained. Thus any variant or copy of that variant can be traced to an authorized receiver.

See also, U.S. Pat. Nos. 4,734,564 (Transaction system with off-line risk assessment); 4,812,628 (Transaction system with off-line risk assessment); 4,926,325 (Apparatus for carrying out financial transactions via a facsimile machine); 5,235,166 Data verification method and magnetic media therefor); 5,254,843 (Securing magnetically encoded data using timing variations in encoded data); 5,341,429 (Transformation of ephemeral material); 5,428,683 (Method and apparatus for fingerprinting and authenticating magnetic media); 5,430,279 Data verification method and magnetic media therefor); 5,521,722 (Image handling facilitating computer aided design and manufacture of documents); 5,546,462 (Method and apparatus for fingerprinting and authenticating various magnetic media); 5,606,609 (Electronic document verification system and method); 5,613,004 (Steganographic method and device); 5,616,904 Data verification method and magnetic media therefor); 5,636,292 (Steganography methods employing embedded calibration data); 5,646,997 (Method and apparatus for embedding authentication information within digital data); 5,659,726 Data embedding); 5,664,018 (Watermarking process resilient to collusion attacks); 5,687,236 (Steganographic method and device); 5,710,834 (Method and apparatus responsive to a code signal conveyed through a graphic image); 5,727,092 (Compression embedding); 5,734,752 (Digital watermarking using stochastic screen patterns); 5,740,244 (Method and apparatus for improved fingerprinting and authenticating various magnetic media); 5,745,569 (Method for stega-cipher protection of computer code); 5,745,604 (Identification/authentication system using robust, distributed coding); 5,748,763 (Image steganography system featuring perceptually adaptive and globally scalable signal embedding); 5,748,783 (Method and apparatus for robust information coding); 5,761,686 (Embedding encoded information in an iconic version of a text image); 5,765,152 (System and method for managing copyrighted electronic media); 5,768,426 (Graphics processing system employing embedded code signals); 5,778,102 (Compression embedding); 5,790,703 (Digital watermarking using conjugate halftone screens); 5,819,289 Data embedding employing degenerate clusters of data having differences less than noise value); 5,822,432 (Method for human-assisted random key generation and application for digital watermark system); 5,822,436 (Photographic products and methods employing embedded information); 5,832,119 (Methods for controlling systems using control signals embedded in empirical data); 5,841,886 (Security system for photographic identification); 5,841,978 (Network linking method using steganographically embedded data objects); 5,848,155 (Spread spectrum watermark for embedded signalling); 5,850,481 (Steganographic system); 5,862,260 (Methods for surveying dissemination of proprietary empirical data); 5,878,137 (Method for obtaining authenticity identification devices for using services in general, and device obtained thereby); 5,889,868 (Optimization methods for the insertion, protection, and detection of digital watermarks in digitized data); 5,892,900 (Systems and methods for secure transaction management and electronic rights protection); 5,905,505 (Method and system for copy protection of on-screen display of text); 5,905,800 (Method and system for digital watermarking); 5,915,027 (Digital watermarking); 5,920,628 (Method and apparatus for fingerprinting and authenticating various magnetic media); 5,930,369 (Secure spread spectrum watermarking for multimedia data); 5,933,498 (System for controlling access and distribution of digital property); 5,943,422 (Steganographic techniques for securely delivering electronic digital rights management control information over insecure communication channels); 5,946,414 (Encoding data in color images using patterned color modulated image regions); 5,949,885 (Method for protecting content using watermarking); 5,974,548 (Media-independent document security method and apparatus); 5,995,625 (Electronic cryptographic packing); 6,002,772 Data management system); 6,004,276 (Open architecture cardiology information system); 6,006,328 (Computer software authentication, protection, and security system); 6,006,332 (Rights management system for digital media); 6,018,801 (Method for authenticating electronic documents on a computer network); 6,026,193 (Video steganography); 6,044,464 (Method of protecting broadcast data by fingerprinting a common decryption function); 6,047,374 (Method and apparatus for embedding authentication information within digital data); 6,049,627 (Covert digital identifying indicia for digital image); 6,061,451 (Apparatus and method for receiving and decrypting encrypted data and protecting decrypted data from illegal use); 6,064,737 (Anti-piracy system for wireless telephony); 6,064,764 (Fragile watermarks for detecting tampering in images); 6,069,914 (Watermarking of image data using MPEG/JPEG coefficients); 6,076,077 Data management system); 6,081,793 (Method and system for secure computer moderated voting), each of which is expressly incorporated herein by reference.

Computer System Security

U.S. Pat. No. 5,881,225 (Worth, Mar. 9, 1999), expressly incorporated herein by reference, relates to a security monitor for controlling functional access to a computer system. A security monitor controls security functions for a computer system. A user desiring access to the system inputs a user identification and password combination, and a role the user to assume is selected from among one or more roles defined in the system. Upon being validated as an authorized user performing a particular role, the user is then authorized to perform certain functions and tasks specifically and to see information associated with that role and optimally the work group the user is assigned). For some users, no role or a "null" roll is chosen, and authorization for certain functions and tasks is accomplished due to that particular user having been pre-defined by an administrator as being allowed to perform those functions and tasks, usually due to the predefined privileges associated with the work group(s) to which the user belongs.

U.S. Pat. No. 5,937,068 (Audebert, Aug. 10, 1999), expressly incorporated herein by reference, relates to a system and method for user authentication employing dynamic encryption variables. The system includes a first card-like unit adapted to communicate with a second unit giving only conditionally access to a function. Both units are capable of running software for generating a password by means of encryption of a plurality of dynamic variables produced separately but in concert (so as to have a predetermined relationship, such as identity, with one another) in the units. The encryption is carried out in each unit by a public algorithm using a dynamically varying encryption key. Each time an access request is issued by a card user, the key is modified as a function of the number of access requests previously formulated by the card user. Access to the function is granted when the passwords generated in the units have a predetermined relationship such as identity) with each other. In a "virtual token" implementation, the first unit can be a smart card, which stores the dynamic key and the variable representing the number of formulated authentication requests and executes an encryption algorithm, a smart card reader and a computer such as a personal computer. Either the smart card reader or the personal computer can generate the time dependent variable. In a "software token" implementation, the functions of the first unit are performed by a personal computer, thus eliminating the need for a smart card or a smart card reader.

U.S. Pat. No. 5,949,882 (Angelo, Sep. 7, 1999), expressly incorporated herein by reference, relates to a method and apparatus for allowing access to secured computer resources by utilizing a password and an external encryption algorithm. A method for permitting access to secured computer resources based upon a two-piece user verification process is provided. In one embodiment, the user verification process is carried out during a secure power-up procedure. At some point during the secure power-up procedure, the computer user is required to provide an external token or smart card that is coupled to the computer through specialized hardware. The token or smart card is used to store an encryption algorithm furnished with an encryption key that is unique or of limited production. The computer user is then required to enter a plain text user password. Once entered, the user password is encrypted using the encryption algorithm contained in the external token to create a peripheral password. The peripheral password is compared to a value stored in either secure system memory or in memory contained within a secured resource itself. If the two values match, access to the secured resource is permitted. In an alternate embodiment, the two-piece authentication process is conducted during normal computer operation outside of the secure power-on sequence. In this embodiment, the user password is entered by means of a secure keyboard communications channel. In either embodiment, the two-piece nature of the authorization process requires the presence of both the user password and the external token in order to generate the peripheral password.

U.S. Pat. No. 5,953,419 (Lohstroh, et al., Sep. 14, 1999), expressly incorporated herein by reference, relates to a cryptographic file labeling system for supporting secured access by multiple users. A system is disclosed for automatically distributing secured versions of a file decryption key to a plurality of file users by way of the file's security label. The label is defined to contain a plurality of Access-Control-Entries Records (ACER's) where each ACER includes a respective secured version of the file decryption key. Each such secured version is decipherable by a respective ACER private key. Each ACER may include respective other data such as: (a) ACER-unique identifying data for uniquely identifying the ACER or an associated user; (b) decryption algorithm identifying data for identifying the decryption process to be used to decrypt the encrypted data portion of the file; and (c) special handling code for specifying special handling for the code-containing ACER. The label is preferably covered by a digital signature but includes an extension buffer that is not covered by the digital signature. Users who wish to have an ACER of their own added to the label may submit add-on requests by writing to the extension buffer.

U.S. Pat. No. 5,956,400 (Chaum, et al., Sep. 21, 1999), expressly incorporated herein by reference, relates to partitioned information storage systems with controlled retrieval. An information storage system includes one or more information update terminals, a mapper, one or more partial-databases, and one or more query terminals, exchanging messages over a set of communication channels. An identifier-mapping mechanism provides to an update terminal) a method for delegating control over retrieval of the data stored at the partial-databases to one or more mappers, typically operated by one or more trusted third parties. Update terminals supply information, which is stored in fragmented form by the partial-databases. Data-fragment identifiers and pseudonyms are introduced, preventing unauthorized de-fragmentation of information—thus providing compliance to privacy legislation—while at the same time allowing query terminals to retrieve (part of the stored data or learn properties of the stored data. The mapper is necessarily involved in both operations, allowing data access policies to be enforced and potential abuse of stored information to be reduced. Introduction of multiple mappers acts to distribute information retrieval control among multiple trusted third parties. Introducing so-called "groupers", increases the efficiency of data retrieval for a common set of queries and further reduces potential abuse of information. See, See, David Chaum, Achieving Electronic Privacy, Scientific American, August 1992, p. 96-101.

U.S. Pat. No. 5,958,050 (Griffin, et al., Sep. 28, 1999), expressly incorporated herein by reference, relates to a trusted delegation system. A trust manager examines each new class before it is allowed to execute by examining a policy file which includes data structures defining security policies of the user system, a certificate repository for storing a plurality of certificates, a certificate being a data record which is digitally signed and which certifies claims relevant to a security evaluation, a code examiner adapted to analyze the portion of code to determine potential resource use of the portion of code and a trust evaluator adapted to evaluate certificate requirements of the portion of code based on policy rules extracted from the policy file and the potential resource use specified by the code examiner. The trust evaluator also determines, from certificates from the certificate repository and a code identifier identifying the portion of code, whether execution of the portion of code is allowed by the policy rules given the potential resource use, the code supplier and applicable certificates. Certificates and policies can be specified in hierarchical form, so that some levels of security can be delegated to trusted entities.

U.S. Pat. No. 5,978,475 (Schneier, et al., Nov. 2, 1999), expressly incorporated herein by reference, relates to an event auditing system. In many computer applications, sensitive information must be kept on an untrusted machine. Such information must be protected against attackers, as well as against partially trusted entities to be given partial, but not total, access to the stored information. A method, apparatus and computer-readable data structure are provided for inhibiting an attacker from accessing or corrupting information stored by an untrusted machine. More specifically, in a log file generated during a process in which the untrusted machine is in limited communication with a trusted machine, entries generated prior to the attack remain secure they cannot be modified without detection), even though subsequent entries can not be trusted. One embodiment also allows a partially trusted verifier to read and verify entries in the log file, but not to change them without detection. In another embodiment, operating with or without the trusted machine, the untrusted machine's log file can also incorporate log files of other processes.

U.S. Pat. No. 5,991,878 (McDonough, et al., Nov. 23, 1999), expressly incorporated herein by reference, relates to a system and method for controlling access to information in a distributed computing system. A request for the information is received and is accompanied by encrypted session state data. Based on the encrypted session state data, it is determined whether to pass the request on to a source of the information. In a memory buffer, old data is replaced by overwriting with a unique identifier. After the memory buffer has received new data and a procedure has been executed for copying the contents of the memory buffer to a destination, it is determined whether the unique identifier may be found at the destination.

U.S. Pat. No. 6,070,239 (McManis, May 30, 2000), expressly incorporated herein by reference, relates to a system and method for executing verifiable programs with facility for using non-verifiable programs from trusted sources. A computer system includes a program executer that executes verifiable architecture neutral programs and a class loader that prohibits the loading and execution of non-verifiable programs unless (A) the non-verifiable program resides in a trusted repository of such programs, or (B) the non-verifiable program is indirectly verifiable by way of a digital signature on the non-verifiable program that proves the program was produced by a trusted source. In the preferred embodiment, verifiable architecture neutral programs are Java bytecode programs whose integrity is verified using a Java bytecode program verifier. The non-verifiable programs are generally architecture specific compiled programs generated with the assistance of a compiler. Each architecture specific program typically includes two signatures, including one by the compiling party and one by the compiler. Each digital signature includes a signing party identifier and an encrypted message. The encrypted message includes a message generated by a predefined procedure, and is encrypted using a private encryption key associated with the signing party. A digital signature verifier used by the class loader includes logic for processing each digital signature by obtaining a public key associated with the signing party, decrypting the encrypted message of the digital signature with that public key so as generate a decrypted message, generating a test message by executing the predefined procedure on the architecture specific program associated with the digital signature, comparing the test message with the decrypted message, and issuing a failure signal if the decrypted message digest and test message digest do not match.

U.S. Pat. No. 6,079,021 (Abadi, et al., Jun. 20, 2000), expressly incorporated herein by reference, relates to a method and apparatus for strengthening passwords for protection of computer systems. A computer-implemented method provides access to processes and data using strengthened password. During an initialization phase, an access code is stored in a memory of a computer system. The access code is an application of a one-way hash function to a concatenation of a password and a password supplement. The size of the password supplement is a fixed number of bits. During operation of the system, a user enters a password, and the one-way hash function is applied to concatenations of the password and possible values having the size of the password supplement to yield trial access codes. Access is granted when one of the trial access codes is identical to the stored access code.

See:

U.S. Pat. No. 6,141,758 (Banantar, Method and system for maintaining client server associations in a distributed computing system), expressly incorporated herein by reference.

M. Abadi, M. Burrows, B. Lampson, G. Plotkin A Calculus for Access Control in Distributed Systems Computer Security Devices U.S. Pat. No. 5,982,520 (Weiser, et al., Nov. 9, 1999), expressly incorporated herein by reference, relates to a personal storage device for receipt, storage, and transfer of digital information to other electronic devices has a pocket sized crush resistant casing with a volume of less than about ten cubic centimeters. A processor is positioned within the casing cavity and attached to the crush resistant casing, while a memory module also positioned within the casing cavity is configured to store received executable applications and data. An infrared transceiver is mounted on the crush resistant casing and in electronic communication with the processor and memory module to provide for receipt and storage of executable applications, and receipt, storage, and transfer of digital information to other electronic devices. The digital information stored by the personal storage device can be intermittently synchronized with other electronic devices.

U.S. Pat. No. 5,991,519 (Benhammou, et al., Nov. 23, 1999), expressly incorporated herein by reference, relates to a secure memory having multiple security levels. A secured memory comprises a first level security zone having an access code controlling access to the secured memory prior to an issuer fuse being blown, a security code attempts counter preventing access to the secured memory when a predetermined number of attempts at matching the access code have been made prior to resetting the security code attempts counter, a plurality of application zones, each of the plurality of application zones comprising: a storage memory zone, an application security zone having an application zone access code controlling access to the storage memory zone after an issuer fuse has been blown, an application zone security code attempts counter preventing access to the application zone when a predetermined number of attempts at matching the application zone access code have been made prior to resetting the application zone security code attempts counter, an erase key partition having an erase key code controlling erase access to the storage memory zone after an issuer fuse has been blown, and an erase key attempts counter preventing erase access to the application zone when a predetermined number of attempts at matching the erase key code have been made prior to resetting the erase key attempts counter.

U.S. Pat. No. 5,999,629 (Neer, et al., Dec. 7, 1999), expressly incorporated herein by reference, relates to a data encryption security module. Encryption keys used to encrypt such messages need to be managed in a highly secure manner. A unique device encryption key is generated, a cryptographic key formed from a unique identification key and an associated public key, and at least one program encryption key, in which the public key is generated as a function of the unique identification key. The module then encrypts the unique identification key and program encryption key using said device encryption key and stores the encrypted result in memory internal to security module, thereby securing the keys against misappropriation. In addition, the module provides a mechanism for using the program encryption key to encrypt information that it receives from an external source and store the encrypted information in memory external to the security module, and responsive to receiving from a requester a request for the program encryption key, encrypting the program encryption key, using a symmetrical encryption key generated as a function of a public key generated by a security module associated with the requester. The former security module then supplies the encrypted program encryption key to the requester.

U.S. Pat. No. 6,034,618 (Tatebayashi, et al., Mar. 7, 2000), expressly incorporated herein by reference, relates to a device authentication system that allows the authentication function to be changed. A decoder apparatus generates a random number for authenticating the optical disc drive apparatus and sends it to the optical disc drive apparatus as the challenge data. The optical disc drive apparatus selects one out of sixteen claimant functions stored in the claimant function unit and calculates the function value, which it sends to the decoder apparatus as the response data. The decoder apparatus compares the response data with sixteen function values to that are obtained using the sixteen verification functions stored in the verification function unit, and authenticates the optical disc drive apparatus when at least one of the function values matches the response data.

U.S. Pat. No. 6,041,412 (Timson, et al., Mar. 21, 2000), expressly incorporated herein by reference, relates to an apparatus and a method for providing access to a secured data or area, includes at least two secure data modules which contain security data and other information and which belong to a particular security scheme and a dual module reader for reading data and permissions instructions contained on the secure data modules. The two secure data modules include an enabling module and an interrogatable module. The interrogatable module and the enabling module communicate with each other via a dual module reader. Communication between the two modules is allowed as long as the two modules are members of the same security scheme. A scheme is defined by suitable proprietary encryption keys for enabling communication and data transfer between the two modules belonging to a common scheme and for preventing communication and data transfer between two modules belonging to different schemes. The communication between the two modules provides an improved data security and access control system that eliminates the need for multiple passwords for various operations and also prevents problems associated with conventional access cards that are used in conjunction with passwords.

U.S. Pat. No. 6,061,451 (Muratani, et al., May 9, 2000), expressly incorporated herein by reference, relates to an apparatus and method for receiving and decrypting encrypted data and protecting decrypted data from illegal use. A data receiving apparatus is formed of a set top unit connected to a network and a security module. Digital video data, supplied from the network and scrambled according to a first system, is scrambled according to a second system in a scramble circuit in the set top unit, and is supplied to the security module. The data is descrambled according to the first system in a descramble circuit in the security module, and is transferred back to the set top unit. The data is descrambled according to the second system in a descramble circuit in the set top unit, and is outputted to an image display terminal via an MPEG decoder.

U.S. Pat. No. 6,069,647 (Sullivan, et al., May 30, 2000), expressly incorporated herein by reference, relates to a conditional access and content security method. An interface unit, connected to a programmable unit, is capable of containing a time-sensitive key. The programmable unit is allowed to receive digital content from the interface unit upon establishing that the time-sensitive key is also contained therein.

See, U.S. Pat. Nos. 6,131,090 (Basso, Method and system for providing controlled access to information stored on a portable recording medium); and 6,125,186 (Saito, Encryption Communication System Using an Agent and a Storage Medium for that Agent), expressly incorporated herein by reference.

Computer Network Firewall

U.S. Pat. No. 5,944,823 (Jade, et al., Aug. 31, 1999), expressly incorporated herein by reference, relates to a system and method for providing outside access to computer resources through a firewall. A firewall isolates computer and network resources inside the firewall from networks, computers and computer applications outside the firewall. Typically, the inside resources could be privately owned databases and local area networks (LAN's), and outside objects could include individuals and computer applications operating through public communication networks such as the Internet. Usually, a firewall allows for an inside user or object to originate connection to an outside object or network, but does not allow for connections to be generated in the reverse direction; i.e. from outside in. The system provides a special "tunneling" mechanism, operating on both sides of a firewall, for establishing such "outside in" connections when they are requested by certain "trusted" individuals or objects or applications outside the firewall. The intent here is to minimize the resources required for establishing "tunneled" connections (connections through the firewall that are effectively requested from outside), while also minimizing the security risk involved in permitting such connections to be made at all. The mechanism includes special tunneling applications, running on interface servers inside and outside the firewall, and a special table of "trusted sockets" created and maintained by the inside tunneling application. Entries in the trusted sockets table define objects inside the firewall consisting of special inside ports, a telecommunication protocol to be used at each port, and a host object associated with each port. Each entry is "trusted" in the sense that it is supposedly known only by individuals authorized to have "tunneling" access through the firewall from outside. These applications use the table to effect connections through the firewall in response to outside requests identifying valid table entries.

U.S. Pat. No. 5,968,176 (Nessett, et al., Oct. 19, 1999), expressly incorporated herein by reference, relates to a multilayer firewall system. A system provides for establishing security in a network that includes nodes having security functions operating in multiple protocol layers. Multiple network devices, such as remote access equipment, routers, switches, repeaters and network cards having security functions are configured to contribute to implementation of distributed firewall functions in the network. By distributing firewall functionality throughout many layers of the network in a variety of network devices, a pervasive firewall is implemented. The pervasive, multilayer firewall includes a policy definition component that accepts policy data that defines how the firewall should behave. The policy definition component can be a centralized component, or a component that is distributed over the network. The multilayer firewall also includes a collection of network devices that are used to enforce the defined policy. The security functions operating in this collection of network devices across multiple protocol layers are coordinated by the policy definition component so that particular devices enforce that part of the policy pertinent to their part of the network.

U.S. Pat. No. 5,983,350 (Minear, et al., Nov. 9, 1999), expressly incorporated herein by reference, relates to a secure firewall supporting different levels of authentication based on address or encryption status. A system and method is provided for regulating the flow of messages through a firewall having a network protocol stack, wherein the network protocol stack includes an Internet Protocol (IP) layer, the method comprising establishing a security policy, determining, at the IP layer, if a message is encrypted, if the message is not encrypted, passing the unencrypted message up the network protocol stack to an application level proxy, and if the message is encrypted, decrypting the message and passing the decrypted message up the network protocol stack to the application level proxy, wherein decrypting the message includes executing a process at the IP layer to decrypt the message.

U.S. Pat. No. 6,009,475 (Shrader, Dec. 28, 1999), expressly incorporated herein by reference, relates to a system and method for filter rule validation and administration for firewalls. Filter rules on a firewall between a secure computer network and a nonsecure computer network are validated from a user interface. A user interface is presented in which a test packet can be defined. The user interface includes controls for defining values for attributes of the test packet, wherein the attributes of the test packet are selected from a set of attributes of normal packets normally sent between the secure and nonsecure computer networks. A defined test packet is validated against a set of filter rules in the firewall or matched against the filter rules to determine those filter rules with matching attributes to the defined packet. When validating, responsive to the failure of the test packet in the validating step, the filter rule in the set of filter rules that denied the test packet is displayed.

U.S. Pat. No. 6,052,788 (Wesinger, Jr., et al., Apr. 18, 2000), expressly incorporated herein by reference, relates to a firewall, providing enhanced network security and user transparency, for improved network security and maximum user convenience. The firewall employs "envoys" that exhibit the security robustness of prior-art proxies and the transparency and ease-of-use of prior-art packet filters, combining the best of both worlds. No traffic can pass through the firewall unless the firewall has established an envoy for that traffic. Both connection-oriented (e.g., TCP) and connectionless (e.g., UDP-based) services may be handled using envoys. Establishment of an envoy may be subjected to a myriad of tests to "qualify" the user, the requested communication, or both. Therefore, a high level of security may be achieved. The usual added burden of prior-art proxy systems is avoided in such a way as to achieve full transparency—the user can use standard applications and need not even know of the existence of the firewall. To achieve full transparency, the firewall is configured as two or more sets of virtual hosts. The firewall is, therefore, "multi-homed," each home being independently configurable. One set of hosts responds to addresses on a first network interface of the firewall. Another set of hosts responds to addresses on a second network interface of the firewall. In one aspect, programmable transparency is achieved by establishing DNS mappings between remote hosts to be accessed through one of the network interfaces and respective virtual hosts on that interface. In another aspect, automatic transparency may be achieved using code for dynamically mapping remote hosts to virtual hosts in accordance with a technique referred to herein as dynamic DNS, or DDNS.

U.S. Pat. No. 6,061,797 (Jade, et al., May 9, 2000), expressly incorporated herein by reference, relates to a system and method for providing outside access to computer resources through a firewall. A firewall isolates computer and network resources inside the firewall from networks, computers and computer applications outside the firewall. Typically, the inside resources could be privately owned databases and local area networks (LAN's), and outside objects could include individuals and computer applications operating through public communication networks such as the Internet. Usually, a firewall allows for an inside user or object to originate connection to an outside object or network, but does not allow for connections to be generated in the reverse direction; i.e. from outside in. The system provides a special "tunneling" mechanism, operating on both sides of a firewall, for establishing such "outside in" connections when they are requested by certain "trusted" individuals or objects or applications outside the firewall. The intent here is to minimize the resources required for establishing "tunneled" connections (connections through the firewall that are effectively requested from outside), while also minimizing the security risk involved in permitting such connections to be made at all. The mechanism includes special tunneling applications, running on interface servers inside and outside the firewall, and a special table of "trusted sockets" created and maintained by the inside tunneling application. Entries in the trusted sockets table define objects inside the firewall consisting of special inside ports, a telecommunication protocol to be used at each port, and a host object associated with each port. Each entry is "trusted" in the sense that it is supposedly known only by individuals authorized to have "tunneling" access through the firewall from outside.

U.S. Pat. No. 6,061,798 (Coley, et al., May 9, 2000), expressly incorporated herein by reference, relates to a firewall system for protecting network elements connected to a public network. The firewall operates on a stand-alone computer connected between the public network and the network elements to be protected such that all access to the protected network elements must go through the firewall. The firewall application running on the stand-alone computer is preferably the only application running on that machine. The application includes a variety of proxy agents that are specifically assigned to an incoming request in accordance with the service protocol (i.e., port number) indicated in the incoming access request. An assigned proxy agent verifies the authority of an incoming request to access a network element indicated in the request. Once verified, the proxy agent completes the connection to the protected network element on behalf of the source of the incoming request.

See also, U.S. Pat. Nos. 6,075,860 (Apparatus and method for authentication and encryption of a remote terminal over a wireless link); 6,061,798 (Firewall system for protecting network elements connected to a public network); 6,061,797 (Outside access to computer resources through a firewall; 6,052,788 (Firewall providing enhanced network security and user transparency); 6,047,322 (Method and apparatus for quality of service management; 6,041,355 (Method for transferring data between a network of computers dynamically based on tag information); 6,012,088 (Automatic configuration for internet access device); 6,003,084 (Secure network proxy for connecting entities); 5,999,973 Use of web technology for subscriber management activities); 5,991,731 (Method and system for interactive prescription and distribution of prescriptions in conducting clinical studies); 5,983,350 (Secure firewall supporting different levels of authentication based on address or encryption status); 5,968,176 (Multilayer firewall system); 5,960,177 (System for performing remote operation between firewall-equipped networks or devices); 5,958,016 (Internet-web link for access to intelligent network service control); 5,950,195 (Generalized security policy management system and method); 5,944,823 (Outside access to computer resources through a firewall; 5,928,333 (Electronic mail management system for operation on a host computer system); 5,918,227 (On-line directory service with a plurality of databases and processors); 5,915,087 (Transparent security proxy for unreliable message exchange protocols); 5,915,008 (System and method for changing advanced intelligent network services from customer premises equipment; 5,909,493 (Method and system for diagnosis and control of machines using connectionless modes of communication); 5,898,830 (Firewall providing enhanced network security and user transparency); 5,870,744 (Virtual people networking); 5,845,267 (System and method for billing for transactions conducted over the internet from within an intranet; 5,835,726 (System for securing the flow of and selectively modifying packets in a computer network); 5,826,029 (Secured gateway interface); 5,826,014 (Firewall system for protecting network elements connected to a public network); 5,812,398 (Method and system for escrowed backup of hotelled world wide web sites); 5,805,803 (Secure web tunnel); 5,784,463 (Token distribution, registration, and dynamic configuration of user entitlement for an application level security system and method); 5,632,011 (Electronic mail management system for operation on a host computer system); 5,623,601 (Apparatus and method for providing a secure gateway for communication and data exchanges between networks), 6,141,755 (Dowd, Firewall security apparatus for high speed circuit switched networks), each of which is expressly incorporated herein by reference.

Virtual Private Network

U.S. Pat. No. 6,079,020 (Liu, Jun. 20, 2000), expressly incorporated herein by reference, relates to a method and an apparatus for managing a virtual private network operating over a public data network. This public data network has been augmented to include a plurality of virtual private network gateways so that communications across the virtual private network are channeled through the virtual private network gateways. One embodiment includes a system that operates by receiving a command specifying an operation on the virtual private network. The system determines which virtual private network gateways are affected by the command. The system then automatically translates the command into configuration parameters for virtual private network gateways affected by the command. These configuration parameters specify how the virtual private network gateways handle communications between specific groups of addresses on the public data network. The system then transmits the configuration parameters to the virtual private network gateways affected by the command, so that the virtual private network gateways are configured to implement the command.

See also, U.S. Pat. Nos. 6,081,900 (Secure intranet access); 6,081,533 (Method and apparatus for an application interface module in a subscriber terminal unit); 6,079,020 (Method and apparatus for managing a virtual private network); 6,078,946 (System and method for management of connection oriented networks); 6,078,586 (ATM virtual private networks); 6,075,854 (Fully flexible routing service for an advanced intelligent network); 6,075,852 (Telecommunications system and method for processing call-independent signalling transactions); 6,073,172 (Initializing and reconfiguring a secure network interface); 6,061,796 (Multi-access virtual private network); 6,061,729 (Method and system for communicating service information in an advanced intelligent network); 6,058,303 (System and method for subscriber activity supervision); 6,055,575 (Virtual private network system and method); 6,052,788 (Firewall providing enhanced network security and user transparency); 6,047,325 (Network device for supporting construction of virtual local area networks on arbitrary local and wide area computer networks); 6,032,118 (Virtual private network service provider for asynchronous transfer mode network); 6,029,067 (Virtual private network for mobile subscribers); 6,016,318 (Virtual private network system over public mobile data network and virtual LAN); 6,009,430 (Method and system for provisioning databases in an advanced intelligent network); 6,005,859 (Proxy VAT-PSTN origination); 6,002,767 (System, method and article of manufacture for a modular gateway server architecture); 6,002,756 (Method and system for implementing intelligent telecommunication services utilizing self-sustaining, fault-tolerant object oriented architecture), each of which is expressly incorporated herein by reference.

Biometric Authentication

U.S. Pat. No. 5,193,855 (Shamos, Mar. 16, 1993, Patient and healthcare provider identification system), expressly incorporated herein by reference, relates to a patient and healthcare provider identification system which includes a database of patient and healthcare provider information including the identity of each patient and provider and some identification criteria such as fingerprint data); a print scanner for reading the print information from a patient or provider; a control system for matching the print data read by the scanner with the print data stored in memory; and a printer for printing labels or generating stamps or other visually perceptible medium for positively identifying the patient or provider and creating a record of the identification.

U.S. Pat. No. 6,035,406 (Moussa, et al., Mar. 7, 2000), expressly incorporated herein by reference, relates to a plurality-factor security system. The method and system provide for simultaneously authenticating a user using two or more factors, such as both a password and a physical token or both a password and biometric information. The user presents a physical token including a storage device to a processor and attempts to log in using a first password; the processor includes a login service which receives the first password, accesses the storage device to transform the first password into a second password, and authenticates the second password using an operating system for the processor. The storage device includes encrypted information regarding the second password which can be relatively easily determined in response to the first password, but which cannot be relatively easily determined without the first password. The system or the storage device may also store information for biometric authentication of the user.

U.S. Pat. No. 6,052,468 (Hillhouse, Apr. 18, 2000), expressly incorporated herein by reference, relates to a method is disclosed for improving portability of secure encryption key data files. The method provides for re-securing key data files according to different security processes for mobility. For porting an encryption key secured using a fingerprint authentication process to a system having only a password authentication process, a user selects password authentication process, provides a fingerprint and is authorized, provides a new password and then the encryption key is accessed according to the fingerprint authentication process and secured according to the password authentication process. This allows the use of specialized security hardware at one location while retaining an ability to transport encryption keys in a secure fashion to other locations, which do not have similar security hardware. U.S. Pat. No. 6,052,468 therefore provides a system and method for increasing portability of secure access codes, by providing a system comprising a cryptographic key encrypted and stored in a key data file and a secured key for decrypting the cryptographic key wherein the secured key is stored in a secured fashion, a method of securing the secured key comprising the steps of a) accessing stored data associated with the secured key, the data indicative of an access method from a plurality of access methods for accessing the secured key; b) executing the indicated access method to access the secured key; c) selecting a method from the plurality of methods for securing the accessed secured key; d) securing the accessed secured key according to the selected access method; and, e) storing data associated with the secured key, the data indicative of the selected access method. The key may be secured by providing user authentication information; deriving from the user authentication information a second cryptographic key; encrypting the accessed secured key using the second cryptographic key; and the secured key is accessed by the steps of: providing user authentication information; deriving from the user authentication information a third cryptographic key; and, decrypting the secured key using the third cryptographic key. A method of accessing a secured cryptographic key is provided comprising the steps of: a) accessing data associated with the secured cryptographic key to determine an authorization method necessary to access the secured cryptographic key; b) providing user authorization information; and c) executing the determined authorization method to access the secured cryptographic key based on the user authorization information provided. A further method is provided for securing portable key data including encryption key information comprising the steps of: a) selecting a first authorization process from a plurality of authorization processes for securing the portable key data; b) authenticating access to the secured portable key data according to a different authorization process, removing the security from the portable key data; and c) implementing security of the portable key data according to the first authorization process.

U.S. Pat. No. 6,076,167 (Borza, Jun. 13, 2000), expressly incorporated herein by reference, relates to a method of enhancing network security for a communication session initiated between a first computer and a second other computer. From the first computer to the second computer in communications therewith a process for securing communications therebetween is transmitted. One such process is a biometric characterization process for characterizing fingerprints. The process is for execution on the second computer and is selected to be compatible therewith. Communications from the second computer to the first computer are secured using the transmitted process on the second computer and using, on the first computer, a compatible process to the transmitted process. The host computer can modify or replace the process or data particular to the process before each session, during a session, or at intervals.

See also, U.S. Pat. Nos. 6,081,900 (Secure intranet access); 6,081,750 (Ergonomic man-machine interface incorporating adaptive pattern recognition based control system); 6,081,199 (Locking device for systems access to which is time-restricted); 6,079,621 (Secure card for E-commerce and identification); 6,078,265 (Fingerprint identification security system); 6,076,167 (Method and system for improving security in network applications); 6,075,455 (Biometric time and attendance system with epidermal topographical updating capability); 6,072,894 (Biometric face recognition for applicant screening); 6,070,141 (System and method of assessing the quality of an identification transaction using an identification quality score); 6,068,184 (Security card and system for use thereof); 6,064,751 (Document and signature data capture system and method; 6,056,197 (Information recording method for preventing alteration, information recording apparatus, and information recording medium); 6,052,468 (Method of securing a cryptographic key); 6,045,039 (Cardless automated teller transactions); 6,044,349 (Secure and convenient information storage and retrieval method and apparatus); 6,044,155 (Method and system for securely archiving core data secrets); 6,041,410 (Personal identification fob); 6,040,783 (System and method for remote, wireless positive identity verification); 6,038,666 (Remote identity verification technique using a personal identification device); 6,038,337 (Method and apparatus for object recognition); 6,038,315 (Method and system for normalizing biometric variations to authenticate users from a public database and that ensures individual biometric data privacy); 6,037,870 (Detector system for access control, and a detector assembly for implementing such a system); 6,035,406 (Plurality-factor security system); 6,035,402 (Virtual certificate authority); 6,035,398 (Cryptographic key generation using biometric data); 6,031,910 (Method and system for the secure transmission and storage of protectable information); 6,026,166 (Digitally certifying a user identity and a computer system in combination); 6,018,739 (Biometric personnel identification system); 6,016,476 (Portable information and transaction processing system and method utilizing biometric authorization and digital certificate security); 6,012,049 (System for performing financial transactions using a smartcard; 6,012,039 (Tokenless biometric electronic rewards system); 6,011,858 (Memory card having a biometric template stored thereon and system for using same); 6,009,177 (Enhanced cryptographic system and method with key escrow feature); 6,006,328 (Computer software authentication, protection, and security system); 6,003,135 (Modular security device); 6,002,770 (Method for secure data transmission between remote stations); 5,999,637 (Individual identification apparatus for selectively recording a reference pattern based on a correlation with comparative patterns); 5,999,095 (Electronic security system); 5,995,630 (Biometric input with encryption); 5,991,431 (Mouse adapted to scan biometric data); 5,991,429 (Facial recognition system for security access and identification); 5,991,408 (Identification and security using biometric measurements); 5,987,155 (Biometric input device with peripheral port); 5,987,153 (Automated verification and prevention of spoofing for biometric data); 5,986,746 (Topographical object detection system); 5,984,366 (Unalterable self-verifying articles); 5,982,894 (System including separable protected components and associated methods); 5,979,773 (Dual smart card access control electronic data storage and retrieval system and methods); 5,978,494 (Method of selecting the best enroll image for personal identification); 5,974,146 (Real time bank-centric universal payment system); 5,970,143 (Remote-auditing of computer generated outcomes, authenticated billing and access control, and software metering system using cryptographic and other protocols); 5,966,446 (Time-bracketing infrastructure implementation); 5,963,908 (Secure logon to notebook or desktop computers); 5,963,657 (Economical skin-pattern-acquisition and analysis apparatus for access control; systems controlled thereby); 5,954,583 (Secure access control system); 5,952,641 (Security device for controlling the access to a personal computer or to a computer terminal); 5,951,055 (Security document containing encoded data block); 5,949,881 (Apparatus and method for cryptographic companion imprinting); 5,949,879 (Auditable security system for the generation of cryptographically protected digital data); 5,949,046 (Apparatus for issuing integrated circuit cards); 5,943,423 (Smart token system for secure electronic transactions and identification); 5,935,071 (Ultrasonic biometric imaging and identity verification system); 5,933,515 (User identification through sequential input of fingerprints); 5,933,498 (System for controlling access and distribution of digital property); 5,930,804 (Web-based biometric authentication system and method); 5,923,763 (Method and apparatus for secure document timestamping); 5,920,477 (Human factored interface incorporating adaptive pattern recognition based controller apparatus); 5,920,384 (Optical imaging device); 5,920,058 (Holographic labeling and reading machine for authentication and security applications); 5,915,973 (System for administration of remotely-proctored, secure examinations and methods therefor); 5,913,196 (System and method for establishing identity of a speaker); 5,913,025 (Method and apparatus for proxy authentication); 5,912,974 (Apparatus and method for authentication of printed documents); 5,912,818 (System for tracking and dispensing medical items); 5,910,988 (Remote image capture with centralized processing and storage); 5,907,149 (Identification card with delimited usage); 5,901,246 (Ergonomic man-machine interface incorporating adaptive pattern recognition based control system); 5,898,154 (System and method for updating security information in a time-based electronic monetary system); 5,897,616 (Apparatus and methods for speaker verification/identification/classification employing non-acoustic and/or acoustic models and databases); 5,892,902 (Intelligent token protected system with network authentication); 5,892,838 (Biometric recognition using a classification neural network); 5,892,824 (Signature capture/verification systems and methods); 5,890,152 (Personal feedback browser for obtaining media files); 5,889,474 (Method and apparatus for transmitting subject status information over a wireless communications network); 5,881,226 (Computer security system); 5,878,144 (Digital certificates containing multimedia data extensions); 5,876,926 (Method, apparatus and system for verification of human medical data); 5,875,108 (Ergonomic man-machine interface incorporating adaptive pattern recognition based control system); 5,872,849 (Enhanced cryptographic system and method with key escrow feature); 5,872,848 (Method and apparatus for witnessed authentication of electronic documents); 5,872,834 (Telephone with biometric sensing device); 5,870,723 (Tokenless biometric transaction authorization method and system); 5,869,822 (Automated fingerprint identification system); 5,867,802 (Biometrically secured control system for preventing the unauthorized use of a vehicle); 5,867,795 (Portable electronic device with transceiver and visual image display); 5,867,578 (Adaptive multi-step digital signature system and method of operation thereof; 5,862,260 (Methods for surveying dissemination of proprietary empirical data); 5,862,246 (Knuckle profile identity verification system); 5,862,223 (Method and apparatus for a cryptographically-assisted commercial network system designed to facilitate and support expert-based commerce); 5,857,022 (Enhanced cryptographic system and method with key escrow feature); 5,850,451 (Enhanced cryptographic system and method with key escrow feature); 5,850,442 (Secure world wide electronic commerce over an open network); 5,848,231 (System configuration contingent upon secure input); 5,844,244 (Portable identification carrier); 5,841,907 (Spatial integrating optical correlator for verifying the authenticity of a person, product or thing); 5,841,886 (Security system for photographic identification); 5,841,865 (Enhanced cryptographic system and method with key escrow feature); 5,841,122 (Security structure with electronic smart card access thereto with transmission of power and data between the smart card and the smart card reader performed capacitively or inductively); 5,838,812 (Tokenless biometric transaction authorization system); 5,832,464 (System and method for efficiently processing payments via check and electronic funds transfer); 5,832,119 (Methods for controlling systems using control signals embedded in empirical data); 5,828,751 (Method and apparatus for secure measurement certification); 5,825,880 (Multi-step digital signature method and system); 5,825,871 (Information storage device for storing personal identification information); 5,815,577 (Methods and apparatus for securely encrypting data in conjunction with a personal computer); 5,815,252 (Biometric identification process and system utilizing multiple parameters scans for reduction of false negatives); 5,805,719 (Tokenless identification of individuals); 5,802,199 Use sensitive identification system); 5,799,088 (Non-deterministic public key encryption system); 5,799,086 (Enhanced cryptographic system and method with key escrow feature); 5,799,083 (Event verification system); 5,790,674 (System and method of providing system integrity and positive audit capabilities to a positive identification system); 5,790,668 (Method and apparatus for securely handling data in a database of biometrics and associated data); 5,789,733 (Smart card with contactless optical interface); 5,787,187 (Systems and methods for biometric identification using the acoustic properties of the ear canal); 5,784,566 (System and method for negotiating security services and algorithms for communication across a computer network); 5,784,461 (Security system for controlling access to images and image related services); 5,774,551 (Pluggable account management interface with unified login and logout and multiple user authentication services); 5,771,071 (Apparatus for coupling multiple data sources onto a printed document); 5,770,849 (Smart card device with pager and visual image display); 5,768,382 (Remote-auditing of computer generated outcomes and authenticated billing and access control system using cryptographic and other protocols); 5,767,496 (Apparatus for processing symbol-encoded credit card information); 5,764,789 (Tokenless biometric ATM access system); 5,763,862 (Dual card smart card reader); 5,761,298 (Communications headset with universally adaptable receiver and voice transmitter); 5,757,916 (Method and apparatus for authenticating the location of remote users of networked computing systems); 5,757,431 (Apparatus for coupling multiple data sources onto a printed document); 5,751,836 (Automated, non-invasive iris recognition system and method); 5,751,809 (Apparatus and method for securing captured data transmitted between two sources); 5,748,738 (System and method for electronic transmission, storage and retrieval of authenticated documents); 5,745,573 (System and method for controlling access to a user secret); 5,745,555 (System and method using personal identification numbers and associated prompts for controlling unauthorized use of a security device and unauthorized access to a resource); 5,742,685 (Method for verifying an identification card and recording verification of same); 5,742,683 (System and method for managing multiple users with different privileges in an open metering system); 5,737,420 (Method for secure data transmission between remote stations); 5,734,154 (Smart card with integrated reader and visual image display); 5,719,950 (Biometric, personal authentication system); 5,712,914 (Digital certificates containing multimedia data extensions); 5,712,912 (Method and apparatus for securely handling a personal identification number or cryptographic key using biometric techniques); 5,706,427 (Authentication method for networks); 5,703,562 (Method for transferring data from an unsecured computer to a secured computer); 5,696,827 (Secure cryptographic methods for electronic transfer of information); 5,682,142 (Electronic control system/network); 5,682,032 (Capacitively coupled identity verification and escort memory apparatus); 5,680,460 (Biometric controlled key generation); 5,668,878 (Secure cryptographic methods for electronic transfer of information); 5,666,400 (Intelligent recognition); 5,659,616 (Method for securely using digital signatures in a commercial cryptographic system); 5,647,364 (Ultrasonic biometric imaging and identity verification system); 5,647,017 (Method and system for the verification of handwritten signatures); 5,646,839 (Telephone-based personnel tracking system); 5,636,282 (Method for dial-in access security using a multimedia modem); 5,633,932 (Apparatus and method for preventing disclosure through user-authentication at a printing node); 5,615,277 (Tokenless security system for authorizing access to a secured computer system); 5,613,012 (Tokenless identification system for authorization of electronic transactions and electronic transmissions); 5,608,387 (Personal identification devices and access control systems); 5,594,806 (Knuckle profile identity verification system); 5,592,408 (Identification card and access control device); 5,588,059 (Computer system and method for secure remote communication sessions); 5,586,171 (Selection of a voice recognition data base responsive to video data); 5,583,950 (Method and apparatus for flash correlation); 5,583,933 (Method and apparatus for the secure communication of data); 5,578,808 Data card that can be used for transactions involving separate card issuers); 5,572,596 (Automated, non-invasive iris recognition system and method); 5,561,718 (Classifying faces); 5,559,885 Two stage read-write method for transaction cards); 5,557,765 (System and method for data recovery); 5,553,155 (Low cost method employing time slots for thwarting fraud in the periodic issuance of food stamps, unemployment benefits or other governmental human services); 5,544,255 (Method and system for the capture, storage, transport and authentication of handwritten signatures); 5,534,855 (Method and system for certificate based alias detection); 5,533,123 (Programmable distributed personal security); 5,526,428 (Access control apparatus and method); 5,523,739 (Metal detector for control of access combined in an integrated form with a transponder detector); 5,497,430 (Method and apparatus for image recognition using invariant feature signals); 5,485,519 (Enhanced security for a secure token code); 5,485,312 (Optical pattern recognition system and method for verifying the authenticity of a person, product or thing); 5,483,601 (Apparatus and method for biometric identification using silhouette and displacement images of a portion of a person's hand); 5,478,993 (Process as safety concept against unauthorized use of a payment instrument in cashless payment at payment sites); 5,475,839 (Method and structure for securing access to a computer system); 5,469,506 (Apparatus for verifying an identification card and identifying a person by means of a biometric characteristic); 5,457,747 (Anti-fraud verification system using a data card); 5,455,407 (Electronic-monetary system); 5,453,601 (Electronic-monetary system); 5,448,045 (System for protecting computers via intelligent tokens or smart cards); 5,432,864 (Identification card verification system); 5,414,755 (System and method for passive voice verification in a telephone network); 5,412,727 (Anti-fraud voter registration and voting system using a data card); 5,363,453 (Non-minutiae automatic fingerprint identification system and methods); 5,347,580 (Authentication method and system with a smartcard); 5,345,549 (Multimedia based security systems); 5,341,428 (Multiple cross-check document verification system); 5,335,288 (Apparatus and method for biometric identification); 5,291,560 (Biometric personal identification system based on iris analysis); 5,283,431 (Optical key security access system); 5,280,527 (Biometric token for authorizing access to a host system); 5,272,754 (Secure computer interface); 5,245,329 (Access control system with mechanical keys which store data); 5,229,764 (Continuous biometric authentication matrix); 5,228,094 (Process of identifying and authenticating data characterizing an individual); 5,224,173 (Method of reducing fraud in connection with employment, public license applications, social security, food stamps, welfare or other government benefits); 5,208,858 (Method for allocating useful data to a specific originator); 5,204,670 (Adaptable electric monitoring and identification system); 5,191,611 (Method and apparatus for protecting material on storage media and for transferring material on storage media to various recipients); 5,163,094 (Method for identifying individuals from analysis of elemental shapes derived from biosensor data); 5,155,680 (Billing system for computing software); 5,131,038 (Portable authentification system); 5,073,950 (Finger profile identification system); 5,067,162 (Method and apparatus for verifying identity using image correlation); 5,065,429 (Method and apparatus for protecting material on storage media); 5,056,147 (Recognition procedure and an apparatus for carrying out the recognition procedure); 5,056,141 (Method and apparatus for the identification of personnel); 5,036,461 (Two-way authentication system between user's smart card and issuer-specific plug-in application modules in multi-issued transaction device); 5,020,105 (Field initialized authentication system for protective security of electronic information networks); 4,993,068 (Unforgettable personal identification system); 4,972,476 (Counterfeit proof ID card having a scrambled facial image); 4,961,142

(Multi-issuer transaction device with individual identification verification plug-in application modules for each issuer); 4,952,928 (Adaptable electronic monitoring and identification system); 4,941,173 (Device and method to render secure the transfer of data between a videotex terminal and a server); 4,926,480 (Card-computer moderated systems); 4,896,363 (Apparatus and method for matching image characteristics such as fingerprint minutiae); 4,890,323 Data communication systems and methods); 4,868,376 (Intelligent portable interactive personal data system); 4,827,518 (Speaker verification system using integrated circuit cards); 4,819,267 (Solid state key for controlling access to computer systems and to computer software and/or for secure communications); 4,752,676 (Reliable secure, updatable "cash" card system); 4,736,203 (3D hand profile identification apparatus); 4,731, 841 (Field initialized authentication system for protective security of electronic information networks); 4,564,018 (Ultrasonic system for obtaining ocular measurements), each of which is expressly incorporated herein by reference.

MEDICAL RECORD SYSTEMS

John D. Halamka, Peter Szolovits, David Rind, and Charles Safran, "A WWW Implementation of National Recommendations for Protecting Electronic Health Information", J. Am. Med. Inform. Assoc. 1997 4: 458-464 (expressly incorporated herein by reference).

Reid Cushman, "Serious Technology Assessment for Health Care Information Technology", J. Am. Med. Inform. Assoc. 1997 4: 259-265 (expressly incorporated herein by reference).

Suzy A. Buckovich, Helga E. Rippen, and Michael J. Rozen, "Driving Toward Guiding Principles: A Goal for Privacy, Confidentiality, and Security of Health Information", J. Am. Med. Inform. Assoc. 1999 6: 122-133 (expressly incorporated herein by reference).

Paul C. Tang, "An AMIA Perspective on Proposed Regulation of Privacy of Health Information", J. Am. Med. Inform. Assoc. 2000 7: 205-207 (expressly incorporated herein by reference).

Clement J. McDonald, "The Barriers to Electronic Medical Record Systems and How to Overcome Them", J. Am. Med. Inform. Assoc. 1997 4: 213-221 (expressly incorporated herein by reference).

Suzy Buckovich, Helga Rippen and Michael Rozen, Driving Toward Guiding Principles: A Goal for Privcacy, Confidentiality, and Security of Health Information, 6 Journal of the American Medical Informatics Association 122-133 (1999).

Helen Alderman and Caroline Kennedy, The Right to Privacy, pp. 140-143, 323-332.

James J. Cimino, Beyond the Cimino, Beyond the Superhighway, Exploiting the Internet with Medical Informatics, 4 Journal of the American Medical Informatics Association 279-284 (1997).

Paul Clayton, For the Record: Protecting Electronic Health Care Information 1997

Morris Collen, A Vision of Health Care and Informatics in 2008. 6 Journal of the American Medical Informatics Association 1-5 (1999).

Computer Science and Telecommunications Board, National Research Council, Networking Health: Prescriptions for the Internet (2000).

Reid Cushman, Serious Technology Assessment for Health Care Information Technology, 4 Journal of the American Medical Informatics Association 259-65 (1997).

Department of Health and Human Services, Standards for Privacy of Individually Identifiable Health Information; Final Rule, 56 Federal Register 82462-82829.

Robert E. DeWitt, Anita Ellis, Hayton, William E. Hoffmann, Jr., Robert M. Keenan, III, and Marie B. Russell, Patient Information and Confidentiality in Treatise on Health Care Law (eds., 1998).

The Drummond Group, The HealthKey Program: PKI in Healthcare.

Aviva Halpert, Access Audit Trails: En Route to Security, Journal of AHIMA (September 2000).

Health Privacy Project, Summary of New Federal Health Privacy Regulations at http://www.healthprivacy.org.

Isaac Kohane, F. J. van Wingerde, James C. Fackler, Christopher Cimino, Peter Kilbridge, Shawn Murphy, Henry Chueh, David Rind, Charles Safran, Octo Barnett, and Peter Szolovits, Sharing Electronic Medical Records Across Multiple Heterogeneous and Competing Institutions.

New York State, Public Health Law, Article 29 (Health Care Agents and Proxies).

D. M. Rind, I. S. Kohane, P. Szolovits, C. Safran, H. C. Chueh, and G. O. Barnett, Maintaining the confidentiality of medical records shared over the Internet and the World Wide Web, Annals of Internal Medicine 1997: 127: 138-141.

Thomas C. Rindfleisch, Privacy, Information Technology and Healthcare, Communications of the ACM, Vol. 40, No. 8, August 1997.

John Roberts, Sheila Decter, and Denise Nagel, Letter to the Editor [regarding Confidentiality and Electronic Medical Records], Annals of Internal Medicine, 15 Mar. 1998.

Charles Safran et al., Protection of Confidentiality in Computer Based Patient Records, MD Computing, Vol. 12, No. 3, May 1995.

Edward H. Shortliffe, The Next Generation Internet and Healthcare: A Civics Lesson for the Informatics Community, at www.amia.org/pubs/symposia/D005232.pdf???

Peter Szolovits, A Revolution in Electronic Medical Records Systems via the World Wide Web at http://www.emrs.org/publications/IAHIT.html.

Peter Szolovits, Jon Doyle, William J. Long, Isaac Kohane, and Stephen G. Pauker, Guardian Angel: Patient Centered Health Information Systems at http://www.ga.org/ga//manifesto/GAtr.html.

Peter Szolovits, Cryptography Based Patient Identifier at http://nevhs.hhs.gov/app7-4.htm.

U.S. Congress, Office of Technology Assessment, Protecting Privacy in Computerized Medical Information, OTA-TCT-576 (September 1993).

L. L. Weed, Medical Records, Medical Education, and the Patient: The Problem Oriented Medical Record as a Basic Tool, Case Western University Press, 1971.

U.S. Pat. No. 5,361,202 (Doue, Nov. 1, 1994, Computer display system and method for facilitating access to patient data records in a medical information system), expressly incorporated herein by reference, relates to a system and method to improve access to patient information in medical information system for a health care facility. A computer display system, and a method for such a display system, includes a displayed representation of the duration of the stay of an identified patient in the health care facility. In such a medical information system patient data is stored in data files in a database, wherein each data file in the database is comprised of a plurality of data records. A User positions a cursor on the displayed representation using an input unit and signals the computer of a desired date and time. The computer, in response to the signal determines the desired date and time from the position of the cursor and accesses a data record or records from the data file based on the desired date and time. The accessed data record or records may then be displayed. The data records may be time-stamped. In that case, the duration of the patient's stay is the time period between the earliest and latest time stamps.

U.S. Pat. No. 5,644,778 (Burks, et al., Jul. 1, 1997, Medical transaction system), expressly incorporated herein by reference, relates to a medical transaction system, which is capable of permitting a plurality of healthcare providers to communicate with a plurality of payors and financial institutions. The healthcare providers, payors, and financial institutions do not have to communicate in the same data message formats nor in the same communication protocols. Such a system facilitates not only the processing of medical claims submitted by the healthcare providers to the payors, but also permits the transfer of medical data records between healthcare providers. The system supports the processing of medical claims without requiring a centralized database or imposing a uniform claim format on the healthcare providers and payors. The preferred embodiment further includes a financial transactor that uses remittance information from the payors to generate the electronics funds transfer messages to credit and debit accounts. Additionally, the system supports a medical line of credit at financial institutions that may be used to pay portions of medical claims not covered by payors.

U.S. Pat. No. 5,832,450 (Myers, et al. Nov. 3, 1998), expressly incorporated herein by reference, provides an electronic medical record system that stores data about individual patient encounters arising from a content generator in free-form text. A header for each encounter-based record also uses text to store context information for that record. Each header comprises a plurality of attributes embodied as a field descriptor and a value, bound together as a text object. By binding the field descriptors to the values, each encounter record is complete in itself, without reference to database keys, thereby providing a self-validating record storage system. In this system, the security of the medical data is maintained, because the attribute values and the attribute descriptors are bound together as a text object, and because the values are not location dependent, the data is self-validating. Thus, templates, keys, or other lookup means employed by relational database are not required to find or interpret the data. Additional attributes may be added without a restructuring process, reducing a source of errors into the system. Access of the content and context information in the EMR system by external systems is possible without secondary tables or keys.

U.S. Pat. No. 5,546,580 (Seliger, et al., Aug. 13, 1996), expressly incorporated herein by reference, relates to a method and apparatus for coordinating concurrent updates to a medical information database, from different workstations and medical instruments. A first data value for a record is entered at a first workstation and a second data value for the record is entered at a second workstation without locking either workstation during data entry. The new data values are stored in the medical database after completion of data entry at each workstation, and a correction history is recorded. The correction history contains information as to the update of the record with the first data value and the second data value. The record is updated with the first and second data values without aborting user activities or notifying a user that an update conflict has occurred. After the new data values are stored in the medical database, all workstations containing a copy of the record are updated to reflect the current state of the record.

U.S. Pat. No. 5,832,488 (Eberhardt, Nov. 3, 1998), expressly incorporated herein by reference, relates to a computer system and method for storing medical histories using a smartcard to store data. A computer system and method is provided for programming it for storage of individual medical histories on a storage device, preferably about the size of a credit card, for adding new medical data about the individual to the device and for communicating with other computers to retrieve large data records about the individual; and for enabling a second computer to collate and sort data relating to selected medical fields from the data of such individual and from the data about other individuals transferred to the second computer.

U.S. Pat. No. 5,867,821 (Ballantyne, et al., Feb. 2, 1999), expressly incorporated herein by reference, relates to a method and apparatus for electronically accessing and distributing personal health care information and services in hospitals and homes, for the distribution and administration of medical services, entertainment services, electronic medical records, educational information, etc. to a patient's individual electronic patient care station (PCS) interconnected to a master library (ML) which stores data in digital compressed format, through a local medical information network. The patient/medical personnel interact with this medical information network through the unique PCS and receive the requested service or data from the master library. The data is then displayed either on the associated television set or video monitor or through wireless/IR communications to a peripheral personal data assistant (pen based computer technology) The data for text, audio, and video information is all compressed digitally to facilitate distribution and only decompressed at the final stage before viewing/interaction.

U.S. Pat. No. 5,899,998 (McCauley, et al., May 4, 1999), expressly incorporated herein by reference, relates to a method and system for maintaining and updating computerized medical records. A distributed database architecture stores medical information in a self-updating system that employs point-of-service stations disposed at convenient medical service locations. Each patient carries a portable data carrier such as a smart card that contains the patient's complete medical history. Interaction between the portable data carriers and the point-of-service stations effects a virtual communication link that ties the distributed databases together without the need for online or live data connections. The point-of-service stations are also interconnected over a communications network through a switching station that likewise does not rely on online, live communication. The database system uses an object-oriented update object to distribute data that has been generated when a portable data carrier is not physically present and to automatically distribute data without the necessity of accessing a masterfile.

U.S. Pat. No. 5,903,889 (de la Huerga, et al., May 11, 1999), expressly incorporated herein by reference, relates to a system and method for translating, collecting and archiving patient records. The system retrieves, modifies, and collects data records having a plurality of formats and distributed on a plurality of databases on a computer network. The system includes means for detecting various types, relationships, and classifications of data records and modifying them accordingly to support interactive, hypertext-linked display of, and organized access to, the data records. The system further includes means to store a related set of data records on a mass storage device such as a CD-ROM to provide non-network access to the data records. Adapted for use in a hospital environment, the system facilitates access by care providers, administrators, and insurance company agents to a patient's cumulative, and possibly extensive, record.

U.S. Pat. No. 5,911,132 (Sloane, Jun. 8, 1999, Method using central epidemiological database), expressly incorporated herein by reference, relates to a system in which patient disease is diagnosed and/or treated using electronic data communications between not only the physician and his/her patient, but via the use of electronic data communications between the physician and one or more entities which can contribute to the patient's diagnosis and/or treatment, such electronic data communications including information that was previously received electronically from the patient and/or was developed as a consequence of an electronic messaging interaction that occurred between the patient and the physician. Such other entities illustratively include a medical diagnostic center and an epidemiological database computer facility that collects epidemiological transaction records from physicians, hospitals and other institutions that have medical facilities, such as schools and large businesses. The epidemiological transaction record illustratively includes various medical, personal and epidemiological data relevant to the patient and his/her present symptoms, including test results, as well as the diagnosis, if one has already been arrived at by the e-doc. The epidemiological database computer facility can correlate this information with the other epidemiological transaction records that it receives over time in order to help physicians make and/or confirm diagnoses as well as to identify and track epidemiological events and/or trends.

U.S. Pat. No. 5,911,687 (Sato, et al., Jun. 15, 1999, Wide area medical information system and method using thereof), expressly incorporated herein by reference, relates to a wide area medical information system and a method using thereof comprising a wide area network, a plurality of doctor terminals and patient terminals connected to the wide area network, and a management server including at least an electronic case record file storing clinic information for patient's and a doctor database storing data of a plurality of doctors, wherein the system searches the doctor database on the basis of patient information including the condition of the disease of a certain patient input from the patient terminal, selects the corresponding doctor, requests that the selected doctor take charge of examination and treatment for the aforementioned certain patient, registers the correspondence between the approved doctor and the aforementioned certain patient in the electronic case record file, gives the right to access the clinic information of the patient to the approved doctor, and executes the online examination and treatment via the doctor terminal and patient terminal, so that a patient existing in a wide area can receive remote examination and treatment services of high satisfaction and medical treatment related services other than examination and treatment without depending on the location.

U.S. Pat. No. 5,915,240 (Karpf, Jun. 22, 1999), expressly incorporated herein by reference, relates to a computer system and method for accessing medical information over a network. The system partitions the functioning of the system between a client and server program optimized in a manner to assure synchronization of the master medical information databases on the servers with the local medical information database on the client, minimize the use of network resources, and allow new types of medical information to be easily included in the system. A server site on the network maintains a description of its medical information, as well as the most current and up-to-date medical reference information. The client program maintains a local database that is automatically synchronized over the network with revisions and new medical information, and provides a user with an interface to fully review the information in the database. The system also uses a context-sensitive call facility so that users of the Medical Lookup Reference program can easily get further expert assistance about the medical topic. The call feature uses the network connection to establish a conversation between the user and a person at a help site specified by the type of medical information they are currently referencing. Once a connection is established, the system allows the user to engage in a conversation with the person at the help site, and a record of the conversation can be saved in a database for auditing purposes.

U.S. Pat. No. 5,924,074 (Evans, Jul. 13, 1999), expressly incorporated herein by reference, relates to an electronic medical records system. The system captures patient data, such as patient complaints, lab orders, medications, diagnoses, and procedures, at its source at the time of entry using a graphical user interface having touch screens. Using pen-based portable computers with wireless connections to a computer network, authorized healthcare providers can access, analyze, update and electronically annotate patient data even while other providers are using the same patient record. The system likewise permits instant, sophisticated analysis of patient data to identify relationships among the data considered. Moreover, the system includes the capability to access reference databases for consultation regarding allergies, medication interactions and practice guidelines. The system also includes the capability to incorporate legacy data, such as paper files and mainframe data, for a patient.

U.S. Pat. No. 5,933,809 (Hunt, et al., Aug. 3, 1999), expressly incorporated herein by reference, relates to computer software for processing medical billing record information. Hospital or individual doctor Medicare billing records are processed using computer software. The software contains at least one set of instructions for receiving, converting, sorting and storing input information from the pre-existing medical billing records into a form suitable for processing. The software contains at least one set of instructions for processing the input medical billing record information, preferably to identify potential Medicare "72 hour billing rule" violations. This processing is preferably performed by comparing each input medical billing record containing dates of medical inpatient admission and discharge to each input medical billing record containing a date of medical outpatient service. The inpatient and outpatient billing records are first compared to determine if they contain matching patient identification codes to identify all the records originating from the same patient. If matching patient identification codes are found the inpatient and outpatient billing records are further compared to determine if the date of outpatient service fell within a preselected time period, preferably 72 hours, prior to the date of inpatient admission. If so, the matching inpatient and outpatient billing records are distinguished and stored separately for further processing. If not, the matching inpatient and outpatient billing records are compared to determine if the date of outpatient service fell between the inpatient admission and discharge dates. If this is the case, the matching inpatient and outpatient billing records are again distinguished and stored separately for further processing. If not, the program proceeds to the next set of billing records to repeat the sequence.

U.S. Pat. No. 5,974,389 (Clark, et al., Oct. 26, 1999, Medical record management system and process with improved workflow features) relates to a patient medical record system includes a number of caregiver computers, and a patient record database with patient data coupled to the caregiver computers selectively providing access to the patient data from one of the caregiver computers responsive to a predetermined set of access rules. The predetermined set of rules includes a rule that access to a predetermined portion of the patient data by a first caregiver must be terminated before access to the same predetermined portion by a second caregiver is allowed.

U.S. Pat. No. 5,991,758 (Elland, Nov. 23, 1999), expressly incorporated herein by reference, relates to a system and method for indexing information about entities from different information sources. A system and method for indexing a data record from an information source into a database, the database containing a plurality of data records, is provided comprising receiving a data record from an information source, the received data record having a predetermined number of fields containing information about a particular entity, standardizing and validating the data in the received data record. A system and method is also provided for retrieving records that refer to an entity characterized by a specific set of data values by comparing a predetermined number of fields within the received data record with a predetermined number of fields within the data records already in the database, selecting data records already in the database as candidates having data within some of the predetermined fields that is identical to the data in the fields of the received data record, and scoring the candidates to determine data records having information about the same entity.

U.S. Pat. No. 5,995,943 (Bull, et al., Nov. 30, 1999), expressly incorporated herein by reference, relates to an information aggregation and synthesis system. An information aggregation and synthesis system and process, which provides aggregation and packaging of structured or unstructured information from disparate sources such as those available on a network such as the Internet. A user operates a network compatible/addressable interface device. The network interface device communicates with local datastores or network accessible datastores via an addressing scheme such as Uniform Resource Locator addresses (URLs) utilized by the Internet. Data passing between the network interface device and the datastores is accessed, polled, and retrieved through an intermediary gateway system. Such aggregated information is then synthesized, customized, personalized and localized to meet the information resource requests specified by the user via the network interface device.

U.S. Pat. No. 6,012,035 (Freeman, Jr., et al., Jan. 4, 2000), expressly incorporated herein by reference, relates to a system and method for supporting delivery of health care. Effectuation of a health care provision agency cooperative function is established through a communication network linking all the various entities of the cooperative. The entities include the third party payor members, the health providing individuals, clinics, or the like, along with secondary providers including pharmacies and laboratories, health care facilities such as hospitals, and the several entities associated with management of the cooperative and appropriate funds transfer functions. A coordinating interface system maintains data storage of the necessary information, and manages the entity intercommunications in accordance with the basic structure of the active and eligible elements of the agency cooperative.

U.S. Pat. No. 6,035,276 (Newman, et al., Mar. 7, 2000), expressly incorporated herein by reference, relates to a system and method for selectively generating provider application forms required to be submitted to health care provider organizations by physicians and related health care professionals. Physician credentialing profiles containing physician credentialing information are stored into a system database together with a plurality of different provider application formats associated with particular application forms which are completed and selected data extracted from the common information contained in the stored physician credentialing profiles. The method automatically inputs a subset of physician credentialing information required by a particular selected provider application format into the provider application form associated with that format and generates the particular provider application form.

U.S. Pat. No. 6,055,494 (Friedman, Apr. 25, 2000), expressly incorporated herein by reference, relates to a system and method for medical language extraction and encoding. In computerized processing of natural-language medical/clinical data including phrase parsing and regularizing, parameters are referred to whose value can be specified by the user. Thus, a computerized system can be provided with versatility, for the processing of data originating in diverse domains, for example. Further to a parser and a regularizer, the system includes a preprocessor, output filters, and an encoding mechanism.

U.S. Pat. No. 6,055,506 (Frasca, Jr., Apr. 25, 2000) expressly incorporated herein by reference, relates to an outpatient care data system dedicated to the transmission, storage and retrieval of outpatient data relating to care of outpatients is provided with a regional data system located at a regional location, a plurality of metropolitan area data systems operatively connected to the regional data system, each of the metropolitan area data systems being located at a different metropolitan location. Each metropolitan area data system may be provided with an electronic nursing station located within a hospital and first and second types of outpatient systems operatively coupled to the electronic nursing station on a real-time basis. The first type of outpatient system is situated at a first non-hospital location remote from the hospital and includes a medical device associated with an outpatient present at the first non-hospital location, and the second type of outpatient system is situated at a second non-hospital location remote from the hospital and includes a medical device associated with an outpatient present at the second non-hospital location.

U.S. Pat. No. 6,076,066 (DiRienzo, et al., Jun. 13, 2000), expressly incorporated herein by reference, relates to an attachment integrated claims (AIC) system formed by a combination of first, second and third storage media. The first storage medium stores computer readable instructions for permitting a first computer system to receive textual data as field data, where each of the field data is displayed on a predetermined portion of a first screen of the first computer system, to assemble the field data and a corresponding digitized image into a first file having an integrated file format and to transmit the first file to a second computer system via a communications channel. The second storage medium stores computer readable instructions permitting the second computer system to receive the first file via the communications channel, to display the corresponding digitized attachment on a second screen of the second computer system, and to transfer the field data to a third computer operatively connected to the second computer. In addition, the third storage medium stores computer readable instructions permitting the third computer system to receive the field data from the second computer, to display the field data on a third screen and to generate a second file including portions of the field data extracted from the first file. In other words, the AIC system permits transmission of a customizable claim form and integrated attachment to an insurance carrier via a non-clearinghouse communications channel. An AIC system including several computers connected via a communications channel, an electronic file, and an operating method therefore are also described. In an exemplary case, the first file follows a predetermined graphic image interchange file format and the field data is incorporated into comment blocks associated with the predetermined graphic image interchange file format.

U.S. Pat. No. 6,076,166 (Moshfeghi, et al., Jun. 13, 2000), expressly incorporated herein by reference, relates to a system and method for personalizing hospital intranet web sites. The server includes a layer for dynamically generating web pages and other data objects using scripts, such as graphic, audio and video files, in dependence on stored information indicating the user's needs and preferences, including those presumed from stored information as to the user's function, job, or purpose for being at the hospital, and logged usage profiles, the level of the user's access privileges to confidential patient information, and the computer and physical environments of the user. Notably, the content is generated in dependence on the display resolution and lowest bandwidth link between the server and browser to limit the waiting time for downloads as well as the server load.

See also, U.S. Pat. Nos. 5,319,543 (Wilhelm, Jun. 7, 1994, Workflow server for medical records imaging and tracking system); 5,465,082 (Chaco, Nov. 7, 1995, Apparatus for automating routine communication in a facility); 5,508,912 (Schneiderman, Apr. 16, 1996, Clinical database of classified out-patients for tracking primary care outcome); 5,546,580 (Seliger, et al., Aug. 13, 1996, Method and apparatus for coordinating concurrent updates to a medical information database); 5,592,945 (Fiedler, Jan. 14, 1997, Real-time event charting in an electronic flowsheet); 5,619,991 (Sloane, Apr. 15, 1997, Delivery of medical services using electronic data communications); 5,664,109 (Johnson, et al., Sep. 2, 1997, Method for extracting pre-defined data items from medical service records generated by health care providers); 5,772,585 (Lavin, et al., Jun. 30, 1998, System and method for managing patient medical records); 5,778,882 (Raymond, et al., Jul. 14, 1998, Health monitoring system); 5,845,253 (Rensimer, et al., Dec. 1, 1998, System and method for recording patient-history data about on-going physician care procedures); 6,082776 (Feinberg, Storing Personal Medical Information); 6,157,914 (Seto, Medical support system); 6,149,440 (Clark, Methods and apparatus for authenticating informed consent); 5,779,634 (Ema, Medical information processing system for supporting diagnosis); 5,586,262 (Komatsu, Image data management system particulary for use in a hospital); 5,528,492 (Fukushima, Method of managing medical diagnosis data with reference relationship); 5,781,890 (Nematbakhsh, Method for managing clustered medical data and medical data filing system in clustered form), each of which is expressly incorporated herein by reference.

Rights-Based Access to Database Records

U.S. Pat. No. 6,192,476, expressly incorporated herein by reference, relates to a method for providing security, comprising the steps of detecting when a request for an action is made by a principal, and determining whether the action is authorized based on permissions associated with a plurality of routines in a calling hierarchy associated with the principal, wherein the permissions are associated with the plurality of routines based on a first association between protection domains and permissions.

U.S. Pat. No. 5,325,294 (Keene, Jun. 28, 1994), expressly incorporated herein by reference, relates to a medical privacy system. A method and apparatus for authorized access to medical information concerning an individual while preserving the confidentiality of, and preventing unauthorized access to, such information, is provided. A computer database receives and stores the individual's medical information, after the individual is tested to establish this information and the date on which such information was most recently obtained. The computer database does not contain the individual's name, address or any other similar information by which the individual can be identified. The individual is given an identification card containing a photograph or holographic image of the individual and containing a confidential first identification number that is unique for the individual, where both the image and the first identification number are visually perceptible and cannot be altered on the card without detection of such alteration. The individual is also given a confidential second identification number that is not contained on the card and need not be unique for that individual. The computer database can be accessed telephonically, and the individual's medical information, or a portion thereof, can be read only by an inquiror, if the inquiror or the individual first provides the individual's first and second identification numbers. The inquiror can use the image and first identification number on the individual's card to confirm the identity of that individual but need not be told the individual's second identification number. After inquiror establishes the identity of the individual, the inquiror, with the assistance of the individual, can obtain a telephonic readout of the individual's medical information.

U.S. Pat. No. 5,499,293 (Behram, et al., Mar. 12, 1996), expressly incorporated herein by reference, relates to a privacy protected information medium using a data compression method, which uses an efficient data compression/decompression scheme using a passive data storage media such as a card-based approach for storage of medical data information. The system operates on existing personal computer hardware in a medical center or doctors' offices, doing away with expensive investments in specialized technologies of central processing hardware. With the advent of inexpensive desktop computing, a number of inventions have been offered to improve medical information storage and retrieval. They include the development of portable medical card technologies such as SmartCards and optical cards, which are capable of storing medical information, and can be carried by the patient. This card-based system provides a methodology for storage and retrieval of medical information from a passive credit-card sized instrument. The card is manufactured with minimal expense using existing well-known optical scanning or magnetic tape reading or a data interrogation means in a SmartCard based system.

U.S. Pat. No. 5,987,440 (O'Neil, et al., Nov. 16, 1999), expressly incorporated herein by reference, relates to a personal information security and exchange tool. Utilization of the E-Metro Community and Personal Information Agents assure an effective and comprehensive agent-rule based command and control of informational assets in a networked computer environment. The concerns of informational privacy and informational self-determination are addressed squarely by affording persons and entities a trusted means to author, secure, search, process, and exchange personal and/or confidential information in a networked computer environment. The formation of trusted electronic communities wherein members command and control their digital persona, exchanging or brokering for value the trusted utility of their informational assets is made possible. The system provides for the trusted utilization of personal data in electronic markets, providing both communities and individuals aggregate and individual rule-based control of the processing of their personal data.

U.S. Pat. No. 6,029,160 (Cabrera, et al., Feb. 22, 2000), expressly incorporated herein by reference, relates to a system and method for linking a database system with a system for filing data. Extensions to a database system provide linkage between data in the database system and files in a system for filing data that is external to the database system ("the filing system"). The linkage includes an external file reference (efr) data type, which is defined in the database system for reference to files that are stored in the filing system. When entries are made in the database system that include efr datatype references to files in the filing system, control information is provided by the database system to the filing system. The control information causes the filing system to control processing of referenced files according to referential constraints established in the database system.

U.S. Pat. No. 6,038,563 (Bapat, et al., Mar. 14, 2000), expressly incorporated herein by reference, relates to a system and method for restricting database access to managed object information using a permissions table that specifies access rights corresponding to user access rights to the managed objects. An access control database has access control objects that collectively store information that specifies access rights by users to specified sets of the managed objects. The specified access rights include access rights to obtain management information from the network. An access control server provides users access to the managed objects in accordance with the access rights specified by the access control database. An information transfer mechanism sends management information from the network to a database management system (DBMS) for storage in a set of database tables. Each database table stores management information for a corresponding class of managed objects. An access control procedure limits access to the management information stored in the database tables using at least one permissions table. A permissions table defines a subset of rows in the database tables that are accessible to at least one of the users. The set of database table rows that are accessible corresponds to the managed object access rights specified by the access control database. A user access request to access management information in the database is intercepted, and the access control procedure is invoked when the user access request is a select statement. The database access engine accesses information in the set of database tables using the permissions tables such that each user is allowed access only to management information in the set of database tables that the user would be allowed by the access control database to access.

U.S. Pat. No. 6,041,411 (Wyatt, Mar. 21, 2000), expressly incorporated herein by reference, relates to a method for defining and verifying user access rights to computer information. A method is provided for minimizing the potential for unauthorized use of digital information, particularly software programs, digital content and other computer information, by verifying user access rights to electronically transmitted digital information. A second computer system transmits requested digital information to a requesting first computing system in wrapped form, which includes digital instructions that must be successfully executed, or unwrapped, before access to the digital information is allowed. Successful unwrapping requires that certain conditions must be verified in accordance with the digital instructions, thereby allowing access to the digital information. In one embodiment, verification includes locking the digital information to the requesting computer system by comparing a generated digital fingerprint associated with the digital information to a digital fingerprint previously generated which is unique to the requesting computer system.

U.S. Pat. No. 6,044,401 (Harvey, Mar. 28, 2000), expressly incorporated herein by reference, relates to a network sniffer for monitoring and reporting network information that is not privileged beyond a user's privilege level. Nodes in the network include a network sniffer and an access sniffer. The access sniffer includes an access element and an access interface. The access element preferably includes a memory and a database. The access element accesses the network sniffer and filters out unavailable information by using information such as address and port numbers gathered by the network sniffer. Unavailable information includes information which is non-public or beyond the privilege level of the particular user. The access element evaluates data streams that are public information to determine if the data streams meet a predetermined criterion. If the data streams meet the predetermined criteria, then the data is saved in the database. The access element transfers only the information available to the particular user to the access interface. The access element can time itself for a limited amount of time for execution. Once the predetermined time period has expired, the access element is complete and it can save and transfer the appropriate information to the access interface.

U.S. Pat. No. 6,052,688 (Thorsen, Apr. 18, 2000), expressly incorporated herein by reference, relates to a computer-implemented control of access to atomic data items. The method comprises the steps of initiating and maintaining data access nodes in a variable access structure. Each access node is provided with references to other access nodes and/or to data items representing an object, each data item carrying only the amount of information that is relevant for its purpose. The data items or the references are provided with a time parameter thus enabling version control and the possibility to handle static or slowly changing data and frequently changed and updated data in a corresponding manner. The access nodes comprise access control parameters for access control from a safety point of view as well as for enabling different views of the access structure and underlying data and objects.

U.S. Pat. No. 6,073,106 (Rozen, et al., Jun. 6, 2000), expressly incorporated herein by reference, relates to a method of managing and controlling access to personal information. A participant is prompted to provide a constant identifier and a selected password via Internet communications or via phone/fax/mail. Emergency and confidential categories of medical information are identified, and the participant is prompted to provide personal information in each of the categories and a different personal identification number (E-PIN, C-PIN) for each category. The participant is also prompted to provide an instruction to disclose or to not disclose the personal information in the emergency category in the event a requester of the information is an emergency medical facility and is unable to provide the participant's E-PIN. Alteration of any of the participant's medical information is enabled upon presentation of the participant's identifier and password by the requester. The emergency information or the confidential information is disclosed upon presentation of the participant's identifier and E-PIN or C-PIN. In addition, the emergency information is disclosed to an emergency medical facility verified as such by a service provider in the event the participant has provided an instruction to disclose the emergency information. Storage and access to health related documents such as healthcare power of attorney, consent for treatment, and eyeglass prescription is also provided.

U.S. Pat. No. 6,073,234 (Kigo, et al., Jun. 6, 2000), expressly incorporated herein by reference, relates to a device and method for authenticating user's access rights to resources. Both of a user side and a protect side such as a programmer of an application programmer need not handle a large number of inherent information such as authentication keys. An access ticket generation device generates an access ticket from user unique identifying information and access rights authentication feature information. As unique security characteristic information, there is used a secret key of an elliptic curve encryption or an ElGamal encryption. A proof data generation device receives the access ticket, converts authentication data received from a proof data verification device into proof data by use of the access ticket and the user unique identifying information, and returns the resultant proof data to the proof data verification device. The proof data generation device or the proof data verification device decrypts the above-mentioned encryption. The proof data verification device verifies the access rights as correct only when a combination of an access ticket and user unique identifying information used in the proof data generation device is correct.

6,138,119 (Hall, Techniques for defining, using and manipulating rights management data structures), expressly incorporated herein by reference.

Role-Based Access

U.S. Pat. No. 6,023,765 (Kuhn, Feb. 8, 2000; Implementation of role-based access control in multi-level secure systems), expressly incorporated herein by reference, relates to a system and method for implementation of role-based access control in multi-level secure systems. Role-based access control (RBAC) is implemented on a multi-level secure (MLS) system by establishing a relationship between privileges within the RBAC system and pairs of levels and compartments within the MLS system. The advantages provided by RBAC, that is, reducing the overall number of connections that must be maintained, and, for example, greatly simplifying the process required in response to a change of job status of individuals within an organization, are then realized without loss of the security provided by MLS. A trusted interface function is developed to ensure that the RBAC rules permitting individual's access to objects are followed rigorously, and provides a proper mapping of the roles to corresponding pairs of levels and compartments. No other modifications are necessary. Access requests from subjects are mapped by the interface function to pairs of levels and compartments, after which access is controlled entirely by the rules of the MLS system.

See also, U.S. Pat. Nos. 6,073,242 (Electronic authority server); 6,073,240 (Method and apparatus for realizing computer security); 6,064,977 (Web server with integrated scheduling and calendaring); 6,055,637 (System and method for accessing enterprise-wide resources by presenting to the resource a temporary credential); 6,044,466 (Flexible and dynamic derivation of permissions); 6,041,349 (System management/network correspondence display method and system therefore); 6,014,666

(Declarative and programmatic access control of component-based server applications using roles); 5,991,877 (Object-oriented trusted application framework); 5,978,475 (Event auditing system); 5,949,866 (Communications system for establishing a communication channel on the basis of a functional role or task); 5,925,126 (Method for security shield implementation in computer system's software); 5,911,143 (Method and system for advanced role-based access control in distributed and centralized computer systems); 5,797,128 (System and method for implementing a hierarchical policy for computer system administration); 5,761,288 (Service context sensitive features and applications); 5,751,909 (Database system with methods for controlling object interaction by establishing database contracts between objects); 5,748,890 (Method and system for authenticating and auditing access by a user to non-natively secured applications); 5,621,889 (Facility for detecting intruders and suspect callers in a computer installation and a security system including such a facility); 5,535,383 (Database system with methods for controlling object interaction by establishing database contracts between objects); 5,528,516 (Apparatus and method for event correlation and problem reporting); 5,481,613 (Computer network cryptographic key distribution system); 5,347,578 (Computer system security); 5,265,221 (Access restriction facility method and apparatus); 6,161,139 (Win, Administrative Roles that Govern Access to Administrative Functions), each of which is expressly incorporated herein by reference.

John Barkley, Role-Based Access Control for the World Wide Web, at http://hissu.ncsl.nist.gov/rbac Secure Networks U.S. Pat. Nos. 5,579,393 (Conner, et al., Nov. 26, 1996), expressly incorporated herein by reference, relates to a system and method for secure medical and dental record interchange, comprising a provider system and a payer system. The provider system includes a digital imager, a processing unit, a data transmission/reception device, and a memory having a provider management unit and a security unit. For each image acquired from the digital imager, the provider management unit generates a unique image ID, and creates an image relation structure having a source indicator, a status indicator, and a copy-from indicator. The provider management unit organizes images into a message for transmission to a payer system. The security unit performs message encryption, image signature generation, and message signature generation. The payer system includes a processing unit, a data transmission/reception device, and a memory having a payer management unit and a security unit. The payer system's security unit validates message signatures and image signatures received. The payer management unit generates a message rejection notification or a message acceptance notification. A method for provider-side secure medical and dental record interchange comprises the steps ofi acquiring an image; generating a unique image ID and an image relation structure; maintaining a status indicator, a source indicator, and a copy-from indicator; generating an image signature; creating a message that includes the image; and generating a message signature. A method for payer-side secure medical and dental record interchange comprises the steps ofi validating a message signature; validating an image signature; and selectively generating a message acceptance notification or a message rejection notification.

U.S. Pat. No. 5,890,129 (Spurgeon, Mar. 30, 1999), expressly incorporated herein by reference, relates to a system for exchanging health care insurance information. An information-exchange system is provided for controlling the exchange of business and clinical information between an insurer and multiple health care providers. The system includes an information-exchange computer that is connected over a local area network to an insurer computer using a proprietary database and over the Internet to health-care provider computers using open database-compliant databases. The information-exchange computer receives subscriber insurance data from the insurance computer database, translates the insurance data into an exchange database, and pushes the subscriber insurance data out over the Internet to the computer operated by the health-care provider assigned to each subscriber. The information-exchange system stores the data in the provider database. The information-exchange systems also provide for the preparation, submission, processing, and payment of claims over the local area network and with push technology over the Internet. In addition, prior authorization requests may be initiated in the provider computers and exchanged over the information-exchange system for review by the insurer computer. Processed reviews are transmitted back to the provider computer and to a specialist computer, if required, using push technology over the Internet.

U.S. Pat. No. 5,930,759 (Moore, et al., Jul. 27, 1999), expressly incorporated herein by reference, relates to a method and system for processing health care electronic data transactions. A system or network for assembling, filing and processing health care data transactions and insurance claims made by patients pursuant to health care policies issued to the patients by insurance companies or other carriers for service provided to the patients at health care facilities is provided. The network comprises a multitude of participating patients, a multitude of health care facilities, and a plurality of insurance companies or other carriers. Each of the patients has a personal data file including a set of patient related data encoded in a machine readable format, and each of the health care facilities has a telecommunications unit and a file reader to read the data on the personal data files and to transmit the patient related data to the telecommunications unit at the facility. The network further includes a central claims processing unit connected to the telecommunications units of the health care facilities to receive the electronic claim forms from those facilities and to adjudicate those claims.

U.S. Pat. No. 5,933,498 (Schneck, et al., Aug. 3, 1999), expressly incorporated herein by reference, relates to a system for controlling access and distribution of digital property represented as data. Portions of the data are protected and rules concerning access rights to the data are determined. Access to the protected portions of the data is prevented, other than in a non-useable form; and users are provided access to the data only in accordance with the rules as enforced by a mechanism protected by tamper detection. A method is also provided for distributing data for subsequent controlled use of those data. The method includes protecting portions of the data; preventing access to the protected portions of the data other than in a non-useable form; determining rules concerning access rights to the data; protecting the rules; and providing a package including: the protected portions of the data and the protected rules. A user is provided controlled access to the distributed data only in accordance with the rules as enforced by a mechanism protected by tamper protection. A device is provided for controlling access to data having protected data portions and rules concerning access rights to the data. The device includes means for storing the rules; and means for accessing the protected data portions only in accordance with the rules, whereby user access to the protected data portions is permitted only if the rules indicate that the user is allowed to access the portions of the data.

U.S. Pat. No. 5,978,918 (Scholnick, et al., Nov. 2, 1999), expressly incorporated herein by reference, relates to a practical method and system for supplementing or replacing current security protocols used on public networks involving the distribution of a proprietary system for use on a public network access provider's network. The proprietary system includes processing hardware and proprietary software. The proprietary system transmits private data, outside the Internet, over proprietary lines to a back-end process. When a "sender" sends private data it is sent over the proprietary system to a back-end process. The back-end process returns a time sensitive token that the "sender" sends to the "receiver". The "receiver" takes the time sensitive token and uses it to either retrieve the private data, over a proprietary system, or initiate a transaction with a financial institution. Encryption is used to allow authentication of the participants. This method can be used in conjunction with Secure Socket Layer (SSL) encryption and/or the Secure Electronic Transaction (SET) protocol.

U.S. Pat. No. 6,005,943 (Cohen, et al., Dec. 21, 1999), expressly incorporated herein by reference, relates to electronic identifiers for network terminal devices. The generation of electronic identifiers for network interface units connected to a data network for use in detecting unauthorized decryption of encrypted data transmitted over the data network. A random number is generated for use as a private key decryption code and is stored in memory in each network interface unit. A public key is calculated from the stored private key using a non-invertible mathematical formula. If the calculated public key is unique, then a portion of the public key (e.g. a subset of its bits) is stored in a data provider database as an electronic identifier for use in detecting unauthorized decryption of data by the interface unit.

U.S. Pat. No. 6,009,526 (Choi, Dec. 28, 1999), expressly incorporated herein by reference, relates to an information security system for tracing information outflow from a remotely accessible computer or computer network. The system includes an internal communication system that has at least one internal computer for transmitting security information by tracing data through communication equipment, outputting the data to an external output means, and connecting the internal computer to an external network. A communication monitoring device stores information regarding the data that is to be transmitted by applying a security policy according to a security grade assigned to the destination to which the data is to be transmitted. The communication-monitoring device is configured for extracting the identification of the destination from the transmitted data. It also includes a communication-monitoring server for storing and displaying predetermined information about the data to be transmitted and for determining whether the tracing information is stored according to the security grade for the identified destination. A method of operating the disclosed system is also described.

U.S. Pat. No. 6,021,202 (Anderson, et al., Feb. 1, 2000), expressly incorporated herein by reference, relates to a method and system for processing electronic documents, which includes a markup language according to the SGML standard in which document type definitions are created under which electronic documents are divided into blocks that are associated with logical fields that are specific to the type of block. Each of many different types of electronic documents can have a record mapping to a particular environment, such as a legacy environment of a banking network, a hospital's computer environment for electronic record keeping, a lending institution's computer environment for processing loan applications, or a court or arbitrator's computer system. Semantic document type definitions for various electronic document types (including, for example, electronic checks, mortgage applications, medical records, prescriptions, contracts, and the like) can be formed using mapping techniques between the logical content of the document and the block that is defined to include such content. Also, the various document types are preferably defined to satisfy existing customs, protocols and legal rules.

U.S. Pat. No. 6,021,491 (Renaud, Feb. 1, 2000), expressly incorporated herein by reference, relates to digital signatures for data streams and data archives. Methods, apparatuses and products are provided for verifying the authenticity of data within one or more data files. Each data file is provided with an identifier, such as a one-way hash function or cyclic redundancy checksum. A signature file, that includes the identifiers for one or more data files, is provided with a digital signature created with a signature algorithm. The data file(s) and signature file are then transferred, or otherwise provided to a user. The user verifies the digital signature in the signature file using a signature-verifying algorithm. Once verified as being authentic, the signature file can be used to verify each of the data files. Verification of the data files can be accomplished by comparing the identifier for each data file with the corresponding identifier in the signature file. If the identifiers in the data and signature files match, then the data file can be marked as authentic. If the identifiers do not match then the data file can be rejected or otherwise dealt with accordingly.

U.S. Pat. No. 6,021,497 (Bouthillier, et al., Feb. 1, 2000), expressly incorporated herein by reference, relates to a secured network system which will allow only authorized users of the seed network system to access classified data provided by a secured network server. The secured network system includes a readykey controller, which has connected thereto a plurality of card readers. A user of the secured network system inserts a microchip embedded card into one of the card readers which then provides an authorization signal to the readykey controller indicating that the user is authorized to use one of a plurality of computers within the secured network system to receive and process classified data. The readykey controller sends an enable signal to a data relay switch enabling a data line associated with the card reader and the computer selected by the user allowing classified data to be transmitted from the secured network server through the data relay switch to the selected computer. Each of the three computers also has a power relay switch connected thereto which is activated by the readykey controller whenever authorization to activate the computer is provided to the readykey controller from another of the plurality of card readers.

U.S. Pat. No. 6,023,762 (Dean, et al., Feb. 8, 2000), expressly incorporated herein by reference, relates to a data access and retrieval system which comprises a plurality of user data sources each storing electronic data signals describing data specific to a user, or enabling services selected by a user; an agent device which is configurable to select individual ones of the user data sources and present selections of user data and service data to a set of callers who may interrogate the agent device remotely over a communications network; a plurality of service terminals capable of communicating with the agent device over a communications network the service terminals operable by callers; and a plurality of key devices, storing caller information and security code information for enabling remote access of selections of user data and/or services to be transmitted over a communications network to a caller located at a service terminal.

U.S. Pat. No. 6,029,245 (Scanlan, Feb. 22, 2000), expressly incorporated herein by reference, relates to a method and system for dynamically assigning security parameters to hypertext markup language (HTML) pages of an information provider on the worldwide web, whereby only one set of HTML pages need be stored and maintained for retrieval by client computers using differing security protocols. A security injection profile is provided for storing security parameters for each respective security protocol. When a browser enabled with a particular security protocol requests one of the HTML pages in the secure set, the page is accessed from web server storage, security parameters of the particular protocol are accessed and injected into the accessed page, and the page is sent to the requesting browser.

U.S. Pat. No. 6,049,875 (Suzuki, et al., Apr. 11, 2000), expressly incorporated herein by reference, relates to a security apparatus and method. A service is supplied to a user while maintaining the security of the service. A person discrimination section discriminates the user to be supplied the service. A user situation decision section decides whether the user is authorized to use the service. An infringement situation decision section detects whether a non-user intrudes into a use area of the service in order to decide whether the security of the service is infringed. A service control section supplies the service to the user in case the person discrimination section discriminates the user, and controls a supply of the service if the use situation decision section decides the user is not under the situation to use the service or the infringement situation decision section decides that the security of the service is infringed.

U.S. Pat. No. 6,055,508 (Naor, et al., Apr. 25, 2000), expressly incorporated herein by reference, relates to a method for secure accounting and auditing on a communications network. A method for secure accounting and auditing of a communications network operates in an environment in which many servers serve an even larger number of clients (e.g. the web), and are required to meter the interaction between servers and clients (e.g. counting the number of clients that were served by a server). The method (metering process) is very efficient and does not require extensive usage of any new communication channels. The metering is secure against fraud attempts by servers that inflate the number of their clients and against clients that attempt to disrupt the metering process. Several secure and efficient constructions of this method are based on efficient cryptographic techniques, are also very accurate, and preserve the privacy of the clients.

U.S. Pat. No. 6,065,119 (Sandford, II, et al., May 16, 2000), expressly incorporated herein by reference, relates to a method of authenticating digital data such as measurements made for medical, environmental purposes, or forensic purpose, and destined for archival storage or transmission through communications channels in which corruption or modification in part is possible. Authenticated digital data contain data-metric quantities that can be constructed from the digital data by authorized persons having a digital key. To verify retrieved or received digital data, the data-metrics constructed from the retrieved or received data are compared with similar data-metrics calculated for the retrieved or received digital data. The comparison determines the location and measures the amount of modification or corruption in the retrieved or received digital data.

U.S. Pat. No. 6,073,240 (Kurtzberg, et al., Jun. 6, 2000), expressly incorporated herein by reference, relates to a method and apparatus for realizing computer security. The method includes the steps of establishing an authorization window for enabling computer system actions consistent with an authorization rule; and, monitoring the actions as an indicia of conformance to the authorization rule. The method preferably provides a pattern of system actions as an indicia of compliance with an authorization rule, and provides notification of predetermined patterns.

U.S. Pat. No. 6,075,860 (Ketcham, Jun. 13, 2000), expressly incorporated herein by reference, relates to an apparatus and method for authentication and encryption of a remote terminal over a wireless link. A method and system is provided for authenticating an authorized user of a remote terminal attempting to interconnect with a computer network over a wireless modem is provided. An encrypted wireless communication channel is established between a remote terminal and a network server for facilitating the authentication process. An authorized user presents an authentication card containing credentials including a user identifier and an authentication encryption key to a remote terminal. The remote terminal establishes a wireless communication channel with a network server that provides a firewall between unauthenticated users and a computer network. The network server and the remote terminal then exchange encrypted information thus verifying the authenticity of each party. The remote terminal and the network server each independently generate a data encryption key for use in establishing a secure encrypted wireless communication channel therebetween.

U.S. Pat. No. 6,075,861 (Miller, II, Jun. 13, 2000), expressly incorporated herein by reference, relates to a security access system, having an entry access system that includes a locking mechanism enabling authorized entry at a secured entry point to a closed access area or computing device. Entry is approved in response to an interaction between an intended entrant and the entry access system that involves an interchange of multidigit numbers and use of ID and PINs for generation of a multidigit check number to establish authenticity of a request for entry.

U.S. Pat. No. 6,092,724 (Bouthillier, Secured network system), expressly incorporated herein by reference Content-Based Query Servers U.S. Pat. No. 5,987,459 (Swanson, et al. Nov. 16, 1999), expressly incorporated herein by reference, relates to an image and document management system for content-based retrieval support directly into the compressed files. The system minimizes a weighted sum of the expected size of the compressed files and the expected query response time. Object searching of documents stored by the system is possible on a scalable resolution basis. The system includes a novel object representation based on embedded prototypes that provides for high-quality browsing of retrieval images at low bit rates.

U.S. Pat. No. 6,038,560 (Wical, Mar. 14, 2000), expressly incorporated herein by reference, relates to a concept knowledge base search and retrieval system, which includes factual knowledge base queries and concept knowledge base queries, is disclosed. A knowledge base stores associations among terminology/categories that have a lexical, semantic or usage association. Document theme vectors identify the content of documents through themes as well as through classification of the documents in categories that reflects what the documents are primarily about. The factual knowledge base queries identify, in response to an input query, documents relevant to the input query through expansion of the query terms as well as through expansion of themes. The concept knowledge base query does not identify specific documents in response to a query, but specifies terminology that identifies the potential existence of documents in a particular area.

U.S. Pat. No. 6,067,466 (Selker, et al., May 23, 2000), expressly incorporated herein by reference, relates to a diagnostic tool using a predictive instrument. A method is provided for evaluating a medical condition of a patient including the steps of monitoring one or more clinical features of a patient; based on the monitored features, computing a primary probability of a medical outcome or diagnosis; computing a plurality of conditional probabilities for a selected diagnostic test, the computed conditional probabilities including a first probability of the medical outcome or diagnosis assuming the selected diagnostic test produces a first outcome and a second probability of the medical outcome or diagnosis assuming the selected diagnostic test produces a second outcome; and displaying the computed primary probability as well as the plurality of computed conditional probabilities to a user as an aid to determining whether to administer the selected diagnostic test to the patient.

E-Commerce Systems

U.S. Pat. No. 5,946,669 (Polk, Aug. 31, 1999), expressly incorporated herein by reference, relates to a method and apparatus for payment processing using debit-based electronic funds transfer and disbursement processing using addendum-based electronic data interchange. This disclosure describes a payment and disbursement system, wherein an initiator authorizes a payment and disbursement to a collector and the collector processes the payment and disbursement through an accumulator agency. The accumulator agency processes the payment as a debit-based transaction and processes the disbursement as an addendum-based transaction. The processing of a debit-based transaction generally occurs by electronic funds transfer (EFT) or by financial electronic data interchange (FEDI). The processing of an addendum-based transaction generally occurs by electronic data interchange (EDI).

U.S. Pat. No. 6,005,939 (Fortenberry, et al., Dec. 21, 1999), expressly incorporated herein by reference, relates to a method and apparatus for storing an Internet user's identity and access rights to World Wide Web resources. A method and apparatus for obtaining user information to conduct secure transactions on the Internet without having to re-enter the information multiple times is described. The method and apparatus can also provide a technique by which secured access to the data can be achieved over the Internet. A passport containing user-defined information at various security levels is stored in a secure server apparatus, or passport agent, connected to computer network. A user process instructs the passport agent to release all or portions of the passport to a recipient node and forwards a key to the recipient node to unlock the passport information.

U.S. Pat. No. 6,016,484 (Williams, et al., Jan. 18, 2000), expressly incorporated herein by reference, relates to a system, method and apparatus for network electronic payment instrument and certification of payment and credit collection utilizing a payment. An electronic monetary system provides for transactions utilizing an electronic-monetary system that emulates a wallet or a purse that is customarily used for keeping money, credit cards and other forms of payment organized. Access to the instruments in the wallet or purse is restricted by a password to avoid unauthorized payments. A certificate form must be completed in order to obtain an instrument. The certificate form obtains the information necessary for creating a certificate granting authority to utilize an instrument, a payment holder and a complete electronic wallet. Electronic approval results in the generation of an electronic transaction to complete the order. If a user selects a particular certificate, a particular payment instrument holder will be generated based on the selected certificate. In addition, the issuing agent for the certificate defines a default bitmap for the instrument associated with a particular certificate, and the default bitmap will be displayed when the certificate definition is completed. Finally, the number associated with a particular certificate will be utilized to determine if a particular party can issue a certificate.

U.S. Pat. No. 6,029,150 (Kravitz, Feb. 22, 2000), expressly incorporated herein by reference, relates to a system and method of payment in an electronic payment system wherein a plurality of customers have accounts with an agent. A customer obtains an authenticated quote from a specific merchant, the quote including a specification of goods and a payment amount for those goods. The customer sends to the agent a single communication including a request for payment of the payment amount to the specific merchant and a unique identification of the customer. The agent issues to the customer an authenticated payment advice based only on the single communication and secret shared between the customer and the agent and status information, which the agent knows about the merchant, and/or the customer. The customer forwards a portion of the payment advice to the specific merchant. The specific merchant provides the goods to the customer in response to receiving the portion of the payment advice.

U.S. Pat. No. 6,047,269 (Biffar, Apr. 4, 2000), expressly incorporated herein by reference, relates to a self-contained payment system with creating and facilitating transfer of circulating digital vouchers representing value. A digital voucher has an identifying element and a dynamic log. The identifying element includes information such as the transferable value, a serial number and a digital signature. The dynamic log records the movement of the voucher through the system and accordingly grows over time. This allows the system operator to not only reconcile the vouchers before redeeming them, but also to recreate the history of movement of a voucher should an irregularity like a duplicate voucher be detected. These vouchers are used within a self-contained system including a large number of remote devices that are linked to a central system. The central system can e linked to an external system. The external system, as well as the remote devices, is connected to the central system by any one or a combination of networks. The networks must be able to transport digital information, for example the Internet, cellular networks, telecommunication networks, cable networks or proprietary networks. Vouchers can also be transferred from one remote device to another remote device. These remote devices can communicate through a number of methods with each other. For example, for a non-face-to-face transaction the Internet is a choice, for a face-to-face or close proximity transactions tone signals or light signals are likely methods. In addition, at the time of a transaction a digital receipt can be created which will facilitate a fast replacement of vouchers stored in a lost remote device.

See, U.S. Pat. Nos. 6,134,328 (Cordery, Secure User Certification for Electronic Commerce Employing Value Metering System), and 5,796,841 (Cordery, Secure User Certification for Electronic Commerce Employing Value Metering System); 6,148,338 (Lachelt, System for Logging and Enabling Ordered Retrieval of Management), expressly incorporated herein by reference.

A. Michael Froomkin, The Essential Role of Trusted Third Parties in Electronic Commerce, 75 Oregoon Law Review 49-115 (1996).

Oscar H. Gandy, Jr., Legitimate Business Interest: No End in Sight? An Inquirey into the Status of Privacy in Cyberspace, 1996 University of Chicago Law Forum 77-91 (1996).

Trotter Hardy, Property and (Copyright) in Cyberspace 1996 University of Chicago Law Forum 217-260 (1996).

Vicky E. Jones, N. Ching, & M. Winslett, Credentials for Privacy and Interoperation: . . . New Security Paradigms, '95 Workshop, LaJolla, Cal. Aug. 22-25, 1995.

Peter Keen, Craigg Ballance, Sally Chan, and Steve Schrump, Electronic Relationships: Trust by Design (2000).

George Lawton, The Internets Challenge to Privacy, IEEE Computer, Vol. 31, No. 6, June 1998, pp. 16-18.

Joshua Lederberg, Letter to Victor Sidel, Aug. 4, 1969.

Joshua Lederberg, Testimony, Hearings of United States Senate Committee .

Lawrence Lessig, The Path of Cyberlaw, 104 Yale Law Journal 1743-1755 (1995).

Stuart Madnick, Information Superhighway or Tower of Babel . . . .

Hiroshi Maruyama and Takeshi Imamura, Element-Wise XML Encryption.

Shamkant B. Navathe and Michael J. Donahoo, Towards Intelligent Integration of Heterogenous Information Sources, Proceedings of the 6th International Workshop on Database Reengineering and Interoperability, March 1995.

Leon Pintsov and Scott Vanstone, Postal Revneue Collection in the Digital Age.

Pamela Samuelson, Liability for Defective Information, Communications of the ACM, Vol. 36, No. 5, May 1993, pp. 21-26.

United States Senate Judiciary Committee, Know the Rules; Use the Tools; Privacy in the Digital Age at http://judiciary.senate.gov/privacy.htm.

Gio Wiederhold, Trends for the Information Technology Industry.

Gio Wiederhold, Value Added Middleware: Mediators at http://www-db.stanford.edu/pub/gio/1998/dbpd.html. Micropayments U.S. Pat. No. 5,999,919 (Jarecki, et al., Dec. 7, 1999), expressly incorporated herein by reference, relates to an efficient micropayment system. Existing software proposals for electronic payments can be divided into "on-line" schemes which require participation of a trusted party the bank) in every transaction and are secure against overspending, and "off-line" schemes which do not require a third party and guarantee only that overspending is detected when vendors submit their transaction records to the bank (usually at the end of the day). A new "hybrid" scheme is proposed which combines the advantages of both "on-line" and "off-line" electronic payment schemes. It allows for control of overspending at a cost of only a modest increase in communication compared to the off-line schemes. The protocol is based on probabilistic polling. During each transaction, with some small probability, the vendor forwards information about this transaction to the bank. This enables the bank to maintain an accurate approximation of a customer's spending. The frequency of polling messages is related to the monetary value of transactions and the amount of overspending the bank is willing to risk. For transactions of high monetary value, the cost of polling approaches that of the on-line schemes, but for micropayments, the cost of polling is a small increase over the traffic incurred by the off-line schemes.

Micropayments are often preferred where the amount of the transaction does not justify the costs of complete financial security. In the micropayment scheme, typically a direct communication between creditor and debtor is not required; rather, the transaction produces a result which eventually results in an economic transfer, but which may remain outstanding subsequent to transfer of the underlying goods or services. The theory underlying this micropayment scheme is that the monetary units are small enough such that risks of failure in transaction closure is relatively insignificant for both parties, but that a user gets few chances to default before credit is withdrawn. On the other hand, the transaction costs of a non-real time transactions of small monetary units are substantially less than those of secure, unlimited or potentially high value, real time verified transactions, allowing and facilitating such types of commerce. Thus, the rights management system may employ applets local to the client system, which communicate with other applets and/or the server and/or a vendor/rights-holder to validate a transaction, at low transactional costs.

The following U.S. Patents, expressly incorporated herein by reference, define aspects of micropayment, digital certificate, and on-line payment systems: 5,930,777 (Barber, Jul. 27, 1999, Method of charging for pay-per-access information over a network); 5,857,023 (Jan. 5, 1999, Demers et al., Space efficient method of redeeming electronic payments); 5,815,657 (Sep. 29, 1998, Williams, System, method and article of manufacture for network electronic authorization utilizing an authorization instrument); 5,793,868 (Aug. 11, 1998, Micali, Certificate revocation system), 5,717,757 (Feb. 10, 1998, Micali, Certificate issue lists); 5,666,416 (Sep. 9, 1997, Micali, Certificate revocation system); 5,677,955 (Doggett et al., Electronic funds transfer instruments); 5,839,119 (Nov. 17 1998, Krsul; et al., Method of electronic payments that prevents double-spending); 5,915,093 (Berlin et al.); 5,937,394 (Wong, et al.); 5,933,498 (Schneck et al.); 5,903,880 (Biffar); 5,903,651 (Kocher); 5,884,277 (Khosla); 5,960,083 (Sep. 28, 1999, Micali, Certificate revocation system); 5,963,924 (Oct. 5 1999, Williams et al., System, method and article of manufacture for the use of payment instrument holders and payment instruments in network electronic commerce); 5,996,076 (Rowney et al., System, method and article of manufacture for secure digital certification of electronic commerce); 6,016,484 (Jan. 18, 2000, Williams et al., System, method and article of manufacture for network electronic payment instrument and certification of payment and credit collection utilizing a payment); 6,018,724 (Arent); 6,021,202

(Anderson et al., Method and system for processing electronic documents); 6,035,402 (Vaeth et al.); 6,049,786 (Smorodinsky); 6,049,787 (Takahashi, et al.); 6,058,381 (Nelson, Many-to-many payments system for network content materials); 6,061,448 (Smith, et al.); 5,987,132 (Nov. 16 1999, Rowney, System, method and article of manufacture for conditionally accepting a payment method utilizing an extensible, flexible architecture); 6,057,872 (Candelore); and 6,061,665 (May 9, 2000, Bahreman, System, method and article of manufacture for dynamic negotiation of a network payment framework). See also, Rivest and Shamir, "PayWord and MicroMint: Two Simple Micropayment Schemes" May 7, 1996); Micro PAYMENT transfer Protocol (MPTP) Version 0.1 (22 Nov. 95) et seq., http://www.w3.org/pub/WWW/TR/WD-mptp; Common Markup for web Micropayment Systems, http://www.w3.org/TR/WD-Micropayment-Markup (9 Jun. 99); "Distributing Intellectual Property: a Model of Microtransaction Based Upon Metadata and Digital Signatures", Olivia, Maurizio, http://olivia.modlang.denison.edu/~olivia/RFC/09/, all of which are expressly incorporated herein by reference.

See, also: 4,977,595 (Dec. 11, 1990, Method and apparatus for implementing electronic cash); 5,224,162 (Jun. 29, 1993, Electronic cash system); 5,237,159 (Aug. 17, 1993, Electronic check presentment system); 5,392,353 (2 /1995, Morales, TV Answer, Inc. Interactive satellite broadcast network); 5,511,121 (Apr. 23, 1996, Efficient electronic money); 5,621,201 (April 1997, Langhans et al., Visa International Automated purchasing control system); 5,623,547 (Apr. 22 1997, Value transfer system); 5,679,940 (10 /1997, Templeton et al., TeleCheck International, Inc. Transaction system with on/off line risk assessment); 5,696,908 (December 1997, Muehlberger et al., Southeast Phonecard, Inc. Telephone debit card dispenser and method); 5,754,939 (May 1998, Herz et al., System for generation of user profiles for a system for customized electronic identification of desirable objects); 5,768,385 (Jun. 16, 1998, Untraceable electronic cash); 5,799,087 (Aug. 25, 1998, Electronic-monetary system); 5,812,668 (Sep. 22, 1998, System, method and article of manufacture for verifying the operation of a remote transaction clearance system utilizing a multichannel, extensible, flexible architecture); 5,828,840 (Oct. 27, 1998, Server for starting client application on client if client is network terminal and initiating client application on server if client is non network terminal); 5,832,089 (Nov. 3, 1998, Off-line compatible electronic cash method and system); 5,850,446 (Dec. 15 1998, System, method and article of manufacture for virtual point of sale processing utilizing an extensible, flexible architecture); 5,889,862 (Mar. 30, 1999, Method and apparatus for implementing traceable electronic cash); 5,889,863 (Mar. 30, 1999, System, method and article of manufacture for remote virtual point of sale processing utilizing a multichannel, extensible, flexible architecture); 5,898,154 (Apr. 27 1999, System and method for updating security information in a time-based electronic monetary system); 5,901,229 (May 4, 1999, Electronic cash implementing method using a trustee); 5,920,629 (Jul. 6, 1999, Electronic-monetary system); 5,926,548 (Jul. 20, 1999, Method and apparatus for implementing hierarchical electronic cash); 5,943,424 (Aug. 24, 1999, System, method and article of manufacture for processing a plurality of transactions from a single initiation point on a multichannel, extensible, flexible architecture); 5,949,045 (Sep. 7, 1999, Micro-dynamic simulation of electronic cash transactions); 5,952,638 (Sep. 14, 1999, Space efficient method of electronic payments); 5,963,648 (Oct. 5 1999, Electronic-monetary system); 5,978,840 (System, method and article of manufacture for a payment gateway system architecture for processing encrypted payment transactions utilizing a multichannel, extensible, flexible architecture); 5,983,208 (Nov. 9, 1999, System, method and article of manufacture for handling transaction results in a gateway payment architecture utilizing a multichannel, extensible, flexible architecture); 5,987,140 (Nov. 16, 1999, System, method and article of manufacture for secure network electronic payment and credit collection); 6,002,767 (Dec. 14 1999, System, method and article of manufacture for a modular gateway server architecture); 6,003,765 (Dec. 21 1999, Electronic cash implementing method with a surveillance institution, and user apparatus and surveillance institution apparatus for implementing the same); 6,021,399 (Feb. 1 2000, Space efficient method of verifying electronic payments); 6,026,379 (Feb. 15, 2000, System, method and article of manufacture for managing transactions in a high availability system); 6,029,150 (Feb. 22, 2000, Payment and transactions in electronic commerce system); 6,029,151 (Feb. 22, 2000, Method and system for performing electronic money transactions); 6,047,067 (Apr. 4, 2000, Electronic-monetary system); 6,047,887 (Apr. 11 2000, System and method for connecting money modules); 6,055,508 (Apr. 25, 2000, Method for secure accounting and auditing on a communications network); 6,065,675 (May 23, 2000, Processing system and method for a heterogeneous electronic cash environment); 6,072,870 (Jun. 6, 2000, System, method and article of manufacture for a gateway payment architecture utilizing a multichannel, extensible, flexible architecture), each of which is expressly incorporated herein by reference.

Memory Cards

U.S. Pat. No. 6,021,393 (Honda, et al., Feb. 1, 2000), expressly incorporated herein by reference, relates to a medical information management system. As a portable memory card carried by a patient to store the patient's personal medical information, a hybrid-type memory card is used which includes an optical information recording area, an integrated circuit memory area and a magnetic information recording area. A read/write drive for the memory card includes an optical head, a carrier mechanism for loading the memory card on a carrier table and moving the loaded memory card relative to the optical head, and a coupler section for coupling electronic information to be read and written from and to the integrated circuit memory area of the memory card, so that reading and writing of optical information from and to the optical information recording area can be conducted simultaneously with reading and writing of the electronic information from and to the integrated circuit memory area.

U.S. Pat. No. 6,031,910 (Deindl, et al., Feb. 29, 2000), expressly incorporated herein by reference, relates to a method and system for the secure transmission and storage of protectable information, such as patient information, by means of a patient card. The data stored on the patient card are protected by cryptographic methods. The data is decrypted only with the same patient card if a doctor is authorized and the patient has given his agreement. All information that the patient card needs in order to decide whether the doctor is authorized, and the key for protecting the control data and the random key are held on the chip. The patient data can be freely transmitted to any storage medium. The chip controls both the access to the data and the encryption and decryption functions. Random keys, which are themselves stored encrypted together with the data, ensure that every data record remains separate from every other data record, and that only authorized persons can access it. Every patient card has its own record key. The system and method are not directed exclusively to patient data but can be applied to any protectable data to which right of access is to be restricted.

U.S. Pat. No. 6,034,605 (March, Mar. 7, 2000), expressly incorporated herein by reference, relates to a system and method for secure storage of personal information and for broadcast of the personal information at a time of emergency. A sealed package contains a medium storing personal information associated with an individual. The sealed package is stored at a facility until an emergency occurs. At a time of emergency, a missing person report concerning the individual generated by a law enforcement agency is processed. The personal information in the individual's sealed package is accessed in response to the missing person report and then broadcast on an electronic bulletin board accessible via the Internet.

U.S. Pat. No. 6,042,005 (Basile, et al., Mar. 28, 2000), expressly incorporated herein by reference, relates to a personal identification system for children, that includes two forms of identification. An identification card carried by the user contains the user's personal and medical information in an electronic medium. The identification card includes photographs of the user and their parent or legal guardian, a unique identification number for the user, and a list of corporate sponsors. The second identification device is to be worn by the user and includes the user's unique identification number and an access telephone number. A user interface enables the users to update their stored personal and medical information.

Jurisdictional Processing Dependence

U.S. Pat. No. 6,064,968 (Schanz, May 16, 2000), expressly incorporated herein by reference, relates to systems, methods and computer program products for identifying unique and common legal requirements for a regulated activity among multiple legal jurisdictions. Systems, methods and computer program products facilitate user compliance with laws that pertain to a regulated activity in each of a plurality of legal jurisdictions. A user selects, via a user interface in communication with a data processing system, a component that relates to an aspect of the regulated activity. A user also selects, via a user interface in communication with the data processing system, first and second legal jurisdictions from the plurality of legal jurisdictions. In response to the user selections, elements of the selected component that are unique and common to the first and second legal jurisdictions are displayed. Each displayed element is a legal requirement associated with the regulated activity as defined by laws of a respective legal jurisdiction.

What is claimed is:

1. A transcription device, comprising:
an automated communication port configured to receive a first message representing an encrypted communication associated with a first set of asymmetric keys, to receive a transcription key, and to transmit a second message representing the encrypted communication associated with a second set of asymmetric keys, the first and second sets of encryption keys being distinct;
a memory; and
an automated processor, configured to communicate through the automated communication port and with the memory, to receive the first message, receive the transcription key, automatically transcript the first message into the second message, and to transmit the second message, wherein the automated processor does not store as a part of the transcription any decrypted representation of the encrypted communication, and the transcription key is employed without revealing any secret cryptographic information usable for decrypting the first message or the second message.

2. The transcription device according to claim 1, wherein the transcription key is communicated through the automated communication port, encrypted with a session key, the session key being interactively negotiated for a communication session with a communication counterpart.

3. The transcription device according to claim 1, wherein the transcription key is communicated through the automated communication port, encrypted with a first session key and a second session key, the first session key being negotiated for a communication session with a communication counterpart for the first message, the second session key being negotiated for a communication session with a communication counterpart for the second message.

4. The transcription device according to claim 1, wherein the automated communication port interfaces with a public access network.

5. The transcription device according to claim 1, wherein the automated communication port interfaces with a private network.

6. The transcription device according to claim 1, wherein the automated communication port interfaces with a virtual private network.

7. The transcription device according to claim 1, wherein the automated communication port is configured to communicate with an automated communication port of another transcription device.

8. The transcription device according to claim 1, wherein the first message is received through the automated communication port from a distributed information hosting system.

9. The transcription device according to claim 1, wherein the automated processor issues a request for information through the automated communication port, and receives a response to the request for information comprising at least one of the first message and the transcription key.

10. The transcription device according to claim 1, wherein the first message comprises an electronic medical record.

11. The transcription device according to claim 1, further comprising a digital rights management system, wherein the first message comprises a work subject to Copyright.

12. The transcription device according to claim 1, wherein the automated communication port is configured to communicate with a plurality of file servers, together hosting the first message, wherein each storage device is configured to communicate with the automated processor through the automated communication port using first messages associated with different first sets of cryptographic keys, and the automated processor is configured to generate corresponding second messages associated with a common second cryptographic key.

13. The transcription device according to claim 1, wherein the automated processor is configured to query an external server to find information on a network, and to receive a transfer of the responsive information from a selected storage device selected from a plurality of storage devices linked to the network.

14. The transcription device according to claim 1, further comprising an external database configured to account for at least one of the transcription and the transmission of the second message through the automated communication port.

15. The transcription device according to claim 1, wherein the transcription key comprises a first portion dependent on an identity of an intended recipient, and a second portion provided by or on behalf of a rights holder of information represented in the first message.

16. The transcription device according to claim 1, wherein the transcription key comprises a function of a decryption key for decrypting the first message, and a complement of a decryption key for decrypting the second message.

17. The transcription device according to claim 1, wherein the transcription device comprises a remote key handler.

18. A secure distributed information access control system, comprising:
- a communication interface device configured to communicate with a plurality of independently operating servers, each communicating server encrypted information, wherein the server encrypted information is in an encrypted form negotiated between a respective server and an intermediary;
- the intermediary having an automated processor configured to communicate with a network using network encrypted information, wherein the network encrypted information is in a form negotiated between a network endpoint and the intermediary, wherein for respective information, the automated processor transcripts between the server encrypted information and the network encrypted information, substantially without an intermediate representation of the information in a decrypted form; and
- an audit database configured to log usage of at least one of the plurality of independently operating servers and the activity of the intermediary.

19. A method of secure distributed information access control, comprising:
- communicating with a plurality of independently operating servers using server encrypted information, wherein the server encrypted information is in an encrypted form negotiated between a respective server and an intermediary;
- communicating with a network using network encrypted information, wherein the network encrypted information is in a form negotiated between a network endpoint and the intermediary;
- transcripting between the server encrypted information and the network encrypted information with an automated processor, substantially without an intermediate representation of the information in a decrypted form; and
- logging usage of at least one of the plurality of independently operating servers and the activity of the intermediary in a database.

20. The method according to claim 19, wherein the server encrypted information is associated with a first asymmetric key, the network encrypted information is associated with a second asymmetric key, and the transcription key comprises at least a portion of each of the first and second asymmetric keys.

* * * * *

UNITED STATES PATENT AND TRADEMARK OFFICE
CERTIFICATE OF CORRECTION

PATENT NO. : 8,316,237 B1  
APPLICATION NO. : 12/987926  
DATED : November 20, 2012  
INVENTOR(S) : David P. Felsher Page 1 of 1

It is certified that error appears in the above-identified patent and that said Letters Patent is hereby corrected as shown below:

In the Claims

Claim 1, Col. 81, line 48, change "transcription" to --transcryption--
  Line 52, change "transcription" to --transcryption--
  Lines 59-60, change "transcription" to --transcryption--
  Line 60, change "transcript" to --transcrypt--
  Line 63, change "transcription" to --transcryption--
  Lines 64-65, change "transcription" to --transcryption--
Claim 2, Col. 82, lines 1-2, change "transcription" to --transcryption--
Claim 3, Col. 82, lines 6-7, change "transcription" to --transcryption--
Claim 4, Col. 82, line 15, change "transcription" to --transcryption--
Claim 5, Col. 82, line 18, change "transcription" to --transcryption--
Claim 6, Col. 82, line 21, change "transcription" to --transcryption--
Claim 7, Col. 82, line 24, change "transcription" to --transcryption--
  Line 27, change "transcription" to --transcryption--
Claim 8, Col. 82, line 28, change "transcription" to --transcryption--
Claim 9, Col. 82, line 31, change "transcription" to --transcryption--
  Line 35, change "transcription" to --transcryption--
Claim 10, Col. 82, line 36, change "transcription" to --transcryption--
Claim 11, Col. 82, line 38, change "transcription" to --transcryption--
Claim 12, Col. 82, line 41, change "transcription" to --transcryption--
Claim 13, Col. 82, line 51, change "transcription" to --transcryption--
Claim 14, Col. 82, lines 57-59, change "transcription" to --transcryption--
Claim 15, Col. 82, lines 61-62, change "transcription" to --transcryption--
Claim 16, Col. 82, lines 66-67, change "transcription" to --transcryption--
Claim 17, Col. 83, lines 3-4, change "transcription" to --transcryption--
Claim 18, Col. 83, line 19, change "transcripts" to --transcrypts--
Claim 19, Col. 84, line 12, change "transcripting" to --transcrypting--
Claim 20, Col. 84, line 23, change "transcription" to --transcryption--

Signed and Sealed this  
First Day of October, 2013

Teresa Stanek Rea  
*Acting Director of the United States Patent and Trademark Office*